US012760131B2

(12) United States Patent
Kato et al.

(10) Patent No.: US 12,760,131 B2
(45) Date of Patent: Oct. 13, 2026

(54) METHOD FOR PRODUCING POLYTETRAFLUOROETHYLENE

(71) Applicant: DAIKIN INDUSTRIES, LTD., Osaka (JP)

(72) Inventors: Taketo Kato, Osaka (JP); Yohei Fujimoto, Osaka (JP); Kenji Ichikawa, Osaka (JP); Hiroyuki Sato, Osaka (JP); Yoshinori Nanba, Osaka (JP); Hirotoshi Yoshida, Osaka (JP); Kengo Ito, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 628 days.

(21) Appl. No.: 17/424,715

(22) PCT Filed: Jan. 31, 2020

(86) PCT No.: PCT/JP2020/003777

§ 371 (c)(1),
(2) Date: Jul. 21, 2021

(87) PCT Pub. No.: WO2020/158940

PCT Pub. Date: Aug. 6, 2020

(65) Prior Publication Data

US 2022/0119561 A1 Apr. 21, 2022

(30) Foreign Application Priority Data

Feb. 1, 2019 (JP) ................................ 2019-017363

(51) Int. Cl.
*C08F 114/26* (2006.01)

(52) U.S. Cl.
CPC .................................. *C08F 114/26* (2013.01)

(58) Field of Classification Search
CPC .................................................... C08F 114/26
See application file for complete search history.

(56) References Cited

U.S. PATENT DOCUMENTS

| | | | |
|---|---|---|---|
| 4,363,900 A | 12/1982 | Shimizu et al. | |
| RE31,341 E | 8/1983 | Koizumi et al. | |
| 5,514,759 A | 5/1996 | Desimone et al. | |
| 5,527,865 A | 6/1996 | Desimone et al. | |
| 5,530,077 A | 6/1996 | Desimone et al. | |
| 5,672,667 A | 9/1997 | Desimone et al. | |
| 5,824,726 A | 10/1998 | Desimone et al. | |
| 9,096,701 B2 | 8/2015 | Tsuda et al. | |
| 2007/0060699 A1 | 3/2007 | Tsuda et al. | |
| 2007/0149695 A1 | 6/2007 | Hintzer et al. | |
| 2012/0116003 A1 | 5/2012 | Brothers et al. | |
| 2012/0116015 A1 | 5/2012 | Brothers et al. | |
| 2012/0116017 A1 | 5/2012 | Brothers et al. | |
| 2012/0322941 A1 | 12/2012 | Tsuda et al. | |
| 2013/0122302 A1 | 5/2013 | Miyamoto et al. | |
| 2014/0018499 A1 | 1/2014 | Brothers et al. | |
| 2014/0200310 A1 * | 7/2014 | Taira ..................... | C08F 114/26 524/758 |
| 2015/0141581 A1 | 5/2015 | Brothers et al. | |
| 2016/0122509 A1 | 5/2016 | Brothers et al. | |
| 2017/0002156 A1 | 1/2017 | Chaen et al. | |
| 2017/0073435 A1 | 3/2017 | Brothers et al. | |
| 2020/0291141 A1 | 9/2020 | Brothers et al. | |
| 2021/0115224 A1 | 4/2021 | Kato et al. | |

FOREIGN PATENT DOCUMENTS

| | | | | |
|---|---|---|---|---|
| CN | 1871268 A | | 11/2006 | |
| CN | 101341179 A | | 1/2009 | |
| CN | 103124749 A | | 5/2013 | |
| CN | 105793336 A | | 7/2016 | |
| JP | 57-135 A | | 1/1982 | |
| JP | 11-502561 A | | 3/1999 | |
| JP | 2009-521586 A | | 6/2009 | |
| JP | 2010229164 A | * | 10/2010 | ................ C08F 2/26 |
| JP | 2013-542308 A | | 11/2013 | |
| JP | 2013-542309 A | | 11/2013 | |
| JP | 2013-542310 A | | 11/2013 | |
| JP | 2015-516029 A | | 6/2015 | |
| WO | 2005/037880 A1 | | 4/2005 | |
| WO | 2015/080291 A1 | | 6/2015 | |
| WO | 2018/181898 A1 | | 10/2018 | |

OTHER PUBLICATIONS

Machine translation JP 2010229164-A (Year: 2010).*
International Search Reported dated Mar. 10, 2020 in Application No. PCT/JP2020/003777.
International Preliminary Report on Patentability with the translation of Written Opinion dated Jul. 27, 2021 from the International Bureau in International Application No. PCT/JP2020/003777.
Extended European Search Report issued Sep. 21, 2022 in European Application No. 20749007.9.

* cited by examiner

*Primary Examiner* — Catherine S Branch
(74) *Attorney, Agent, or Firm* — Sughrue Mion, PLLC

(57) ABSTRACT

A method for producing polytetrafluoroethylene includes a step of polymerizing tetrafluoroethylene in an aqueous medium in the presence of a hydrocarbon surfactant and a polymerization initiator to obtain polytetrafluoroethylene and a step of adding at least one selected from the group consisting of a radical scavenger and a decomposer of a polymerization initiator after the initiation of polymerization.

9 Claims, No Drawings

METHOD FOR PRODUCING POLYTETRAFLUOROETHYLENE

CROSS-REFERENCE TO RELATED APPLICATIONS

This application is a National Stage of International Application No. PCT/JP2020/003777 filed Jan. 31, 2020, which claims priority under U.S.C. § 119 (a) to Japanese Patent Application No. JP2019-017363 filed on Feb. 1, 2019.

TECHNICAL FIELD

The present disclosure relates to a method for producing polytetrafluoroethylene.

BACKGROUND ART

Flourine-containing anion surfactants have been used in production of polytetrafluoroethylene by emulsion polymerization. Recently, it has been proposed to use hydrocarbon surfactants instead of the flourine-containing anion surfactants.

Patent Document 1 discloses a method for polymerizing fluoromonomer to form a dispersion of fluoropolymer particles in an aqueous medium in a polymerization reactor comprising an initial period and a stabilization period subsequent to the initial period, wherein the initial period comprises: preparing an initial dispersion of fluoropolymer particles in the aqueous medium in the polymerization reactor, and the stabilization period comprises: polymerizing fluoromonomer in the polymerization reactor, and adding hydrocarbon-containing surfactant to the polymerization reactor, wherein during the stabilization period no fluorosurfactant is added. Patent Document 2 discloses a method comprising an initial period which comprises adding to the polymerization reactor: (a) aqueous medium, (b) water-soluble hydrocarbon-containing compound, (c) degradation agent, (d) fluoromonomer, and (e) polymerization initiator, wherein during the initial period no fluorosurfactant is added, and wherein the degradation agent is added prior to the polymerization initiator. Patent Document 3 discloses a method comprising adding to the polymerization reactor: aqueous medium, polymerization initiator, fluoromonomer, and hydrocarbon-containing surfactant, and passivating the hydrocarbon-containing surfactant.

Further, Patent Document 4 discloses a method for reducing thermally induced discoloration of fluoropolymer resin, the fluoropolymer resin produced by polymerizing fluoromonomer in an aqueous dispersion medium to form aqueous fluoropolymer dispersion and isolating the fluoropolymer from the aqueous medium by separating fluoropolymer resin in wet form from the aqueous medium and drying to produce fluoropolymer resin in dry form, the method comprising: exposing the fluoropolymer resin in wet or dry form to oxidizing agent.

RELATED ART

Patent Documents

Patent Document 1: National Publication of International Patent Application No. 2013-542308

Patent Document 2: National Publication of International Patent Application No. 2013-542309

Patent Document 3: National Publication of International Patent Application No. 2013-542310

Patent Document 4: National Publication of International Patent Application No. 2015-516029

SUMMARY OF THE INVENTION

Problem to be Solved by the Invention

The present disclosure provides a novel method for producing polytetrafluoroethylene using a hydrocarbon surfactant.

Means for Solving the Problem

The present disclosure relates to a method for producing polytetrafluoroethylene including a step of polymerizing tetrafluoroethylene in an aqueous medium in the presence of a hydrocarbon surfactant and a polymerization initiator to obtain a polytetrafluoroethylene and a step of adding at least one selected from the group consisting of a radical scavenger and a decomposer of the polymerization initiator after an initiation of polymerization.

At least one selected from the group consisting of the radical scavenger and the decomposer of the polymerization initiator is preferably added when the concentration of the polytetrafluoroethylene formed in the aqueous medium is 5% by mass or more.

The radical scavenger is preferably at least one selected from the group consisting of an aromatic hydroxy compound, an aromatic amine, N,N-diethylhydroxylamine, a quinone compound, a terpene, a thiocyanate, and cupric chloride ($CuCl_2$).

The decomposer of the polymerization initiator is preferably at least one selected from the group consisting of a sulfite, a bisulfite, a bromate, a diimine, a diimine salt, oxalic acid, an oxalate, a copper salt, and an iron salt.

The amount of the radical scavenger added is preferably an amount corresponding to 3 to 500% (molar basis) of a polymerization initiator concentration.

The amount of the decomposer of the polymerization initiator added is preferably an amount corresponding to 3 to 500% (molar basis) of a polymerization initiator concentration.

The polymerization initiator is preferably an oil-soluble radical polymerization initiator or a water-soluble radical polymerization initiator.

The hydrocarbon surfactant is preferably a carboxylic acid-type hydrocarbon surfactant.

In the polymerization step, tetrafluoroethylene is preferably polymerized substantially in the absence of a fluorine-containing surfactant.

The polytetrafluoroethylene is preferably stretchable.

Effects of Invention

The production method of the present disclosure is a novel method for producing polytetrafluoroethylene using a hydrocarbon surfactant.

DESCRIPTION OF EMBODIMENTS

The term "organic group" as used herein, unless otherwise specified, means a group containing one or more carbon atoms or a group obtainable by removing one hydrogen atom from an organic compound.

Examples of the "organic group" encompass an alkyl group optionally having one or more substituents, an alkenyl group optionally having one or more substituents, an alkynyl group optionally having one or more substituents, a cycloalkyl group optionally having one or more substituents, a cycloalkenyl group optionally having one or more substituents, a cycloalkazienyl group optionally having one or more substituents, an aryl group optionally having one or more substituents, an aralkyl group optionally having one or more substituents, a non-aromatic heterocyclic group optionally having one or more substituents, a heteroaryl group optionally having one or more substituents, a cyano group, a formyl group, RaO—, RaCO—, $RaSO_2$—, RaCOO—, RaNRaCO—, RaCONRa—, RaOCO—, and $RaOSO_2$—, wherein Ra is independently an alkyl group optionally having one or more substituents, an alkenyl group optionally having one or more substituents, an alkynyl group optionally having one or more substituents, a cycloalkyl group optionally having one or more substituents, a cycloalkenyl group optionally having one or more substituents, a cycloalkazienyl group optionally having one or more substituents, an aryl group optionally having one or more substituents, an aralkyl group optionally having one or more substituents, a non-aromatic heterocyclic group optionally having one or more substituents, or a heteroaryl group optionally having one or more substituents.

The organic group is preferably an alkyl group optionally having one or more substituents.

As used herein, the term "substituent" means a substitutable group unless otherwise specified. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, or a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino group having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

As used herein, the units "ppm" and "ppb" are based on mass unless otherwise specified.

Hereinafter, specific embodiments of the present disclosure will be described in detail, but the present disclosure is not limited to the following embodiment s.

A method for producing polytetrafluoroethylene [PTFE] of the present disclosure includes a step of polymerizing tetrafluoroethylene [TFE] in an aqueous medium in the presence of a hydrocarbon surfactant and a polymerization initiator to obtain polytetrafluoroethylene and a step of adding at least one selected from the group consisting of a radical scavenger and a decomposer of a polymerization initiator after the initiation of polymerization.

In the production method of the present disclosure, the standard specific gravity of the obtained PTFE can be reduced by adding at least one selected from the group consisting of a radical scavenger and a decomposer of a polymerization initiator during the polymerization of TFE using a hydrocarbon surfactant. For example, in the production method of the present disclosure, under the same polymerization conditions except that a radical scavenger or a decomposer of a polymerization initiator is added, the standard specific gravity of the obtained PTFE can be reduced as compared with the case where the radical scavenger or the decomposer of the polymerization initiator is not used. Further, stretchable PTFE can be obtained by the production method of the present disclosure.

The production method of the present disclosure includes an addition step of adding at least one selected from the group consisting of a radical scavenger and a decomposer of a polymerization initiator. The addition step is performed during the polymerization step. The radical concentration during polymerization can be adjusted by adding a radical scavenger or a decomposer of a polymerization initiator. A radical scavenger is preferable from the viewpoint of reducing the radical concentration.

The radical scavenger used may be a compound having no reinitiation ability after addition or chain transfer to a free radical in the polymerization system. Specifically, a compound that readily undergoes a chain transfer reaction with a primary radical or propagating radical and then generates a stable radical that does not react with a monomer or a compound that readily undergoes an addition reaction with a primary radical or propagating radical to generate a stable radical is used.

The activity of what is commonly referred to as a chain transfer agent is characterized by the chain transfer constant and the reinitiation efficiency, but among the chain transfer agents, those having almost 0% reinitiation efficiency are called radical scavenger.

The radical scavenger can also be said to be, for example, a compound having a chain transfer constant to TFE at the polymerization temperature larger than the polymerization rate constant and a reinitiation efficiency of substantially 0%. “Reinitiation efficiency is substantially 0%” means that the generated radicals turn the radical scavenger into stable radicals.

Preferably, the compound has a chain transfer constant (Cs) (=chain transfer rate constant (kc)/polymerization rate constant (kp)) to TFE at the polymerization temperature of 0.1 or larger, and the compound more preferably has a chain transfer constant (Cs) of 0.5 or more, still more preferably 1.0 or more, further preferably 5.0 or more, and particularly preferably 10 or more.

The radical scavenger in the present disclosure is preferably at least one selected from the group consisting of aromatic hydroxy compounds, aromatic amines, N,N-diethylhydroxylamine, quinone compounds, terpenes, thiocyanates, and cupric chloride ($CuCl_2$).

Examples of the aromatic hydroxy compound include unsubstituted phenols, polyhydric phenols, salicylic acid, m- or p-salicylic acid, gallic acid, and naphthol.

Examples of the unsubstituted phenol include o-, m-, or p-nitrophenol, o-, m-, or p-aminophenol, and p-nitrosophenol. Examples of the polyhydric phenol include catechol, resorcin, hydroquinone, pyrogallol, phloroglucin, and naphthresorcinol.

Examples of the aromatic amines include o-, m-, or p-phenylenediamine and benzidine.

Examples of the quinone compound include o-, m- or p-benzoquinone, 1,4-naphthoquinone, and alizarin.

Examples of the thiocyanate include ammonium thiocyanate ($NH_4SCN$), potassium thiocyanate (KSCN), and sodium thiocyanate (NaSCN).

The radical scavenger is preferably an aromatic hydroxy compound, more preferably an unsubstituted phenol or a polyhydric phenol, and still more preferably a hydroquinone.

The amount of the radical scavenger added is preferably an amount corresponding to 3 to 500% (molar basis) of the polymerization initiator concentration from the viewpoint of reducing the standard specific gravity. The lower limit thereof is more preferably 5% (molar basis), still more preferably 8% (molar basis), still more preferably 10% (molar basis), further more preferably 13% (molar basis) or 15% (molar basis), still further preferably 20% (molar basis), particularly preferably 25% (molar basis), particularly preferably 30% (molar basis), and particularly preferably 35% (molar basis). The upper limit thereof is more preferably 400% (molar basis), still more preferably 300% (molar basis), further more preferably 200% (molar basis), and still further preferably 100% (molar basis).

The decomposer of the polymerization initiator may be any compound capable of decomposing the polymerization initiator to be used, and for example, at least one selected from the group consisting of sulfites, bisulfites, bromates, diimine, diimine salts, oxalic acid, oxalates, copper salts, and iron salts is preferable. Examples of the sulfite include sodium sulfite and ammonium sulfite. An example of the copper salt is copper (II) sulfate and an example of the iron salt is iron(II) sulfate.

The amount of the decomposer of the polymerization initiator added is in the range of 3 to 300% by mass based on the amount of the oxidizing agent combined as a polymerization initiator (redox initiator described later). The amount thereof is preferably 3 to 150% by mass, and still more preferably 15 to 100% by mass.

The amount of the decomposer of the polymerization initiator added is preferably an amount corresponding to 3 to 500% (molar basis) of the polymerization initiator concentration from the viewpoint of reducing the standard specific gravity. The lower limit thereof is preferably 5% (molar basis), still more preferably 8% (molar basis), still more preferably 10% (molar basis), still more preferably 13% (molar basis), and further more preferably 15% (molar basis). The upper limit thereof is preferably 400% (molar basis), still more preferably 300% (molar basis), further more preferably 200% (molar basis), and still further preferably 100% (molar basis).

At least one selected from the group consisting of a radical scavenger and a decomposer of a polymerization initiator is preferably added when the concentration of PTFE formed in the aqueous medium is 5% by mass or more (concentration with respect to the total of the aqueous medium and PTFE). More preferably, it is added when the concentration thereof is 8% by mass or more, and still more preferably 10% by mass or more.

Further, it is preferable to be added when the concentration of PTFE formed in the aqueous medium is 40% by mass or less. More preferably, it is added when the concentration thereof is 35% by mass or less, and still more preferably 30% by mass or less.

The addition step may be a step of continuously adding at least one selected from the group consisting of a radical scavenger and a decomposer of a polymerization initiator.

Continuously adding at least one selected from the group consisting of a radical scavenger and a decomposer of a polymerization initiator means, for example, adding the at least one selected from the group consisting of a radical scavenger and a decomposer of a polymerization initiator not all at once, but adding over time and without interruption or adding in portions.

The production method of the present disclosure preferably includes a step of polymerizing tetrafluoroethylene in an aqueous medium in the presence of a hydrocarbon surfactant and a polymerization initiator to obtain polytetrafluoroethylene.

The polymerization temperature and the polymerization pressure in the polymerization step are determined as appropriate in accordance with the types of the monomers used, the molecular weight of the target PTFE, and the reaction rate.

For example, the polymerization temperature is preferably 5 to 150° C. The polymerization temperature is preferably 10° C. or higher, more preferably 30° C. or higher, and still more preferably 50° C. or higher.

Further, the polymerization temperature is more preferably 120° C. or lower, and still more preferably 100° C. or lower.

The polymerization pressure is preferably 0.05 to 10 MPaG. The polymerization pressure is more preferably 0.3 MPaG or more, and still more preferably 0.5 MPaG or more. The polymerization pressure is more preferably 5.0 MPaG or less, and still more preferably 3.0 MPaG or less.

In particular, from the viewpoint of improving the yield, the polymerization pressure is preferably 1.0 MPaG or more, more preferably 1.2 MPaG or more, still more preferably 1.5 MPaG or more, further more preferably 1.8 MPaG or more, and particularly preferably 2.0 MPaG or more.

In the polymerization step, the hydrocarbon surfactant is preferably added when the concentration of PTFE formed in the aqueous medium is less than 0.60% by mass. More preferably, it is when the concentration is 0.50% by mass or less, still more preferably 0.36% by mass or less, further preferably 0.30% by mass or less, still further preferably 0.20% by mass or less, particularly preferably 0.10% by mass or less, and it is most preferable to add the hydrocarbon surfactant along with the initiation of polymerization. The concentration is the concentration with respect to the total of the aqueous medium and PTFE.

Further, in the polymerization step, the amount of the hydrocarbon surfactant at the initiation of the polymerization is preferably 1 ppm or more based on the aqueous medium. The amount of the hydrocarbon surfactant at the initiation of the polymerization is preferably 10 ppm or more, more preferably 50 ppm or more, still more preferably 100 ppm or more, and further preferably 200 ppm or more. The upper limit thereof is preferably, but not limited to, 100,000 ppm, and more preferably 50,000 ppm, for example. When the amount of the hydrocarbon surfactant at the initiation of polymerization is in the above range, it is possible to obtain an aqueous dispersion having superior stability.

It can be said that the polymerization is initiated when the gas fluoromonomer in the reactor became polytetrafluoroethylene and the pressure drop in the reactor occurred. U.S. Pat. No. 3,391,099 (Punderson) discloses a dispersion polymerization of tetrafluoroethylene in an aqueous medium comprising two separate steps of a polymerization process comprising: first the formation of a polymer nucleus as a nucleation site, and then the growth step comprising polymerization of the established particles. The polymerization is usually started when both the monomer to be polymerized and the polymerization initiator are charged in the reactor.

Further, in the present disclosure, an additive related to the formation of a nucleation site is referred to as a nucleating agent.

The total amount of the hydrocarbon surfactant added is preferably 0.0001 to 10% by mass based on 100% by mass of the aqueous medium. The lower limit thereof is more preferably 0.001% by mass, still more preferably 0.005% by mass, and particularly preferably 0.01% by mass, while the upper limit thereof is more preferably 5% by mass, still more preferably 2% by mass, and particularly preferably 1% by mass. Less than 0.0001% by mass of the surfactant may cause insufficient dispersibility. More than 10% by mass of the surfactant may fail to give the effects corresponding to its amount added. The amount of the hydrocarbon surfactant added is appropriately determined depending on the type of monomer used, the molecular weight of the target polytetrafluoroethylene, and the like.

The polymerization step is a step of polymerizing tetrafluoroethylene in an aqueous medium in the presence of a hydrocarbon surfactant, and the step also preferably includes a step of continuously adding the hydrocarbon surfactant.

Adding the hydrocarbon surfactant continuously means, for example, adding the hydrocarbon surfactant not all at once, but adding over time and without interruption or adding in portions.

By including the above steps, it is possible to obtain an aqueous dispersion having superior stability.

In the step of continuously adding the hydrocarbon surfactant, the hydrocarbon surfactant is preferably started to be added to the aqueous medium when the concentration of the PTFE formed in the aqueous medium is less than 0.60% by mass. Further, the hydrocarbon surfactant is more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, particularly preferably started to be added when the concentration is 0.10% by mass or less, and most preferably started to be added when the polymerization is initiated. The concentration is the concentration with respect to the total of the aqueous medium and PTFE.

In the step of continuously adding the hydrocarbon surfactant, the amount of the hydrocarbon surfactant added is preferably 0.001 to 10% by mass based on 100% by mass of the aqueous medium. The lower limit thereof is more preferably 0.005% by mass, and still more preferably 0.01% by mass, while the upper limit thereof is more preferably 5% by mass, still more preferably 2% by mass, and particularly preferably 1% by mass.

The method for producing PTFE of the present disclosure can be efficiently performed by using at least one of the hydrocarbon surfactants. The PTFE of the present disclosure may be produced by simultaneously using two or more of the hydrocarbon surfactants, or may be produced by simultaneously using a surfactant other than the hydrocarbon surfactants, as long as the compound has volatility or may remain in a molded body or the like made of PTFE. For example, a hydrocarbon surfactant and a fluorine-containing surfactant may be used in combination.

The polymerization step may further polymerize tetrafluoroethylene in the presence of a nucleating agent.

The nucleating agent is preferably at least one selected from the group consisting of, for example, fluoropolyether, nonionic surfactant, and chain transfer agent.

In this case, the polymerization step is preferably a step of polymerizing tetrafluoroethylene in an aqueous medium in the presence of a hydrocarbon surfactant and the nucleating agent to obtain PTFE.

The fluoropolyether itself provides a polymerization field and can serve as a nucleation site.

The fluoropolyether is preferably perfluoropolyether.

The fluoropolyether preferably has a repeating unit represented by the formulas (1a) to (1d):

$$(—CFCF_3—CF_2—O—)_n \quad (1a)$$

$$(—CF_2—CF_2—CF_2—O—)_n \quad (1b)$$

$$(—CF_2—CF_2—O—)_n—(—CF_2—O—)_m \quad (1c)$$

$$(—CF_2—CFCF_3—O—)_n—(—CF_2—O—)_m \quad (1d)$$

wherein m and n are integers of 1 or more.

The fluoropolyether is preferably fluoropolyetheric acid or a salt thereof, and the fluoropolyetheric acid is preferably a carboxylic acid, a sulfonic acid, a sulfonamide, or a phosphonic acid, and more preferably a carboxylic acid. Among the fluoropolyetheric acid or a salt thereof, a salt of fluoropolyetheric acid is preferable, an ammonium salt of fluoropolyetheric acid is more preferable, and an ammonium salt of fluoropolyethercarboxylic acid is still more preferable.

The fluoropolyetheric acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

The fluoropolyether acid or its salt is preferably a compound represented by the following formula:

$CF_3$—$CF_2$—$CF_2$—O(—$CFCF_3$—$CF_2$—O—)$_n$$CFCF_3$—COOH, $CF_3$—$CF_2$—$CF_2$—O(—$CF_2$—$CF_2$—$CF_2$—O—)$_n$—$CF_2$—$CF_2$COOH, or

HOOC—$CF_2$—O(—$CF_2$—$CF_2$—O—)$_n$—(—$CF_2$—O—)$_m$$CF_2$COOH, wherein m and n are the same as above
or a salt thereof.

These structures are described in J. Appl. Polymer Sci., 57, 797(1995) examined by Kasai. As disclosed herein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyether, the other end of the molecule is usually perfluorinated, but may contain a hydrogen or chlorine atom.

Fluoropolyethers having acid groups at one or both ends have at least two ether oxygens, preferably at least four ether oxygens, and still more preferably at least six ether oxygens. Preferably, at least one fluorocarbon group separating ether oxygens, more preferably at least two of such fluorocarbon groups, has 2 or 3 carbon atoms. Still more preferably, at least 50% of the fluorocarbon groups separating ether oxygens has 2 or 3 carbon atoms. Also preferably, the fluoropolyether has at least 15 carbon atoms in total, and for example, a preferable minimum value of n or n+m in the repeating unit structure is at least 5. Two or more fluoropolyethers having an acid group at one end or both ends can be used in the methods according to the present disclosure. Typically, fluoropolyethers may contain a plurality of compounds in varying proportions within the molecular weight range relative to the average molecular weight, unless special care is taken in the production of a single specific fluoropolyether compound.

The fluoropolyether preferably has a number-average molecular weight of 800 g/mol or more. The fluoropolyether acid or the salt thereof preferably has a number-average molecular weight of less than 6,000 g/mol, because the fluoropolyether acid or the salt thereof may be difficult to disperse in an aqueous medium. The fluoropolyether acid or the salt thereof more preferably has a number-average molecular weight of 800 to 3,500 g/mol, and still more preferably 1,000 to 2,500 g/mol.

The amount of the fluoropolyether is preferably 5 to 3,000 ppm, more preferably 5 to 2,000 ppm, and the lower limit thereof is still more preferably 10 ppm, and the upper limit thereof is still more preferably 100 ppm based on the aqueous medium.

The nonionic surfactant itself provides a polymerization field and can be a nucleation site by giving a large number of low-molecular-weight fluoropolymers by chain transfer of radicals in the initial stage.

The nonionic surfactant as the nucleating agent is preferably a fluorine-free nonionic surfactant. Examples thereof include ether-type nonionic surfactants such as polyoxyethylene alkylphenyl ethers, polyoxyethylene alkyl ethers, and polyoxyethylene alkylene alkyl ethers; polyoxyethylene derivatives such as ethylene oxide/propylene oxide block copolymers; ester-type nonionic surfactant such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-type nonionic surfactants such as polyoxyethylene alkylamines and alkylalkanolamides.

In the nonionic surfactant, the hydrophobic group thereof may be any of an alkylphenol group, a linear alkyl group, and a branched alkyl group.

Examples of the nonionic surfactant include a compound represented by the following general formula (i):

$$R^3—O-A^1-H \quad (i)$$

wherein $R^3$ is a linear or branched primary or secondary alkyl group having 8 to 18 carbon atoms, and $A^1$ is a polyoxyalkylene chain. The number of carbon atoms in $R^3$ is preferably 10 to 16, and more preferably 12 to 16. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average repeating number of oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^3$ is (R')(R")HC—, where R' and R" are the same or different linear, branched, or cyclic alkyl groups, and the total amount of carbon atoms is at least 5, preferably 7 to 17. Preferably, at least one of R' or R" is a branched or cyclic hydrocarbon group.

Specific examples of the nonionic surfactant include $C_{13}H_{27}$—O—$(C_2H_4O)_{10}$—H, $C_{12}H_{25}$—O—$(C_2H_4O)_{10}$—H, $C_{10}H_{21}CH(CH_3)CH_2$—O—$(C_2H_4O)_9$—H, $C_{13}H_{27}$—O—$(C_2H_4O)_9$—$(CH(CH_3)CH_2O)$—H, $C_{16}H_{33}$—O—$(C_2H_4O)_{10}$—H, and $HC(C_5H_{11})(C_7H_{15})$—O—$(C_2H_4O)_9$—H.

Examples of commercially available products of the nonionic surfactant include Genapol X080 (product name, available from Clariant), NOIGEN TDS series (available from DKS Co., Ltd.) exemplified by NOIGEN TDS-80 (trade name), LEOCOL TD series (available from Lion Corp.) exemplified by LEOCOL TD-90 (trade name), LIONOL® TD series (available from Lion Corp.), T-Det A series (available from Harcros Chemicals Inc.) exemplified by T-Det A 138 (trade name), and TERGITOL® 15 S series (available from Dow Chemical Co., Ltd.).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, available from Dow Chemical Co., Ltd.).

The hydrophobic group of the nonionic surfactant may be any of an alkylphenol group, a linear alkyl group, and a branched alkyl group.

Examples of the nonionic surfactant include a polyoxyethylene alkylphenyl ether-based nonionic compound represented by the following general formula (ii):

$$R^4—C_6H_4—O\text{-}A^2\text{-}H \quad \text{(ii)}$$

wherein $R^4$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton X-100 (trade name, available from Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compound include glycosides, sugar esters, sorbitan esters, and mixtures and combinations thereof.

A preferred type of polyol compounds are alkyl or modified alkyl glucosides. These type of surfactants contains at least one glucose moiety.

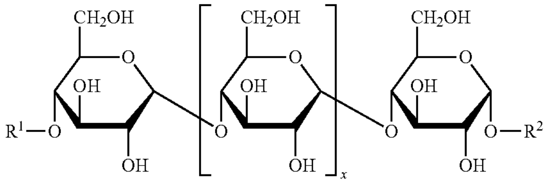

wherein x represents 0, 1, 2, 3, 4, or 5 and $R^1$ and $R^2$ each independently represent H or a long chain unit containing at least 6 carbon atoms, with the proviso that at least one of $R^1$ or $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polyglycoside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF Corporation as Pluronic® R series, and tridecyl alcohol alkoxylates supplied from BASF Corporation as Iconol® TDA series.

The nonionic surfactant is preferably at least one selected from the group consisting of a nonionic surfactant represented by the general formula (i) and a nonionic surfactant represented by the general formula (ii), and more preferably a nonionic surfactant represented by the general formula (i).

The nonionic surfactant is preferably free from an aromatic moiety.

The amount of the nonionic surfactant is preferably 0.1 to 0.0000001% by mass, more preferably 0.01 to 0.000001% by mass, based on the aqueous medium.

The chain transfer agent can be a nucleation site by giving a large number of low-molecular-weight fluoropolymers by chain transfer of radicals in the initial stage.

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the following general formula:

$R^aI_xBr_y$ wherein x and y are each an integer of 0 to 2 and satisfy $1 \le x+y \le 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, CFBrClCFClBr, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, at least one selected from the group consisting of alkanes and alcohols is preferable from the viewpoints of polymerization reactivity, crosslinkablility, availability, and the like. The number of carbon atoms of the alkane is preferably 1 to 6, and more preferably 1 to 5. Further, the number of carbon atoms of the alcohol is preferably 1 to 5, and more preferably 1 to 4. In particularly, the chain transfer agent is preferably at least one selected from the group consisting of methane, ethane, propane, isobutane, methanol, ethanol, and isopropanol.

The amount of the chain transfer agent is preferably 0.001 to 10,000 ppm based on the aqueous medium. The amount of the chain transfer agent is more preferably 0.01 ppm or more, still more preferably 0.05 ppm or more, and particularly preferably 0.1 ppm or more based on the aqueous medium. Further, the amount of the chain transfer agent is more preferably 1,000 ppm or less, still more preferably 500 ppm or less, and particularly preferably 100 ppm or less based on the aqueous medium.

In the polymerization step, a nucleating agent is preferably added to the aqueous medium before the polymerization reaction is initiated or before the polymerization reaction proceeds and the concentration of PTFE in the aqueous dispersion reaches 5.0% by mass. By adding a nucleating agent at the initial stage of polymerization, more particles can be generated during polymerization, and further, primary particles having a smaller average primary particle size and aspect ratio can be obtained. That is, the nucleating agent may be added before the initiation of polymerization, may be added at the same time as the initiation of polymerization, or may be added during the period in which the nuclei of the PTFE particles are formed after polymerization is initiated.

The time to add the nucleating agent is before the initiation of polymerization or before the polymerization reaction proceeds and the concentration of PTFE in the aqueous dispersion reaches 5.0% by mass, preferably before the initiation of polymerization or before the concentration of PTFE reaches 3.0% by mass, more preferably before the initiation of polymerization or before the concentration of PTFE reaches 1.0% by mass, still more preferably before the initiation of polymerization or before the concentration of PTFE reaches 0.5% by mass, particularly preferably before the initiation of polymerization or at the same time as the initiation of polymerization.

The amount of nucleating agent to be added is preferably 0.001 to 5,000 ppm based on the resulting PTFE since even more particles can be generated during polymerization and primary particles having a smaller average primary particle size are obtained. The lower limit of the amount of the nucleating agent is 0.01 ppm, 0.05 ppm, and 0.1 ppm in the order of preference. The upper limit of the amount of the nucleating agent is 2,000 ppm, 1,000 ppm, 500 ppm, 100 ppm, 50 ppm, and 10 ppm in the order of preference.

Further, in the production method of the present disclosure, in addition to the hydrocarbon surfactant and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the PTFE dispersion after polymerization of PTFE, and does not serve as a contaminating component.

The polymerization of the production method may be performed by charging a polymerization reactor with an aqueous medium, the hydrocarbon surfactant, tetrafluoroethylene, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the surfactant may additionally be added depending on the purpose. The hydrocarbon surfactant may be added after the polymerization reaction is initiated.

In the production method of the present disclosure, the polymerization is performed in the presence of a polymerization initiator. Usually, the polymerization is initiated by the presence of both the tetrafluoroethylene and the polymerization initiator to be subjected to the reaction in the polymerization system. The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target PTFE, and the reaction rate. The polymerization initiator may be added before the hydrocarbon surfactant is added, or may be added after the hydrocarbon surfactant is added.

The polymerization initiator to be used is preferably an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl) peroxide, di(ω-hydro-tetradecafluoroheptanoyl) peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl) peroxide, di(co-chloro-hexafluorobutyryl) peroxide, di(co-chloro-decafluorohexanoyl) peroxide, di(co-chloro-tetradecafluorooctanoyl) peroxide, ω-hydro-dodecafluoroheptanoyl-ω-hydrohexadecafluorononanoyl-peroxide, ω-chloro-hexafluorobutyryl-co-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid and percarbonic acid; organic peroxides such as disuccinic acid peroxide and diglutaric acid peroxide; and t-butyl permaleate and t-butyl hydroperoxide. A reducing agent such as a sulfite or a sulfurous acid salt may be contained together, and the amount thereof may be 0.1 to 20 times the amount of the peroxide.

For example, in a case where the polymerization is performed at a low temperature of 30° C. or lower, the polymerization initiator used is preferably a redox initiator obtained by combining an oxidizing agent and a reducing agent.

Examples of the oxidizing agent include persulfates, organic peroxides, potassium permanganate, manganese triacetate, ammonium cerium nitrate, and bromate.

Examples of the reducing agent include sulfites, bisulfites, bromates, diimines, and oxalic acid.

Examples of the persulfates include ammonium persulfate and potassium persulfate.

Examples of the sulfite include sodium sulfite and ammonium sulfite.

In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron (II) sulfate, ammonium persulfate/sulfite/iron (II) sulfate, ammonium persulfate/sulfite, ammonium persulfate/iron (II) sulfate, manganese triacetate/oxalic acid, ammonium cerium nitrate/oxalic acid, bromate/sulfite, and bromate/bisulfite, and potassium permanganate/oxalic acid or ammonium persulfate/sulfite/iron (II) sulfate is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto. The polymerization initiator may be added in any amount, and the initiator in an amount that does not significantly decrease the polymerization rate (e.g., several parts per million in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces. More specifically, the amount of the polymerization initiator added is preferably 1 ppm or more, more preferably 10 ppm or more, and still more preferably 50 ppm or more based on the aqueous medium. The amount of the polymerization initiator added is preferably 100,000 ppm or less, more preferably 10,000 ppm or less, and still more preferably 5,000 ppm or less.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

Specific hydrocarbon surfactants will be described below.

Hydrocarbon surfactants have hydrophilic and hydrophobic moieties on the same molecule. These may be cationic, nonionic or anionic. The hydrocarbon surfactant is preferably a nonionic hydrocarbon surfactant or an anionic hydrocarbon surfactant.

Cationic hydrocarbon surfactants usually have a positively charged hydrophilic moiety such as alkylated ammonium halide such as alkylated ammonium bromide and a hydrophobic moiety such as long chain fatty acids.

Anionic hydrocarbon surfactants usually have a hydrophilic moiety such as a carboxylate, a sulfonate or a sulfate and a hydrophobic moiety that is a long chain hydrocarbon moiety such as alkyl.

Nonionic hydrocarbon surfactants are usually free from charged groups and have hydrophobic moieties that are long chain hydrocarbons. The hydrophilic moiety of the nonionic hydrocarbon surfactant contains water-soluble functional groups such as chains of ethylene ether derived from polymerization with ethylene oxide.

Examples of nonionic hydrocarbon surfactants Polyoxyethylene alkyl ether, polyoxyethylene alkyl phenyl ether, polyoxyethylene alkyl ester, sorbitan alkyl ester, polyoxyethylene sorbitan alkyl ester, glycerol ester, polyoxyethylene, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether, and the like.

Specific examples of polyoxyethylene alkyl phenyl ether: polyoxyethylene nonylphenyl ether, polyoxyethylene octylphenyl ether, and the like.

Specific examples of polyoxyethylene alkyl esters: polyethylene glycol monolaurylate, polyethylene glycol monooleate, polyethylene glycol monostearate, and the like.

Specific examples of sorbitan alkyl ester: polyoxyethylene sorbitan monolaurylate, polyoxyethylene sorbitan monopalmitate, polyoxyethylene sorbitan monostearate, polyoxyethylene sorbitan monooleate, and the like.

Specific examples of polyoxyethylene sorbitan alkyl ester: polyoxyethylene sorbitan monolaurylate, polyoxyethylene sorbitan monopalmitate, polyoxyethylene sorbitan monostearate, and the like.

Specific examples of glycerol ester: glycerol monomyristate, glycerol monostearate, glycerol monooleate, and the like.

Specific examples of the above derivatives: polyoxyethylene alkylamine, polyoxyethylene alkylphenyl-formaldehyde condensate, polyoxyethylene alkyl ether phosphate, polyoxyethylene derivatives, and the like.

Specific examples of the polyoxyethylene derivatives: ethylene oxide/propylene oxide block copolymers and the like.

The nonionic hydrocarbon surfactants such as ethers and esters may have an HLB value of 10 to 18.

Examples of nonionic hydrocarbon surfactants include Triton® X series (X15, X45, X100, etc.), Tergitol® 15-S series, and Tergitol® TMN series (TMN-6, TMN-10, TMN-100, etc.), Tergitol® L series manufactured by Dow Chemical Co., Ltd., Pluronic® R series (31R1, 17R2, 10R5, 25R4 (m to 22, n to 23), T-Det series (A138), and Iconol® TDA series (TDA-6, TDA-9, TDA-10) manufactured by BASF.

The nonionic hydrocarbon surfactant used may also be any of the nonionic surfactants exemplified as the nucleating agent.

Examples of the anionic hydrocarbon surfactant include Versatic® 10 manufactured by Resolution Performance Products, and Avanel S series (S-70, S-74, etc.) manufactured by BASF.

Examples of the anionic hydrocarbon surfactant include an anionic surfactant represented by $R\text{-}L\text{-}M^1$, wherein R is a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4^-$, $—PO_3^-$ or $—COO^-$, and, $M^1$ is, H, a metal atom, $NR^5_4$, where each $R^5$ may be the same or different and are H or an organic group having 1 to 10 carbon atoms, imidazolium optionally having a substituent, pyridinium optionally having a substituent, or phosphonium optionally having a substituent; and $—ArSO_3^-$ is an aryl sulfonate.

Specific examples thereof include a compound represented by $CH_3—(CH_2)_n\text{-}L\text{-}M^1$, wherein n is an integer of 6 to 17, as represented by lauryl acid and lauryl sulfate (dodecyl sulfate). L and $M^1$ are the same as described above.

Mixtures of those in which R is an alkyl group having 12 to 16 carbon atoms and $L\text{-}M^1$ is a sulfate can also be used.

Examples of the anionic hydrocarbon surfactant include an anionic surfactant represented by $R^6$ $(\text{-}L\text{-}M^1)_2$, wherein $R^6$ is a linear or branched alkylene group having 1 or more carbon atoms and optionally having a substituent, or a cyclic alkylene group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4^-$, $—PO_3^-$ or $—COO^-$, and, $M^1$ is, H, a metal atom, $NR^5_4$, where each $R^5$ may be the same or different and are H or an organic group having 1 to 10 carbon atoms, imidazolium optionally having a substituent, pyridinium optionally having a substituent, or phosphonium optionally having a substituent; and $—ArSO_3^-$ is an aryl sulfonate.

Examples of the anionic hydrocarbon surfactant include an anionic surfactant represented by $R^8$ $(\text{-}L\text{-}M^1)$ 3, wherein $R^8$ is a linear or branched alkylidine group having 1 or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4^-$, $—PO_3^-$ or $—COO^-$, and, $M^1$ is, H, a metal atom, $NR^5_4$, where each $R^5$ may be the same or different and are H or an organic group having 1 to 10 carbon atoms, imidazolium optionally having a substituent, pyridinium optionally having a substituent, or phosphonium optionally having a substituent; and $—ArSO_3^-$ is an aryl sulfonate.

$R^5$ is preferably H or an alkyl group, more preferably H or an alkyl group having 1 to 10 carbon atoms, and still more preferably H or an alkyl group having 1 to 4 carbon atoms.

Examples of the hydrocarbon surfactant include a siloxane hydrocarbon surfactant. Examples of the siloxane hydrocarbon surfactant include those described in Silicone Surfactants, R. M. Hill, Marcel Dekker, Inc., ISBN: 0-8247-00104. The structure of the siloxane hydrocarbon surfactant includes distinct hydrophobic and hydrophilic moieties. The hydrophobic moiety contains one or more dihydrocarbyl siloxane units, where the substituents on the silicone atoms are completely hydrocarbon.

In the sense that the carbon atoms of the hydrocarbyl groups are fully substituted with hydrogen atoms where they can be substituted by halogen such as fluorine, these siloxane hydrocarbon surfactants can also be regarded as hydrocarbon surfactants, i.e. the monovalent substituents on the carbon atoms of the hydrocarbyl groups are hydrogen.

The hydrophilic moiety of the siloxane hydrocarbon surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxides, betaine, betaine copolyol, or quaternary ammonium salts. Ionic hydrophobic moieties may also contain ionically functionalized siloxane grafts.

Examples of such siloxane hydrocarbon surfactants include polydimethylsiloxane-graft-(meth)acrylic acid salts, polydimethylsiloxane-graft-polyacrylate salts, and polydimethylsiloxane-grafted quaternary amines.

The polar moieties of the hydrophilic moiety of the siloxane hydrocarbon surfactant may contain nonionic groups formed by polyethers, such as polyethylene oxide (PEO), and mixed polyethylene oxide/polypropylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/polypropylene oxide polyethers.

The hydrophilic moiety of the siloxane hydrocarbon surfactant may also contain a combination of ionic and nonionic moieties. Such moieties include, for example, ionically end-functionalized or randomly functionalized polyether or polyol. Preferred for carrying out the present invention is a siloxane having a nonionic moiety, i.e., a nonionic siloxane hydrocarbon surfactant.

The arrangement of the hydrophobic and hydrophilic moieties of the structure of a siloxane hydrocarbon surfactant may take the form of a diblock polymer (AB), triblock polymer (ABA), wherein the "B" represents the siloxane portion of the molecule, or a multi-block polymer. Alternatively, the siloxane surfactant may contain a graft polymer.

The siloxane hydrocarbon surfactants also include those disclosed in U.S. Pat. No. 6,841,616.

Examples of the siloxane-based anionic hydrocarbon surfactant include Noveon® by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol® K8300 by Akzo Nobel Surface Chemistry LLC.

Examples of the sulfosuccinate hydrocarbon surfactant include sodium diisodecyl sulfosuccinate (Emulsogen® SB10 by Clariant) and sodium diisotridecyl sulfosuccinate (Polirol® TR/LNA by Cesapinia Chemicals).

Examples of the hydrocarbon surfactants also include PolyFox® surfactants by Omnova Solutions, Inc. (PolyFox™ PF-156A, PolyFox™ PF-136A, etc.).

The hydrocarbon surfactant is preferably an anionic hydrocarbon surfactant. The anionic hydrocarbon surfactant used may be those described above, including the following preferred anionic hydrocarbon surfactants.

Examples of the anionic hydrocarbon surfactant include a compound (α) represented by the following formula (α):

$$R^{100}\text{—COOM} \quad (\alpha)$$

wherein $R^{100}$ is a monovalent organic group containing 1 or more carbon atoms; and M is H, a metal atom, $NR^{101}4$, imidazolium optionally having a substituent, pyridinium optionally having a substituent, or phosphonium optionally having a substituent, wherein $R^{101}$ is H or an organic group and may be the same or different. The organic group for $R^{101}$ is preferably an alkyl group. $R^{101}$ is preferably H or an organic group having 1 to 10 carbon atoms, more preferably H or an organic group having 1 to 4 carbon atoms, and still more preferably H or an alkyl group having 1 to 4 carbon atoms.

From the viewpoint of surfactant function, the number of carbon atoms in $R^{100}$ is preferably 2 or more, and more preferably 3 or more. From the viewpoint of water-solubility, the number of carbon atoms in $R^{100}$ is preferably 29 or less, and more preferably 23 or less.

Examples of the metal atom as M include alkali metals (Group 1) and alkaline earth metals (Group 2), and preferred is Na, K, or Li. M is preferably H, a metal atom, or $NR^{101}_4$, more preferably H, an alkali metal (Group 1), an alkaline earth metal (Group 2), or $NR^{101}_4$, still more preferably H, Na, K, Li, or $NH_4$, further preferably Na, K, or $NH_4$, particularly preferably Na or $NH_4$, and most preferably $NH_4$.

Examples of the compound (α) include an anionic surfactant represented by $R^{102}$—COOM, wherein $R^{102}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{102}$ optionally contains a monovalent or divalent heterocycle, or optionally forms a ring; and M is as described above. Specific examples thereof include a compound represented by $CH_3$—$(CH_2)_n$—COOM, wherein n is an integer of 2 to 28, and M is as described above.

From the viewpoint of emulsion stability, the compound (α) is preferably free from a carbonyl group which is not in a carboxyl group.

Preferred examples of the hydrocarbon-containing surfactant free from a carbonyl group include a compound represented by the following formula (A):

$$R^{103}\text{—COO-M} \quad (A)$$

wherein $R^{103}$ is an alkyl group, an alkenyl group, an alkylene group, or an alkenylene group containing 6 to 17 carbon atoms, each of which optionally contains an ether bond; M is H, a metal atom, $NR^{101}_4$, imidazolium optionally having a substituent, pyridinium optionally having a substituent, or phosphonium optionally having a substituent; and $R^{101}$ is the same or different and is H or an organic group.

In the formula (A), $R^{103}$ is preferably an alkyl group or an alkenyl group, each of which optionally contains an ether group. The alkyl group or alkenyl group for $R^{103}$ may be linear or branched. The number of carbon atoms in $R^{103}$ may be, but is not limited to, 2 to 29.

When the alkyl group is linear, the number of carbon atoms in $R^{103}$ is preferably 3 to 29, and more preferably 5 to 23. When the alkyl group is branched, the number of carbon atoms in $R^{103}$ is preferably 5 to 35, and more preferably 11 to 23.

When the alkenyl group is linear, the number of carbon atoms in $R^{103}$ is preferably 2 to 29, and more preferably 9 to 23. When the alkenyl group is branched, the number of carbon atoms in $R^{103}$ is preferably 4 to 29, and more preferably 9 to 23.

Examples of the alkyl group and alkenyl group include a methyl group, an ethyl group, an isobutyl group, a t-butyl group, and a vinyl group.

Examples of the compound (α) (carboxylic acid-type hydrocarbon surfactant) include butylic acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof.

Particularly, preferred is at least one selected from the group consisting of lauric acid, capric acid, myristic acid, pentadecylic acid, palmitic acid, and salts thereof.

Examples of the salts include, but are not limited to, those in which hydrogen of the carboxyl group is a metal atom, $NR^{101}_4$, imidazolium optionally having a substituent, pyridinium optionally having a substituent, or phosphonium optionally having a substituent as M in the formula described above.

The surfactant (α) (carboxylic acid-type hydrocarbon surfactant) is preferably at least one selected from the group consisting of lauric acid, capric acid, myristic acid, pentadecylic acid, palmitic acid, and salts thereof, still more preferably lauric acid and salts thereof, particularly preferably lauric acid salts, and most preferably sodium laurate and ammonium laurate, because particles having a small average primary particle size can be obtained by polymerization, a large number of particles can be generated during polymerization to efficiently produce polytetrafluoroethylene.

Preferred examples of the hydrocarbon surfactant include a surfactant represented by the following general formula (1) (hereinafter referred to as surfactant (1)):

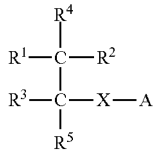

wherein $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$;

X is the same or different at each occurrence and represents a divalent linking group or a bond;

A is the same or different at each occurrence and represents —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group; and Y is the same or different at each occurrence and represents a divalent linking group selected from the group consisting of —S(═O)$_2$—, —O—, —COO—, —OCO—, —CONR$^8$—, and —NR$^8$CO—, or a bond, wherein $R^8$ is H or an organic group;

$R^6$ is the same or different at each occurrence and represents an alkyl group having 1 or more carbon atoms optionally containing, between carbon atoms, at least one selected from the group consisting of a carbonyl group, an ester group, an amide group, and a sulfonyl group; and any two of $R^1$ to $R^5$ optionally bind to each other to form a ring.

The surfactant (1) will be described.

In the formula, $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$. Any two of $R^1$ to $R^5$ optionally bind to each other to form a ring.

The substituent which may be contained in the alkyl group for $R^1$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^1$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^1$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—$CH_3$) or an ethyl group (—$C_2H_5$), and most preferably a methyl group (—$CH_3$).

The monovalent substituent is preferably a group represented by the general formula: —Y—$R^6$, a group represented by the general formula: —X-A, —H, and an alkyl group having 1 to 20 carbon atoms and optionally having a substituent, —$NH_2$, —NHR$^9$ (wherein $R^9$ is an organic group), —OH, —COOR$^9$ (wherein $R^9$ is an organic group) or —OR$^9$ ($R^9$ is an organic group). The alkyl group preferably has 1 to 10 carbon atoms.

$R^9$ is preferably an alkyl group having 1 to 10 carbon atoms or an alkylcarbonyl group having 1 to 10 carbon atoms, and more preferably an alkyl group having 1 to 4 carbon atoms or an alkylcarbonyl group having 1 to 4 carbon atoms.

In the formula, X is the same or different at each occurrence and represents a divalent linking group or a bond.

When $R^6$ does not contain none of a carbonyl group, an ester group, an amide group, and a sulfonyl group, X is preferably a divalent linking group containing at least one selected from the group consisting of a carbonyl group, an ester group, an amide group, and a sulfonyl group.

X is preferably a divalent linking group containing at least one bond selected from the group consisting of —CO—, —S(═O)$_2$—, —O—, —COO—, —OCO—, —S(═O)$_2$—O—, —O—S(═O)$_2$—, —CONR$^8$—, and —NR$^8$CO—, a $C_{1-10}$ alkylene group, or a bond. $R^8$ represents H or an organic group.

The alkyl group is preferable as the organic group in $R^8$. $R^8$ is preferably H or an organic group having 1 to 10 carbon atoms, more preferably H or an organic group having 1 to 4 carbon atoms, still more preferably H or an alkyl group having 1 to 4 carbon atoms, and further preferably H.

In the formula, A is the same or different at each occurrence and represents —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group; and the four $R^7$ may be the same as or different from each other. In a preferred embodiment, in the general formula (1), A is —COOM.

The alkyl group is preferable as the organic group in $R^7$. $R^7$ is preferably H or an organic group having 1 to 10 carbon atoms, more preferably H or an organic group having 1 to 4 carbon atoms, and still more preferably H or an alkyl group having 1 to 4 carbon atoms.

Examples of the metal atom include alkali metals (Group 1) and alkaline earth metals (Group 2), and preferred is Na, K, or Li.

M is preferably H, a metal atom, or $NR^7_4$, more preferably H, an alkali metal (Group 1), an alkaline earth metal (Group 2), or $NR^7_4$, still more preferably H, Na, K, Li, or $NH_4$, further preferably Na, K, or $NH_4$, particularly preferably Na or $NH_4$, and most preferably $NH_4$.

In the formula, Y is the same or different at each occurrence and represents a divalent linking group selected from the group consisting of —S(=O)$_2$—, —O—, —COO—, —OCO—, —CONR$^8$—, and —NR$^8$CO—, or a bond, wherein $R^8$ is H or an organic group.

Y is preferably a divalent linking group selected from the group consisting of a bond, —O—, —COO—, —OCO—, —CONR$^8$—, and —NR$^8$CO—, more preferably a divalent linking group selected from the group consisting of a bond, —COO—, and —OCO—.

The alkyl group is preferable as the organic group in $R^8$. $R^8$ is preferably H or an organic group having 1 to 10 carbon atoms, more preferably H or an organic group having 1 to 4 carbon atoms, still more preferably H or an alkyl group having 1 to 4 carbon atoms, and further preferably H.

In the formula, $R^6$ is the same or different at each occurrence and represents an alkyl group having 1 or more carbon atoms optionally containing, between carbon atoms, at least one selected from the group consisting of a carbonyl group, an ester group, an amide group, and a sulfonyl group. The number of carbon atoms of the organic group in $R^6$ is preferably 2 or more, preferably 20 or less, more preferably 2 to 20, and still more preferably 2 to 10.

When the number of carbon atoms is 2 or more, the alkyl group for $R^6$ optionally contains, between carbon atoms, one or two or more of at least one selected from the group consisting of a carbonyl group, an ester group, an amide group, and a sulfonyl group, but the alkyl group contains no such groups at both ends. In the alkyl group for $R^6$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^6$ is preferably a group represented by the general formula: —R$^{10}$—CO—R″, a group represented by the general formula: —R$^{10}$—COO—R$^{11}$, a group represented by the general formula: —R$^{11}$, a group represented by the general formula: —R$^{10}$—NR$^8$CO—R$^{11}$, or a group represented by the general formula: —R$^{10}$—CONR$^8$—R$^{11}$, wherein $R^8$ is H or an organic group; $R^{10}$ is an alkylene group; and $R^{11}$ is an alkyl group optionally having a substituent.

$R^6$ is more preferably a group represented by the general formula: —R$^{10}$—CO—R$^{11}$.

The alkyl group is preferable as the organic group in $R^8$. $R^8$ is preferably H or an organic group having 1 to 10 carbon atoms, more preferably H or an organic group having 1 to 4 carbon atoms, still more preferably H or an alkyl group having 1 to 4 carbon atoms, and further preferably H.

The alkylene group for $R^{10}$ preferably has 1 or more, and more preferably 3 or more carbon atoms, and preferably 20 or less, more preferably 12 or less, still more preferably 10 or less, and particularly preferably 8 or less carbon atoms. Further, the alkylene group for $R^{10}$ preferably has 1 to 20, more preferably 1 to 10, and still more preferably 3 to 10 carbon atoms.

The alkyl group for $R^{11}$ may have 1 to 20 carbon atoms, and preferably has 1 to 15, more preferably 1 to 12, still more preferably 1 to 10, further preferably 1 to 8, still further preferably 1 to 6, still much more preferably 1 to 3, particularly preferably 1 or 2, and most preferably 1 carbon atom. The alkyl group for $R^{11}$ preferably consists only of primary carbons, secondary carbons, and tertiary carbons, and particularly preferably consists only of primary carbons and secondary carbons. In other words, $R^{11}$ is preferably a methyl group, an ethyl group, an n-propyl group, or an isopropyl group, and most preferably a methyl group.

In a preferred embodiment, in the general formula (1), at least one of $R^2$ and $R^5$ is a group represented by the general formula: —X-A, and A is —COOM.

The surfactant (1) is preferably a compound represented by the general formula (1-1), a compound represented by the general formula (1-2), or a compound represented by the general formula (1-3), more preferably a compound represented by the general formula (1-1) or a compound represented by the general formula (1-2):

General Formula (1-1)

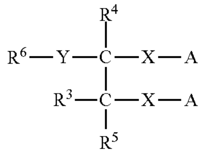

wherein $R^3$ to $R^6$, X, A, and Y are defined as described above.

General Formula (1-2)

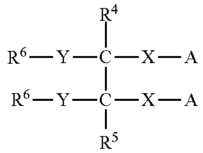

wherein $R^4$ to $R^6$, X, A, and Y are defined as described above.

General Formula (1-3)

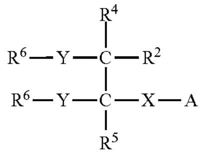

wherein $R^2$, $R^4$ to $R^6$, X, A, and Y are defined as described above.

The group represented by the general formula: —X-A is preferably

—COOM,

—R$^{12}$COOM,

—SO$_3$M,

—OSO$_3$M, —R$^{12}$SO$_3$M,

—R$^{12}$OSO$_3$M,

—OCO—R$^{12}$—COOM,

—OCO—$R^{12}$—$SO_3M$,
—OCO—$R^{12}$—$OSO_3M$
—COO—$R^{12}$—COOM,
—COO—$R^{12}$—$SO_3M$,
—COO—$R^{12}$—$OSO_3M$,
—$CONR^8$—$R^{12}$—COOM,
—$CONR^8$—$R^{12}$—$SO_3M$,
—$CONR^8$—$R^{12}$—$OSO_3M$,
—$NR^8CO$—$R^{12}$—COOM,
—$NR^8CO$—$R^{12}$—$SO_3M$,
—$NR^8CO$—$R^{12}$—$OSO_3M$,
—$OS(=O)_2$—$R^{12}$—COOM,
$OS(=O)_2$—$R^{12}$—$SO_3M$, or
$OS(=O)_2$—$R^{12}$—$OSO_3M$, wherein $R^8$ and M are defined as described above; and $R^{12}$ is an alkylene group having 1 to 10 carbon atoms.

In the alkylene group for $R^{12}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free of halogen atoms such as fluorine atoms and chlorine atoms.

The group represented by the general formula: —Y—$R^6$ is preferably a group represented by the general formula: —$R^{10}$—CO—R″,
a group represented by the general formula: —OCO—$R^{10}$—CO—$R^{11}$,
a group represented by the general formula: —COO—$R^{10}$—CO—$R^{11}$,
a group represented by the general formula: —OCO—$R^{10}$—COO—$R^{11}$,
a group represented by the general formula: —COO—$R^{11}$,
a group represented by the general formula: —$NR^8CO$—$R^{10}$—CO—$R^{11}$, or
a group represented by the general formula: —$CONR^8$—$R^{10}$—$NR^8CO$—$R^{11}$, wherein $R^8$, $R^{10}$, and $R^{11}$ are as described above.

In the formula, $R^4$ and $R^5$ are each independently preferably H or an alkyl group having 1 to 4 carbon atoms.

In the alkyl group for $R^4$ and $R^5$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^3$ in the general formula (1-1) is preferably H or an alkyl group having 1 to 20 carbon atoms and optionally having a substituent, more preferably H or an alkyl group having 1 to 20 carbon atoms and having no substituent, and still more preferably H.

In the alkyl group for $R^3$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^2$ in the general formula (1-3) is preferably H, OH, or an alkyl group having 1 to 20 carbon atoms and optionally having a substituent, more preferably H, OH, or an alkyl group having 1 to 20 carbon atoms and having no substituent, and still more preferably H or OH.

In the alkyl group for $R^2$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

Examples of the hydrocarbon surfactant include a surfactant (1-0A) represented by the following formula (1-0A):

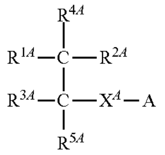

wherein $R^{1A}$ to $R^{5A}$ are H, a monovalent hydrocarbon group optionally containing, between carbon atoms, an ester group, or a group represented by general formula: —$X^A$-A, with the proviso that at least one of $R^{2A}$ or $R^{5A}$ represents a group represented by the general formula: —$X^A$-A;

$X^A$ is the same or different at each occurrence and represents a divalent hydrocarbon group or a bond;

A is the same or different at each occurrence and represents —COOM, wherein M is H, a metal atom, $NR^7_4$, imidazolium optionally having a substituent, pyridinium optionally having a substituent, or phosphonium optionally having a substituent, wherein $R^7$ is H or an organic group; and any two of $R^{1A}$ to $R^{5A}$ may be bonded to each other to form a ring.

In the general formula (1-0A), in $R^{1A}$ to $R^{5A}$, the monovalent hydrocarbon group optionally containing, between carbon atoms, an ester group preferably has 1 to 50 carbon atoms, and more preferably 5 to 20 carbon atoms. Any two of $R^{1A}$ to $R^{5A}$ optionally bind to each other to form a ring. The monovalent hydrocarbon group optionally containing, between carbon atoms, an ester group is preferably an alkyl group.

In the formula, in $X^A$, the divalent hydrocarbon group preferably has 1 to 50 carbon atoms, and more preferably 5 to 20 carbon atoms. Examples of the divalent hydrocarbon group include an alkylene group and an alkanediyl group, and preferred is an alkylene group.

In the general formula (1-0A), any one of $R^{2A}$ and $R^{5A}$ is preferably a group represented by the general formula: —$X^A$-A, and more preferably, $R^{2A}$ is a group represented by the general formula: —$X^A$-A.

In a preferred embodiment, in the general formula (1-0A), $R^{2A}$ is a group represented by the general formula: —$X^A$-A, and $R^{1A}$, $R^{3A}$, $R^{4A}$ and $R^{5A}$ are H. In this case, $X^A$ is preferably a bond or an alkylene group having 1 to 5 carbon atoms.

Another preferred embodiment is an embodiment in which in general formula (1-0A), $R^{2A}$ is a group represented by general formula: —$X^A$-A, $R^{1A}$ and $R^{3A}$ are groups represented by —$Y^A$—$R^6$, $Y^A$ is the same or different at each occurrence, and is —COO—, —OCO—, or a bond, and $R^6$ is the same or different at each occurrence, and is an alkyl group having 1 or more carbon atoms. In this case, it is preferable that $R^{4A}$ and $R^{5A}$ are H.

Examples of the hydrocarbon surfactant represented by the general formula (1-0A) include glutaric acid or a salt thereof, adipic acid or a salt thereof, pimelic acid or a salt thereof, suberic acid or a salt thereof, azelaic acid or a salt thereof, and sebacic acid or a salt thereof.

The aliphatic carboxylic acid-type hydrocarbon surfactant represented by the general formula (1-0A) may be a 2-chain 2-hydrophilic group-type synthetic surfactant, and examples of the gemini type surfactant include geminiserf (CHUKYO YUSHI CO., LTD.), Gemsurf α142 (carbon number: 12, lauryl group), Gemsurf α102 (carbon number: 10), and Gemsurf α182 (carbon number: 14).

Examples of the hydrocarbon surfactant also include a hydrocarbon surfactant having one or more carbonyl groups which are not in a carboxyl group.

Further, a hydrocarbon surfactant obtained by subjecting the hydrocarbon surfactant having one or more carbonyl groups which are not in a carboxyl group to a radical treatment or an oxidation treatment may also be used.

Further, a hydrocarbon surfactant obtained by subjecting the hydrocarbon surfactant to a radical treatment or an oxidation treatment can also be used as the hydrocarbon surfactant.

The radical treatment may be any treatment that generates radicals in the hydrocarbon surfactant or a hydrocarbon surfactant having one or more carbonyl groups which are not in carboxyl group, for example, a treatment in which deionized water and the hydrocarbon surfactant are added to the reactor, the reactor is hermetically sealed, the inside of the reactor is replaced with nitrogen, the reactor is heated and pressurized, a polymerization initiator is charged, the reactor is stirred for a certain time, and then the reactor is depressurized to the atmospheric pressure, and the reactor is cooled. The oxidation treatment is a treatment in which an oxidizing agent is added to the hydrocarbon surfactant or a hydrocarbon surfactant having one or more carbonyl groups which are not in a carboxyl group. Examples of the oxidizing agent include oxygen, ozone, hydrogen peroxide solution, manganese(IV) oxide, potassium permanganate, potassium dichromate, nitric acid, and sulfur dioxide. In order to promote the radical treatment or the oxidation treatment, the radical treatment or the oxidation treatment may be performed in a pH-adjusted aqueous solution. The pH of the aqueous solution for radical treatment or oxidation treatment is preferably less than 7, and the pH of the aqueous solution can be adjusted by using, for example, sulfuric acid, nitric acid, hydrochloric acid or the like.

The polymerization step preferably includes a step of continuously adding a hydrocarbon surfactant having one or more carbonyl groups which are not in a carboxyl group and particularly preferably includes a step of continuously adding a hydrocarbon surfactant obtained by subjecting the hydrocarbon surfactant having one or more carbonyl groups which are not in a carboxyl group to a radical treatment or an oxidation treatment. In the step of continuously adding the hydrocarbon surfactant, the amount of the hydrocarbon surfactant added is preferably 0.001 to 10% by mass based on 100% by mass of the aqueous medium. The lower limit thereof is more preferably 0.005% by mass, and still more preferably 0.01% by mass, while the upper limit thereof is more preferably 5% by mass, and still more preferably 2% by mass.

The hydrocarbon surfactant having one or more carbonyl groups which are not in a carboxyl group is preferably a surfactant represented by the formula: R—X, wherein R is a fluorine-free organic group having one or more carbonyl groups which are not in a carboxyl group and having 1 to 2,000 carbon atoms, X is, $—OSO_3X^1$, $—COOX^1$, or $—SO_3X^1$, wherein $X^1$ is H, a metal atom, $NR^1_4$, imidazolium optionally having a substituent, pyridinium optionally having a substituent, or phosphonium optionally having a substituent, wherein $R^1$ is H or an organic group and may be the same or different. R preferably has 500 or less carbon atoms, more preferably 100 or less, still more preferably 50 or less, and further preferably 30 or less.

The hydrocarbon surfactant is more preferably at least one selected from the group consisting of a surfactant (α) represented by the following formula (a):

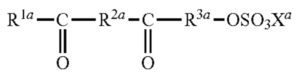

wherein $R^{1a}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2a}$ and $R^{3a}$ are each independently a single bond or a divalent linking group; the total number of carbon atoms of $R^{1a}$, $R^{2a}$, and $R^{3a}$ is 6 or more; $X^a$ is H, a metal atom, $NR^{4a}_4$, imidazolium optionally having a substituent, pyridinium optionally having a substituent, or phosphonium optionally having a substituent, wherein $R^{4a}$ is H or an organic group and is the same or different; and any two of $R^{1a}$, $R^{2a}$, and $R^{3a}$ optionally bind to each other to form a ring;

a surfactant (b) represented by the following formula (b):

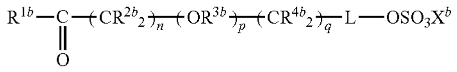

wherein $R^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2b}$ and $R^{4b}$ are each independently H or a substituent; $R^{3b}$ is an alkylene group having 1 to 10 carbon atoms and optionally having a substituent; n is an integer of 1 or more; p and q are each independently an integer of 0 or more; $X^b$ is H, a metal atom, $NR^{5b}_4$, imidazolium optionally having a substituent, pyridinium optionally having a substituent, or phosphonium optionally having a substituent, wherein $R^{5b}$ is H or an organic group and is the same or different; any two of $R^{1b}$, $R^{2b}$, $R^{3b}$, and $R^{4b}$ optionally bind to each other to form a ring; L is a single bond, $—CO_2—B—*$, $—OCO—B—*$, $—CONR^{6b}—B—*$, $—NR^{6b}CO—B—*$, or —CO— other than the carbonyl groups in $—CO_2—B—$, —OCO—B—, $—CONR^{6b}—B—$, and $—NR^{6}CO—B—$, wherein B is a single bond or an alkylene group having 1 to 10 carbon atoms and optionally having a substituent, $R^{6b}$ is H or an alkyl group having 1 to 4 carbon atoms and optionally having a substituent; and * indicates the side bonded to $—OSO_3X^b$ in the formula;

a surfactant (c) presented by the following formula (c):

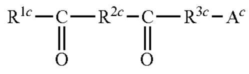

wherein $R^{1c}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2c}$ and $R^{3c}$ are each independently a single bond or a divalent linking group; the total number of carbon atoms of $R^{1c}$, $R^{2c}$, and $R^{3c}$ is 5 or more; $A^c$ is —$COOX^c$ or —$SO_3X^c$, wherein $X^c$ is H, a metal atom, $NR^{4c}{}_4$, imidazolium optionally having a substituent, pyridinium optionally having a substituent, or phosphonium optionally having a substituent, wherein $R^{4c}$ is H or an organic group and is the same or different; any two of $R^{1c}$, $R^{2c}$, and $R^{3c}$ optionally bind to each other to form a ring; and a surfactant (d) represented by the following formula (d):

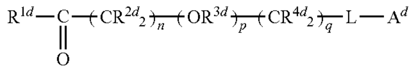

wherein $R^{1d}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2d}$ and $R^{4d}$ are each independently H or a substituent; $R^{3d}$ is an alkylene group having 1 to 10 carbon atoms and optionally having a substituent; n is an integer of 1 or more; p and q are each independently an integer of 0 or more; $A^d$ is —$SO_3X^d$ or —$COOX^d$, wherein $X^d$ is H, a metal atom, $NR^{5d}{}_4$, imidazolium optionally having a substituent, pyridinium optionally having a substituent, or phosphonium optionally having a substituent, wherein $R^{5d}$ is H or an organic group and is the same or different; any two of $R^{1d}$, $R^{2d}$, $R^{3d}$, and $R^{4d}$ optionally bind to each other to form a ring; L is a single bond, —$CO_2$—B—*, —OCO—B—*, —$CONR^{6d}$—B—*, —$NR^{6d}CO$—B—*, or —CO— other than the carbonyl groups in —$CO_2$—B—, —OCO—B—, —$CONR^{6d}$—B—, and —$NR^{6d}CO$—B—, wherein B is a single bond or an alkylene group having 1 to 10 carbon atoms and optionally having a substituent, $R^{6d}$ is H or an alkyl group having 1 to 4 carbon atoms and optionally having a substituent; and * indicates the side bonded to $A^b$ in the formula.

The surfactant (a) will be described below.

In the formula (a), $R^{1a}$ is a linear or branched alkyl group having 1 or more carbon atoms or a cyclic alkyl group having 3 or more carbon atoms.

When having 3 or more carbon atoms, the alkyl group optionally contains a carbonyl group (—C(═O)—) between two carbon atoms. When having 2 or more carbon atoms, the alkyl group optionally contains the carbonyl group at an end of the alkyl group. In other words, acyl groups such as an acetyl group represented by $CH_3$—C(═O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1a}$, a divalent heterocycle may be present between two carbon atoms, or a divalent heterocycle may be present at an end and bind to —C(═O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3$—C(═O)—$CH_2$— is 3, the number of carbon atoms in the group represented by $CH_3$—C(═O)—$C_2H_4$—C(═O)—$C_2H_4$— is 7, and the number of carbon atoms in the group represented by $CH_3$—C(═O)— is 2.

In the alkyl group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{101a}$, wherein $R^{101a}$ is an alkyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula, $R^{2a}$ and $R^{3a}$ are each independently a single bond or a divalent linking group.

Preferably, $R^{2a}$ and $R^{3a}$ are each independently a single bond, or a linear or branched alkylene group having 1 or more carbon atoms, or a cyclic alkylene group having 3 or more carbon atoms.

The alkylene group constituting $R^{2a}$ and $R^{3a}$ is preferably free from a carbonyl group.

In the alkylene group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{102a}$, wherein $R^{102a}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The total number of carbon atoms of $R^{1a}$, $R^{2a}$, and $R^{3a}$ is 6 or more. The total number of carbon atoms is preferably 8 or more, more preferably 9 or more, still more preferably 10 or more, and preferably 20 or less, more preferably 18 or less, still more preferably 15 or less.

Any two of $R^{1a}$, $R^{2a}$, and $R^{3a}$ optionally bind to each other to form a ring.

In the formula (a), $X^a$ is H, a metal atom, $NR^{4a}_4$, imidazolium optionally having a substituent, pyridinium optionally having a substituent, or phosphonium optionally having a substituent, wherein $R^{4a}$ is H or an organic group. The four $R^{4a}$ may be the same as or different from each other. $R^{4a}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^a$ is preferably H, an alkali metal (Group 1), an alkaline earth metal (Group 2), or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^a$ is $NH_4$, the solubility of the surfactant in an aqueous medium is excellent, and the metal component is unlikely to remain in the PTFE or the final product.

$R^{1a}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1a}$ is more preferably a group represented by the following formula:

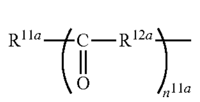

wherein $n^{11a}$ is an integer of 0 to 10; $R^{11a}$ is a linear or branched alkyl group having 1 to 5 carbon atoms or a cyclic alkyl group having 3 to 5 carbon atoms; $R^{12a}$ is an alkylene group having 0 to 3 carbon atoms; and when $n^{11a}$ is an integer of 2 to 10, each $R^{12a}$ may be the same or different.

$n^{11a}$ is preferably an integer of 0 to 5, more preferably an integer of 0 to 3, and still more preferably an integer of 1 to 3.

The alkyl group for $R^{11a}$ is preferably free from a carbonyl group.

In the alkyl group for $R^{11a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{103a}$, wherein $R^{103a}$ is an alkyl group.

In the alkyl group for $R^{11a}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12a}$ is an alkylene group having 0 to 3 carbon atoms. The alkylene group preferably has 1 to 3 carbon atoms.

The alkylene group for $R^{12a}$ may be either linear or branched.

The alkylene group for $R^{12a}$ is preferably free from a carbonyl group. $R^{12a}$ is more preferably an ethylene group (—$C_2H_4$—) or a propylene group (—$C_3H_6$—).

In the alkylene group for $R^{12a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{104a}$, wherein $R^{104a}$ is an alkyl group.

In the alkylene group for $R^{12a}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2a}$ and $R^{3a}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_3H_6$—).

Examples of the surfactant (α) include the following surfactants. In each formula, $X^a$ is defined as described above.

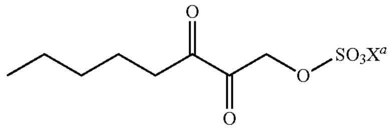

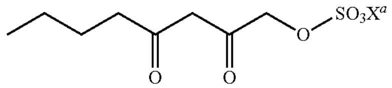

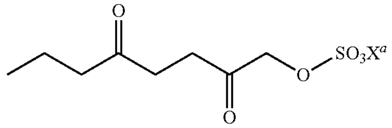

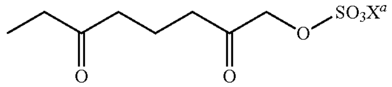

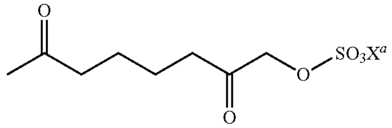

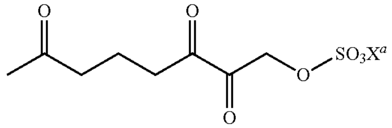

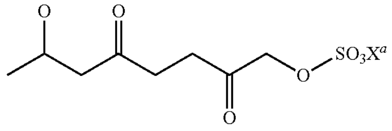

-continued
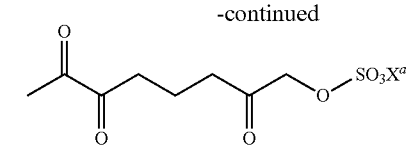
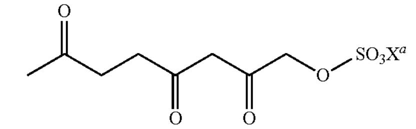
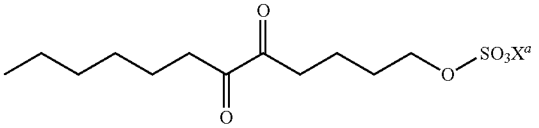
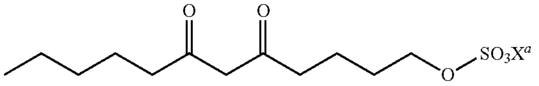
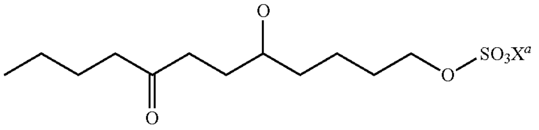
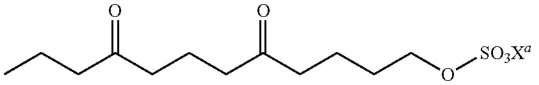
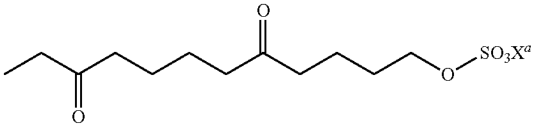
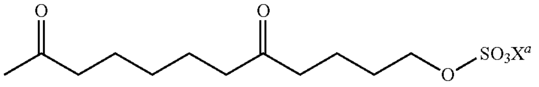
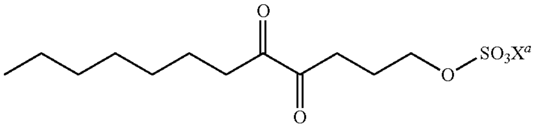
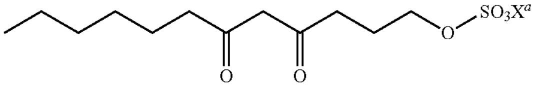
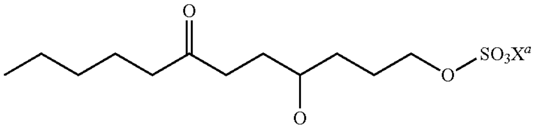
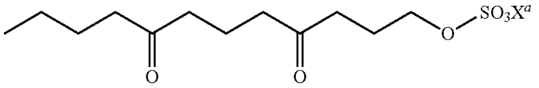
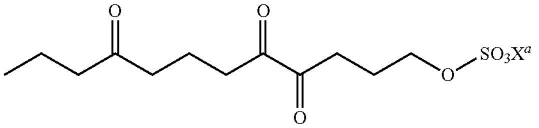
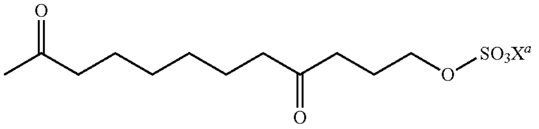
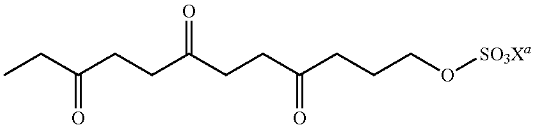
-continued
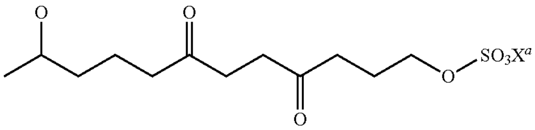
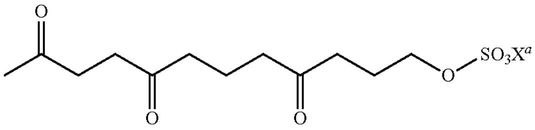
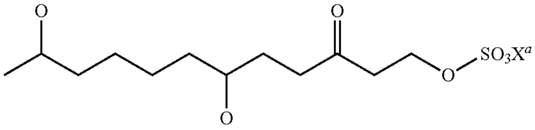
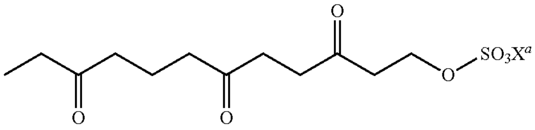
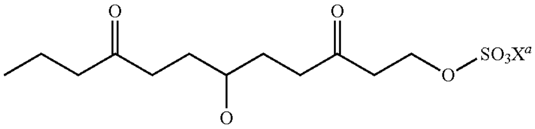
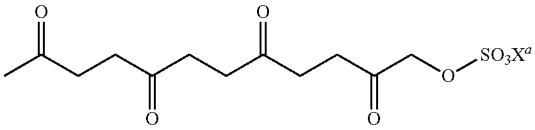
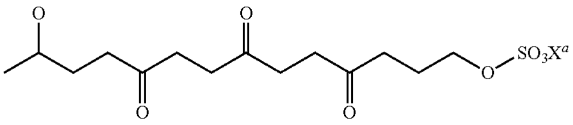
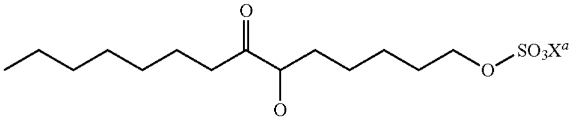
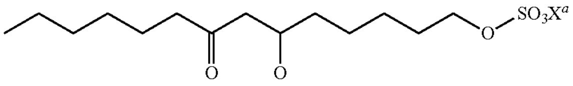
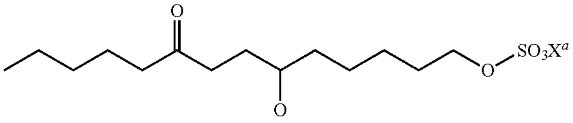
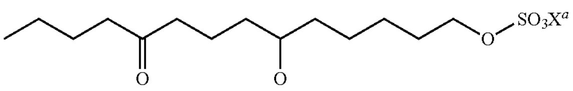
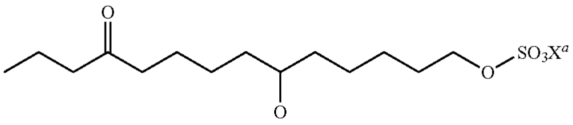
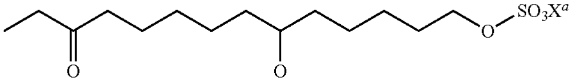
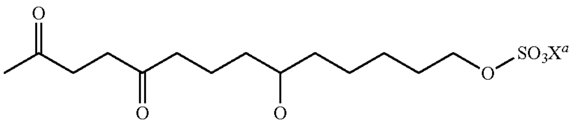

-continued
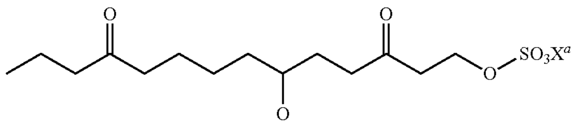
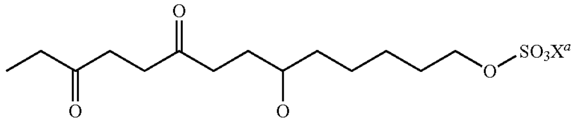
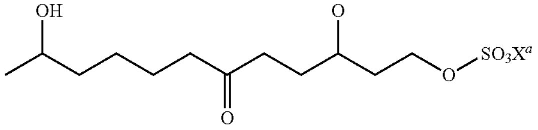
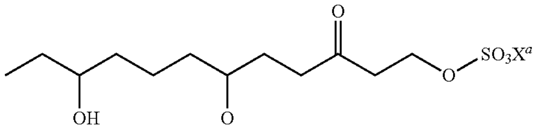
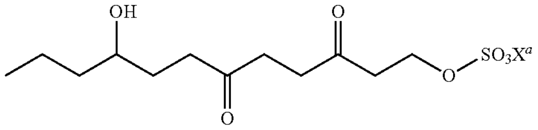
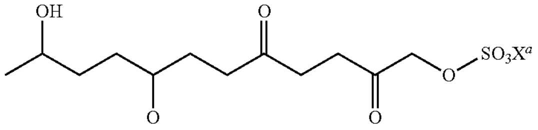
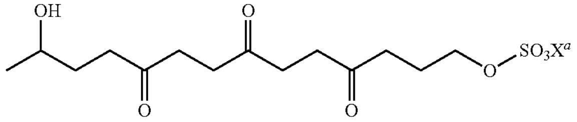
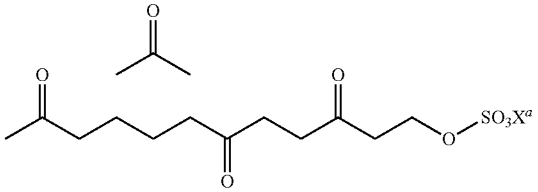
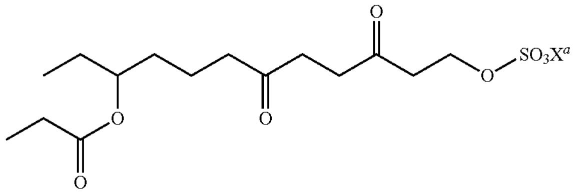
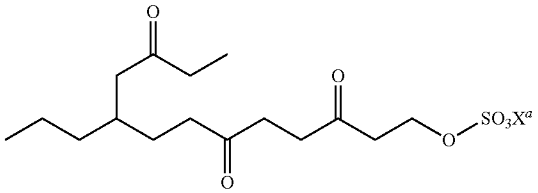
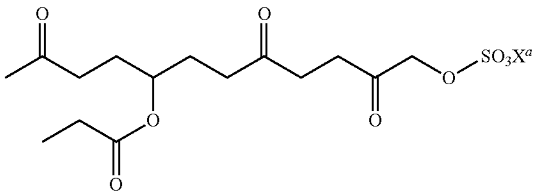
-continued
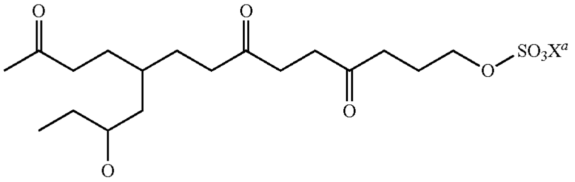
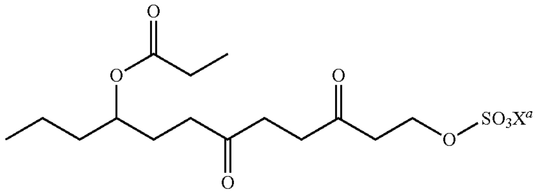
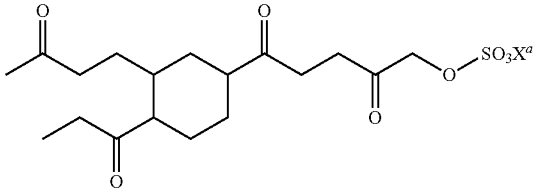
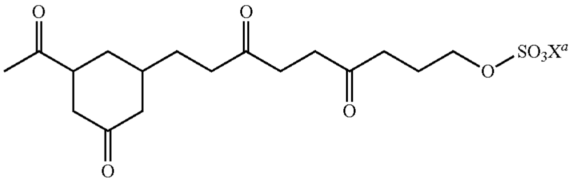
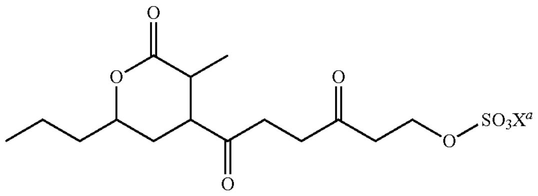
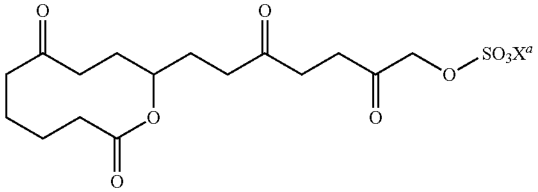
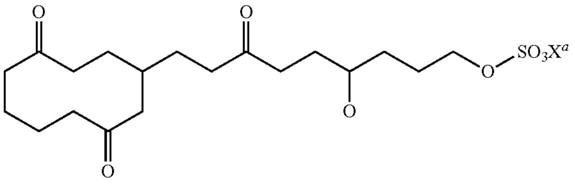
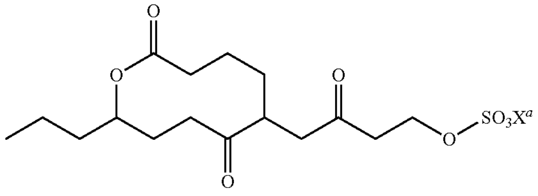
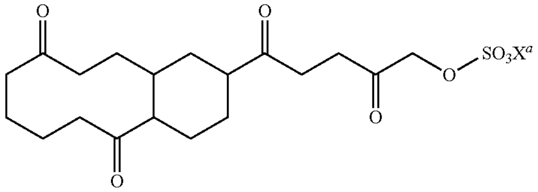

-continued

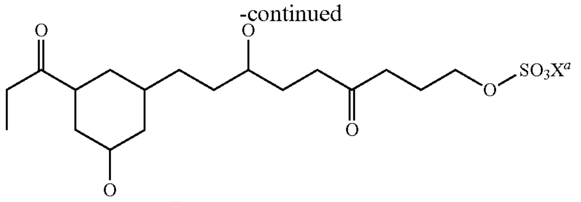

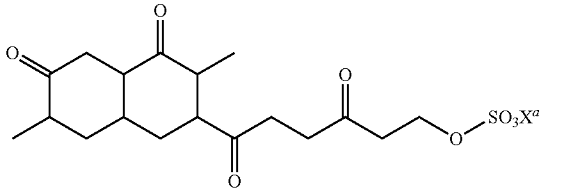

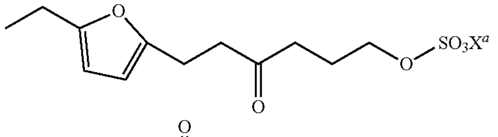

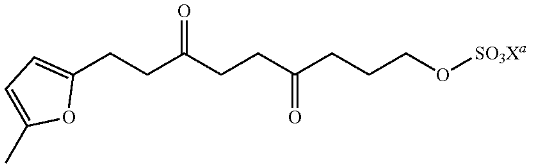

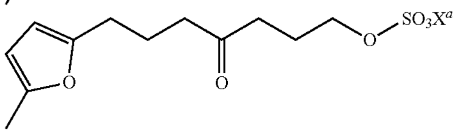

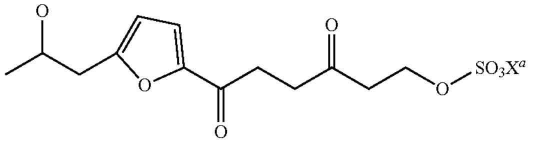

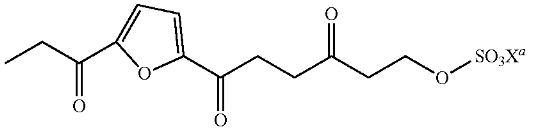

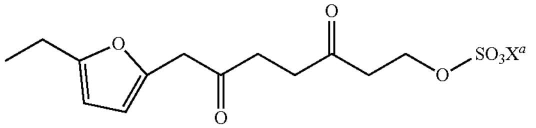

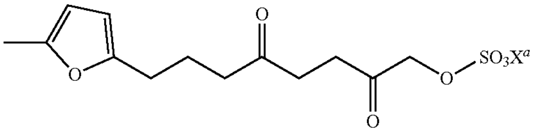

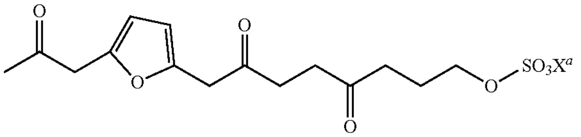

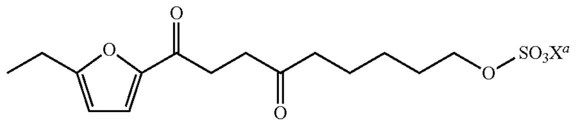

Next, the surfactant (b) is described below.

In the formula (b), $R^{1b}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1b}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1b}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{1b}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group ($—CH_3$) or an ethyl group ($—C_2H_5$), and most preferably a methyl group ($—CH_3$).

In the formula (b), $R^{2b}$ and $R^{4b}$ are each independently H or a substituent. A plurality of $R^{2b}$ and $R^{4b}$ may be the same or different.

The substituent for each of $R^{2b}$ and $R^{4b}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2b}$ and $R^{4b}$ is preferably free from a carbonyl group. In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

The alkyl group for each of $R^{2b}$ and $R^{4b}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group ($-CH_3$) or an ethyl group ($-C_2H_5$).

$R^{2b}$ and $R^{4b}$ are preferably each independently H or a linear or branched alkyl group having 1 to 10 carbon atoms and free from a carbonyl group, more preferably H or a linear or branched alkyl group having 1 to 3 carbon atoms and not having a substituent, further preferably H, a methyl group ($-CH_3$), or an ethyl group ($-C_2H_5$), and particularly preferably H.

In the formula (b), $R^{3b}$ is an alkylene group having 1 to 10 carbon atoms and optionally having a substituent. When a plurality of $R^{3b}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group ($-CH_2-$), an ethylene group ($-C_2H_4-$), an isopropylene group ($-CH(CH_3)CH_2-$), or a propylene group ($-C_3H_6-$).

Any two of $R^{1b}$, $R^{2b}$, $R^{3b}$, and $R^{4b}$ optionally bind to each other to form a ring, but preferably do not form a ring.

In the formula (b), n is an integer of 1 or more. In the formula, n is preferably an integer of 1 to 40, more preferably an integer of 1 to 30, still more preferably an integer of 5 to 25, and particularly preferably an integer of 5 to 9 and 11 to 25.

In the formula (b), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 5 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (b), $X^b$ is H, a metal atom, $NR^{5b}_4$, imidazolium optionally having a substituent, pyridinium optionally having a substituent, or phosphonium optionally having a substituent, wherein $R^{5b}$ is H or an organic group. The four $R^{5b}$ may be the same as or different from each other. $R^{5b}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^b$ may be a metal atom or $NR^{5b}_4$, wherein $R^{5b}$ is defined as described above.

$X^b$ is preferably H, an alkali metal (Group 1), an alkaline earth metal (Group 2), or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^b$ is $NH_4$, the solubility of the surfactant in an aqueous medium is excellent, and the metal component is unlikely to remain in the PTFE or the final product.

In the formula (b), L is a single bond, $-CO_2-B-*$, $-OCO-B-*$, $-CONR^{6b}-B-*$, $-NR^{6b}CO-B-*$, or $-CO-$ other than the carbonyl groups in $-CO_2-B-$, $-OCO-B-$, $-CONR^6-B-$, and $-NR^{6b}CO-B-$, wherein B is a single bond or an alkylene group having 1 to 10 carbon atoms and optionally having a substituent, $R^{6b}$ is H or an alkyl group having 1 to 4 carbon atoms and optionally having a substituent. The alkylene group more preferably has 1 to 5 carbon atoms. $R^{6b}$ is more preferably H or a methyl group; and * indicates the side bonded to $-OSO_3X^b$ in the formula.

L is preferably a single bond.

The surfactant (b) is preferably a compound represented by the following formula:

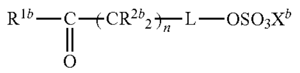

wherein $R^{1b}$, $R^{2b}$, L, n, and $X^b$ are defined as described above.

The surfactant (b) preferably has a $^1$H-NMR spectrum in which all peak intensities observed in a chemical shift range of 2.0 to 5.0 ppm give an integral value of 10% or more.

The surfactant (b) preferably has a $^1$H-NMR spectrum in which all peak intensities observed in a chemical shift range of 2.0 to 5.0 ppm give an integral value within the above range. In this case, the surfactant preferably has a ketone structure in the molecule.

The integral value of the surfactant (b) is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (b) include:

$CH_3C(O)CH_2CH_2CH_2CH_2CH_2CH_2CH_2CH_2CH_2OSO_3Na$,
$CH_3C(O)CH_2CH_2CH_2CH_2CH_2CH_2CH_2CH_2OSO_3Na$,
$CH_3C(O)CH_2CH_2CH_2CH_2CH_2CH_2CH_2OSO_3Na$,
$CH_3C(O)CH_2CH_2CH_2CH_2CH_2CH_2OSO_3Na$,
$CH_3C(O)CH_2CH_2CH_2CH_2CH_2OSO_3Na$,
$CH_3C(O)CH_2CH_2CH_2CH_2OSO_3Na$,
$(CH_3)_3CC(O)CH_2CH_2CH_2CH_2CH_2CH_2CH_2CH_2CH_2OSO_3Na$,
$(CH_3)_2CHC(O)CH_2CH_2CH_2CH_2CH_2CH_2CH_2CH_2CH_2OSO_3Na$,
$(CH_2)_5CHC(O)CH_2CH_2CH_2CH_2CH_2CH_2CH_2CH_2CH_2OSO_3Na$,
$CH_3CH_2C(O)CH_2CH_2CH_2CH_2CH_2CH_2CH_2CH_2OSO_3Na$,
$CH_3CH_2CH_2C(O)CH_2CH_2CH_2CH_2CH_2CH_2CH_2OSO_3Na$,
$CH_3CH_2CH_2CH_2C(O)CH_2CH_2CH_2CH_2CH_2CH_2OSO_3Na$, $CH_3CH_2CH_2CH_2CH_2C(O)CH_2CH_2CH_2CH_2CH_2OSO_3Na$,
$CH_3CH_2CH_2CH_2CH_2CH_2C(O)CH_2CH_2CH_2CH_2OSO_3Na$,
$CH_3CH_2CH_2CH_2CH_2CH_2CH_2C(O)CH_2CH_2CH_2OSO_3Na$,
$CH_3CH_2CH_2CH_2CH_2CH_2CH_2CH_2C(O)CH_2CH_2OSO_3Na$,
$CH_3CH_2CH_2CH_2CH_2CH_2CH_2CH_2CH_2C(O)CH_2OSO_3Na$,
$CH_3C(O)CH_2CH_2CH_2CH_2CH_2CH_2CH_2CH_2CH_2OCH_2CH_2OSO_3Na$,
$CH_3C(O)CH_2CH_2CH_2CH_2CH_2CH_2CH_2CH_2CH_2C(O)NHCH_2OSO_3Na$,
$CH_3C(O)CH_2CH_2CH_2CH_2CH_2CH_2CH_2CH_2CH_2NHC(O)CH_2OSO_3Na$,
$CH_3C(O)CH_2CH_2CH_2CH_2CH_2CH_2CH_2CH_2CH_2C(O)OSO_3Na$,
$CH_3C(O)CH_2CH_2CH_2CH_2CH_2CH_2CH_2CH_2CH_2C(O)OCH_2OSO_3Na$,
$CH_3C(O)CH_2CH_2CH_2CH_2CH_2CH_2CH_2CH_2CH_2OC(O)CH_2OSO_3Na$,
$CH_3C(O)CH_2CH_2CH_2CH_2CH_2CH_2CH_2CH_2CH_2OSO_3H$,
$CH_3C(O)CH_2CH_2CH_2CH_2CH_2CH_2CH_2CH_2CH_2OSO_3Li$,
$CH_3C(O)CH_2CH_2CH_2CH_2CH_2CH_2CH_2CH_2CH_2OSO_3K$,
$CH_3C(O)CH_2CH_2CH_2CH_2CH_2CH_2CH_2CH_2CH_2OSO_3NH_4$,
$CH_3C(O)CH_2CH_2CH_2CH_2CH_2CH_2CH_2CH_2CH(CH_3)_2OSO_3Na$,
$CH_3C(O)CH_2CH_2CH_2CH_2CH_2CH_2CH_2CH_2CH_2CH_2CH_2CH_2CH_2CH_2CH_2CH_2CH_2OSO_3Na$,
$CH_3C(O)CH_2CH_2CH_2CH_2CH_2CH_2CH_2CH_2CH_2CH_2CH_2CH_2CH_2CH_2CH_2CH_2OSO_3Na$,
$CH_3C(O)CH_2CH_2CH_2CH_2CH_2CH_2CH_2CH_2CH_2CH_2CH_2CH_2CH_2CH_2CH_2OSO_3Na$,
$CH_3C(O)CH_2CH_2CH_2CH_2CH_2CH_2CH_2CH_2CH_2CH_2CH_2CH_2CH_2CH_2OSO_3Na$,
$CH_3C(O)CH_2CH_2CH_2CH_2CH_2CH_2CH_2CH_2CH_2CH_2CH_2CH_2CH_2OSO_3Na$,
$CH_3C(O)CH_2CH_2CH_2CH_2CH_2CH_2CH_2CH_2CH_2CH_2CH_2CH_2OSO_3Na$,
$CH_3C(O)CH_2CH_2CH_2CH_2CH_2CH_2CH_2CH_2CH_2CH_2CH_2OSO_3Na$,
$CH_3C(O)CH_2CH_2CH_2CH_2CH_2CH_2CH_2CH_2CH_2CH_2OSO_3Na$,
$(CH_3)_3CC(O)CH_2CH_2CH_2CH_2CH_2CH_2CH_2CH_2CH_2CH_2CH_2CH_2CH_2CH_2CH_2CH_2CH_2OSO_3Na$,
$(CH_3)_2CHC(O)CH_2CH_2CH_2CH_2CH_2CH_2CH_2CH_2CH_2CH_2CH_2CH_2CH_2CH_2CH_2CH_2CH_2OSO_3Na$,
$(CH_2)_5CHC(O)CH_2CH_2CH_2CH_2CH_2CH_2CH_2CH_2CH_2CH_2CH_2CH_2CH_2CH_2CH_2CH_2CH_2OSO_3Na$,
$CH_3CH_2C(O)CH_2CH_2CH_2CH_2CH_2CH_2CH_2CH_2CH_2CH_2CH_2CH_2CH_2CH_2CH_2CH_2OSO_3Na$,
$CH_3CH_2CH_2CH_2CH_2C(O)CH_2CH_2CH_2CH_2CH_2CH_2CH_2CH_2CH_2CH_2CH_2CH_2CH_2OSO_3Na$,
$CH_3CH_2CH_2CH_2CH_2CH_2CH_2CH_2C(O)CH_2CH_2CH_2CH_2CH_2CH_2CH_2CH_2CH_2CH_2OSO_3Na$,
$CH_3CH_2CH_2CH_2CH_2CH_2CH_2CH_2CH_2CH_2CH_2C(O)CH_2CH_2CH_2CH_2CH_2CH_2CH_2OSO_3Na$,
$CH_3CH_2CH_2CH_2CH_2CH_2CH_2CH_2CH_2CH_2CH_2CH_2CH_2CH_2CH_2C(O)CH_2CH_2CH_2CH_2OSO_3Na$,
$CH_3CH_2C(O)CH_2CH_2CH_2CH_2CH_2CH_2CH_2CH_2CH_2CH_2CH_2CH_2CH_2CH_2CH_2CH_2OCH_2CH_2OSO_3Na$,
$CH_3CH_2C(O)CH_2CH_2CH_2CH_2CH_2CH_2CH_2CH_2CH_2CH_2CH_2CH_2CH_2CH_2CH_2CH_2C(O)NHCH_2CH_2OSO_3Na$,
$CH_3CH_2C(O)CH_2CH_2CH_2CH_2CH_2CH_2CH_2CH_2CH_2CH_2CH_2CH_2CH_2CH_2CH_2CH_2NHC(O)CH_2CH_2OSO_3Na$,
$CH_3CH_2C(O)CH_2CH_2CH_2CH_2CH_2CH_2CH_2CH_2CH_2CH_2CH_2CH_2CH_2CH_2CH_2CH_2C(O)OCH_2CH_2OSO_3Na$,
$CH_3CH_2C(O)CH_2CH_2CH_2CH_2CH_2CH_2CH_2CH_2CH_2CH_2CH_2CH_2CH_2CH_2CH_2CH_2OC(O)CH_2CH_2OSO_3Na$,
$CH_3CH_2C(O)CH_2CH_2CH_2CH_2CH_2CH_2CH_2CH_2CH_2CH_2CH_2CH_2CH_2CH_2CH_2CH_2C(O)OSO_3Na$,
$CH_3CH_2C(O)CH_2CH_2CH_2CH_2CH_2CH_2CH_2CH_2CH_2CH_2CH_2CH_2CH_2CH_2CH_2CH_2OSO_3H$,
$CH_3CH_2C(O)CH_2CH_2CH_2CH_2CH_2CH_2CH_2CH_2CH_2CH_2CH_2CH_2CH_2CH_2CH_2CH_2OSO_3Li$,
$CH_3CH_2C(O)CH_2CH_2CH_2CH_2CH_2CH_2CH_2CH_2CH_2CH_2CH_2CH_2CH_2CH_2CH_2CH_2OSO_3K$,
$CH_3CH_2C(O)CH_2CH_2CH_2CH_2CH_2CH_2CH_2CH_2CH_2CH_2CH_2CH_2CH_2CH_2CH_2CH_2OSO_3NH_4$, and
$CH_3C(O)CH_2CH_2CH_2CH_2CH_2CH_2CH_2CH_2CH_2CH_2CH_2CH_2CH_2CH_2CH_2CH_2CH_2CH_2CH_2CH_2CH_2OSO_3Na$.

The surfactant (c) will be described.

In the formula (c), $R^{1c}$ is a linear or branched alkyl group having 1 or more carbon atoms or a cyclic alkyl group having 3 or more carbon atoms.

When having 3 or more carbon atoms, the alkyl group optionally contains a carbonyl group (—C(═O)—) between two carbon atoms. When having 2 or more carbon atoms, the alkyl group optionally contains the carbonyl group at an end of the alkyl group. In other words, acyl groups such as an acetyl group represented by $CH_3$—C(═O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1c}$, a divalent heterocycle may be present between two carbon atoms, or a divalent heterocycle may be present at an end and bind to —C(═O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3$—C(═O)—$CH_2$— is 3, the number of carbon atoms in the group represented by $CH_3$—C(═O)—$C_2H_4$—C(═O)—$C_2H_4$— is 7, and the number of carbon atoms in the group represented by $CH_3$—C(═O)— is 2.

In the alkyl group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{101c}$, wherein $R^{101c}$ is an alkyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula (c), $R^{2c}$ and $R^{3c}$ are each independently a single bond or a divalent linking group.

Preferably, $R^{2c}$ and $R^{3c}$ are each independently a single bond, a linear or branched alkylene group having 1 or more carbon atoms, or a cyclic alkylene group having 3 or more carbon atoms.

The alkylene group constituting $R^{2c}$ and $R^{3c}$ is preferably free from a carbonyl group.

In the alkylene group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{102c}$, wherein $R^{102c}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The total number of carbon atoms of $R^{1c}$, $R^{2c}$, and $R^{3c}$ is 5 or more. The total number of carbon atoms is preferably 7 or more, more preferably 9 or more, and preferably 20 or less, more preferably 18 or less, still more preferably 15 or less.

Any two of $R^{1c}$, $R^{2c}$, and $R^{3c}$ optionally bind to each other to form a ring.

In the formula (c), $A^c$ is —$COOX^c$ or —$SO_3X^c$, wherein $X^c$ is H, a metal atom, $NR^{4c}{}_4$, imidazolium optionally having a substituent, pyridinium optionally having a substituent, or phosphonium optionally having a substituent, wherein $R^{4c}$ is H or an organic group and may be the same or different. $R^{4c}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li.

$X^c$ is preferably H, an alkali metal (Group 1), an alkaline earth metal (Group 2), or $NR^{4c}{}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^c$ is $NH_4$, the solubility of the surfactant in an aqueous medium is excellent, and the metal component is unlikely to remain in the PTFE or the final product.

$R^{1c}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1c}$ is more preferably a group represented by the following formula:

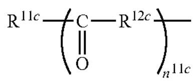

wherein $n^{11c}$ is an integer of 0 to 10; $R^{11c}$ is a linear or branched alkyl group having 1 to 5 carbon atoms or a cyclic alkyl group having 3 to 5 carbon atoms; $R^{12c}$ is an alkylene group having 0 to 3 carbon atoms; and when $n^{11c}$ is an integer of 2 to 10, each $R^{12c}$ may be the same or different.

$n^{11c}$ is preferably an integer of 0 to 5, more preferably an integer of 0 to 3, and still more preferably an integer of 1 to 3.

The alkyl group for $R^{11c}$ is preferably free from a carbonyl group.

In the alkyl group for $R^{11c}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{103c}$, wherein $R^{103c}$ is an alkyl group.

In the alkyl group for $R^{11c}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12c}$ is an alkylene group having 0 to 3 carbon atoms. The alkylene group preferably has 1 to 3 carbon atoms.

The alkylene group for $R^{12c}$ may be either linear or branched.

The alkylene group for $R^{12c}$ is preferably free from a carbonyl group. $R^{12c}$ is more preferably an ethylene group (—$C_2H_4$—) or a propylene group (—$C_3H_6$—).

In the alkylene group for $R^{12c}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(═O)—$R^{104c}$, wherein $R^{104c}$ is an alkyl group.

In the alkylene group for $R^{12c}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2c}$ and $R^{3c}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_3H_6$—).

Examples of the surfactant (c) include the following surfactants. In each formula, $A^c$ is defined as described above.
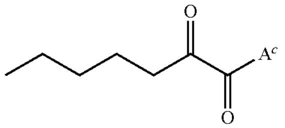
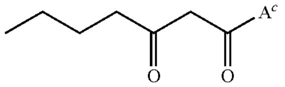
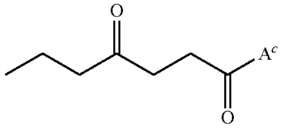
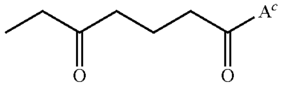
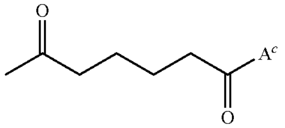
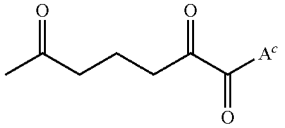
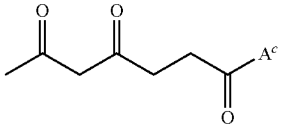
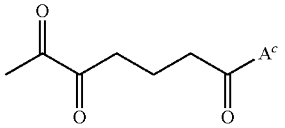
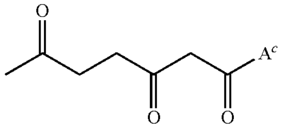
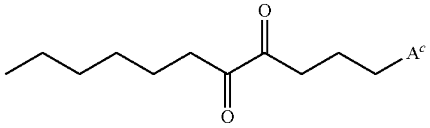
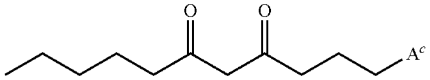
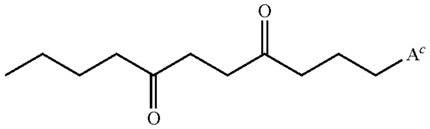
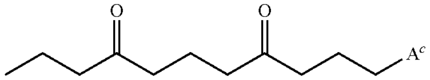
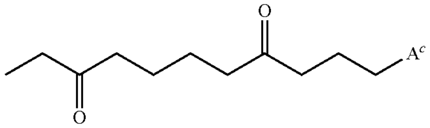
-continued
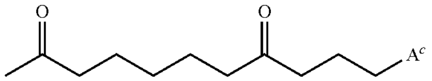
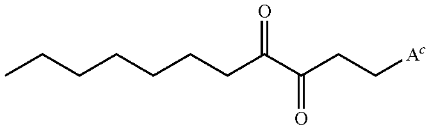
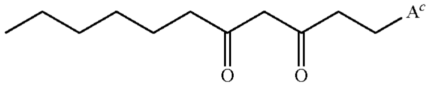
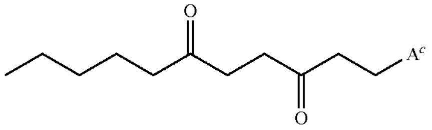
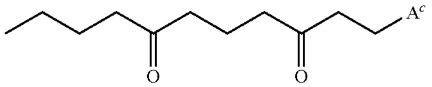
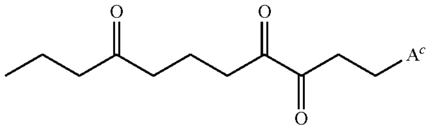
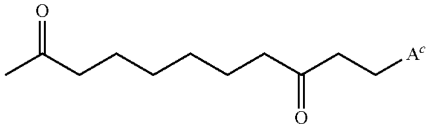
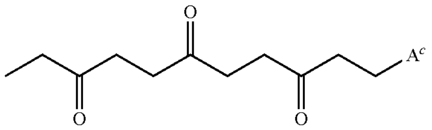
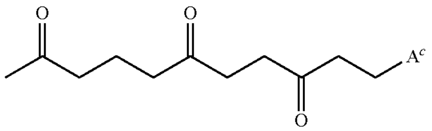
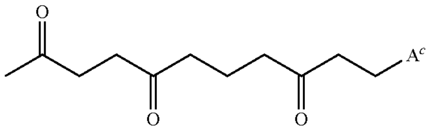
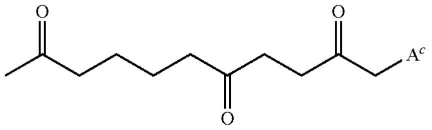
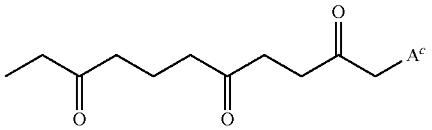
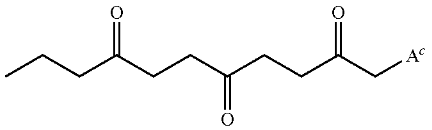
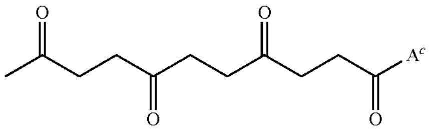

-continued
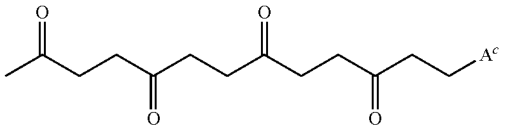
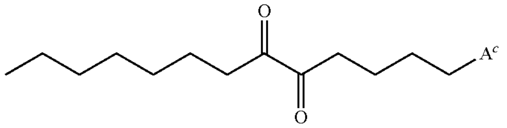
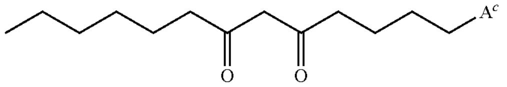
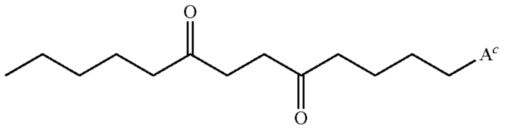
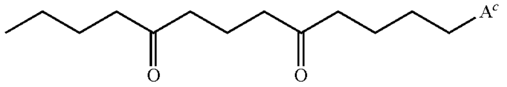
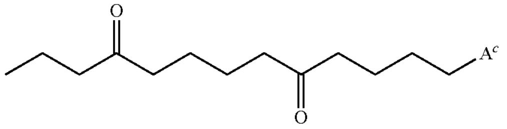
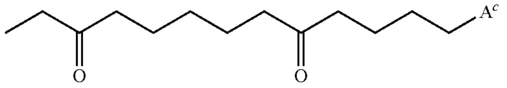
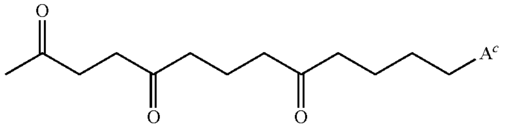
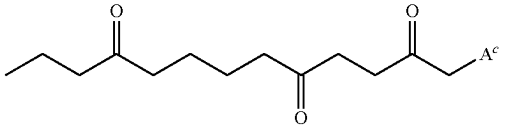
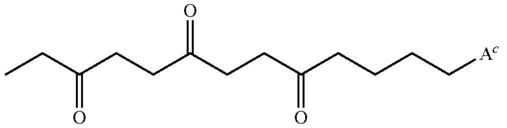
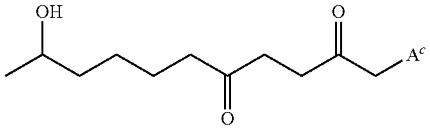
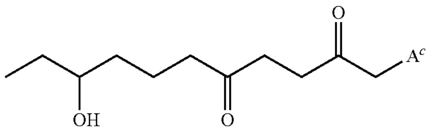
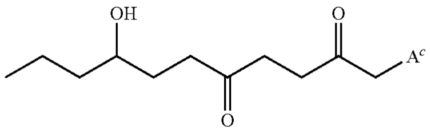
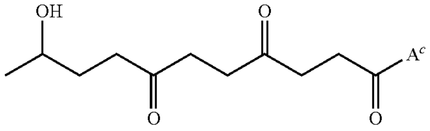
-continued
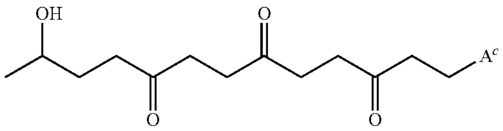
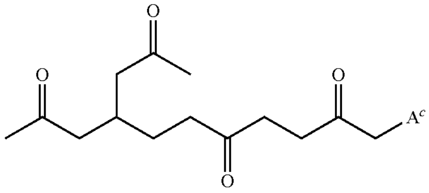
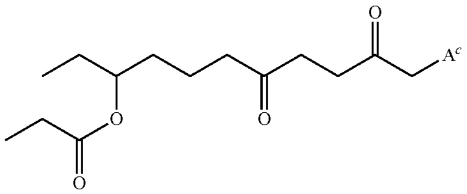
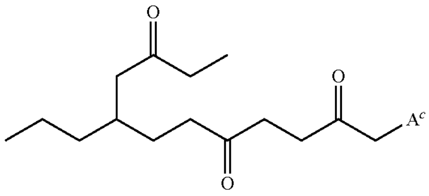
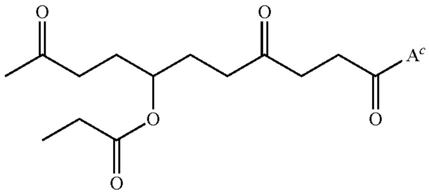
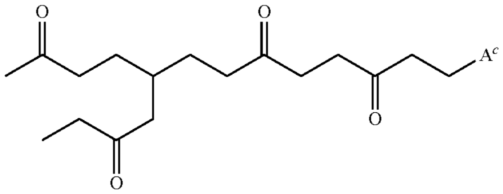
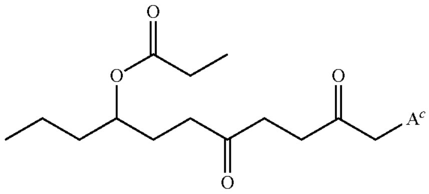
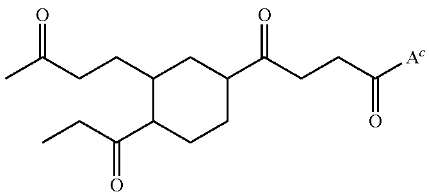
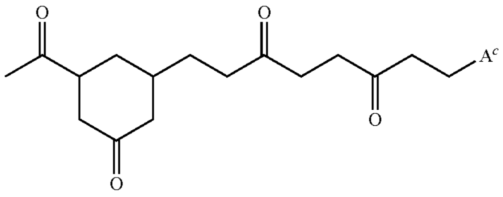

-continued

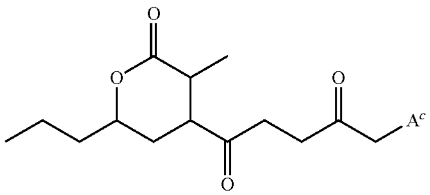

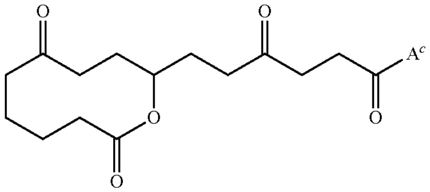

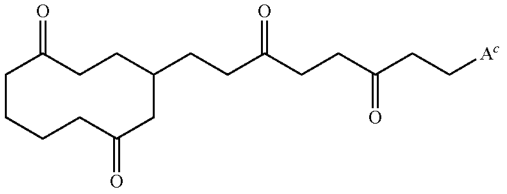

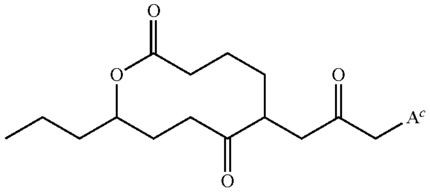

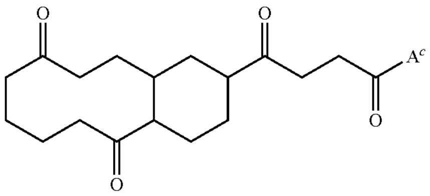

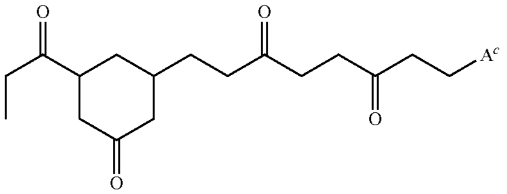

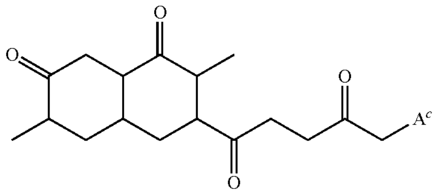

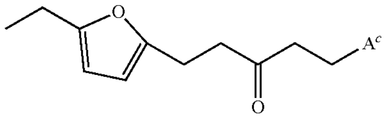

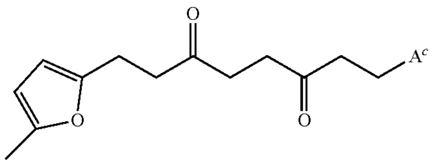

-continued

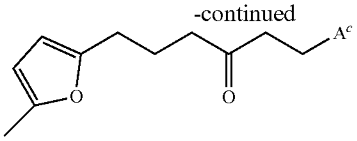

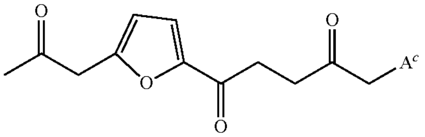

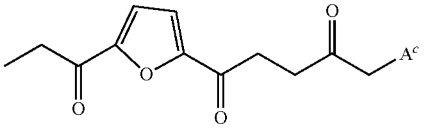

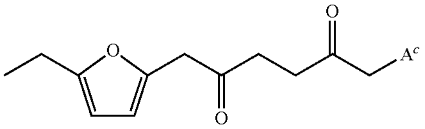

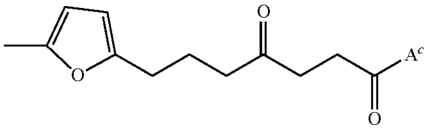

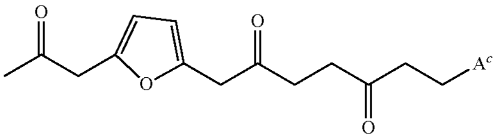

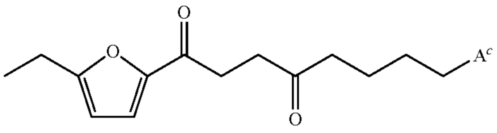

The surfactant (d) will be described.

In the formula (d), $R^{1d}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1d}$, a divalent heterocycle may be present between two carbon atoms, or a divalent heterocycle may be present at an end and bind to —C(═O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1d}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1d}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{1d}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group ($—CH_3$) or an ethyl group ($—C_2H_5$), and most preferably a methyl group ($—CH_3$).

In the formula (d), $R^{2d}$ and $R^{4d}$ are each independently H or a substituent. A plurality of $R^{2d}$ and $R^{4d}$ may be the same or different.

The substituent for each of $R^{2d}$ and $R^{4d}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2d}$ and $R^{4d}$ is preferably free from a carbonyl group. In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

The alkyl group for each of $R^{2d}$ and $R^{4d}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group ($—CH_3$) or an ethyl group ($—C_2H_5$).

$R^{2d}$ and $R^{4d}$ are preferably each independently H or a linear or branched alkyl group having 1 to 10 carbon atoms and free from a carbonyl group, more preferably H or a linear or branched alkyl group having 1 to 3 carbon atoms and not having a substituent, further preferably H, a methyl group ($—CH_3$), or an ethyl group ($—C_2H_5$), and particularly preferably H.

In the formula (d), $R^{3d}$ is an alkylene group having 1 to 10 carbon atoms and optionally having a substituent. When a plurality of $R^{3d}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group ($—CH_2—$), an ethylene group ($—C_2H_4—$), an isopropylene group ($—CH(CH_3)CH_2—$), or a propylene group ($—C_3H_6—$).

Any two of $R^{1b}$, $R^{2b}$, $R^{3b}$, and $R^{4b}$ optionally bind to each other to form a ring.

In the formula (d), n is an integer of 1 or more. n is preferably an integer of 1 to 40, more preferably an integer of 1 to 30, and still more preferably an integer of 5 to 25.

In the formula (d), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 6 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (d), $A^d$ is $—SO_3X^d$ or $—COOX^d$, wherein $X^d$ is H, a metal atom, $NR^{5d}_4$, imidazolium optionally having a substituent, pyridinium optionally having a substituent, or phosphonium optionally having a substituent, wherein $R^{5d}$ is H or an organic group and may be the same or different. $R^{5d}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^d$ may be a metal atom or $NR^{5d}_4$, wherein $R^{5d}$ is defined as described above.

$X^d$ is preferably H, an alkali metal (Group 1), an alkaline earth metal (Group 2), or $NR^{5d}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^d$ is $NH_4$, the solubility of the surfactant in an aqueous medium is excellent, and the metal component is unlikely to remain in the PTFE or the final product.

In the formula (d), L is a single bond, $—CO_2—B—*$, $—OCO—B—*$, $—CONR^{6d}—B—*$, $—NR^{6d}CO—B—*$, or $—CO—$ other than the carbonyl groups in $—CO_2—B—$, $—OCO—B—$, $—CONR^{6d}—B—$, and $—NR^{6d}CO—B—$, wherein B is a single bond or an alkylene group having 1 to 10 carbon atoms and optionally having a substituent, $R^{6d}$ is H or an alkyl group having 1 to 4 carbon atoms and optionally having a substituent. The alkylene group more preferably has 1 to 5 carbon atoms. $R^{6d}$ is more preferably H or a methyl group. * indicates the side bonded to $A^d$ in the formula.

L is preferably a single bond.

The surfactant preferably has a $^1H$-NMR spectrum in which all peak intensities observed in a chemical shift range of 2.0 to 5.0 ppm give an integral value of 10 or more.

The surfactant preferably has a $^1H$-NMR spectrum in which all peak intensities observed in a chemical shift range of 2.0 to 5.0 ppm give an integral value within the above range. In this case, the surfactant preferably has a ketone structure in the molecule.

The integral value of the surfactant is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (d) include:

$CH_3C(O)CH_2CH_2CH_2CH_2CH_2CH_2CH_2CH_2COOK$,
$CH_3C(O)CH_2CH_2CH_2CH_2CH_2CH_2CH_2COONa$,
$CH_3C(O)CH_2CH_2CH_2CH_2CH_2CH_2COONa$,
$CH_3C(O)CH_2CH_2CH_2CH_2CH_2COONa$,
$CH_3C(O)CH_2CH_2CH_2CH_2COONa$,
$CH_3C(O)CH_2CH_2CH_2COONa$,
$CH_3C(O)CH_2CH_2CH_2CH_2CH_2CH_2CH_2CH_2CH_2CH_2CH_2CH_2CH_2COONa$,
$CH_3C(O)CH_2CH_2CH_2CH_2CH_2CH_2CH_2CH_2CH_2CH_2CH_2CH_2CH_2CH_2CH_2CH_2CH_2CH_2COONa$,
$(CH_3)_3CC(O)CH_2CH_2CH_2CH_2CH_2CH_2CH_2CH_2COONa$,
$(CH_3)_2CHC(O)CH_2CH_2CH_2CH_2CH_2CH_2CH_2CH_2COONa$,
$(CH_2)_5CHC(O)CH_2CH_2CH_2CH_2CH_2CH_2CH_2CH_2COONa$,
$CH_3CH_2C(O)CH_2CH_2CH_2CH_2CH_2CH_2CH_2COONa$,
$CH_3CH_2CH_2C(O)CH_2CH_2CH_2CH_2CH_2CH_2COONa$,
$CH_3CH_2CH_2CH_2C(O)CH_2CH_2CH_2CH_2CH_2COONa$,
$CH_3CH_2CH_2CH_2CH_2C(O)CH_2CH_2CH_2CH_2COONa$,
$CH_3CH_2CH_2CH_2CH_2CH_2C(O)CH_2CH_2CH_2COONa$,
$CH_3CH_2CH_2CH_2CH_2CH_2CH_2C(O)CH_2CH_2COONa$,
$CH_3CH_2CH_2CH_2CH_2CH_2CH_2CH_2C(O)CH_2COONa$,
$CH_3C(O)CH_2CH_2CH_2CH_2CH_2CH_2CH_2CH_2OCH_2CH_2COONa$,
$CH_3C(O)CH_2CH_2CH_2CH_2CH_2CH_2CH_2CH_2C(O)NHCH_2COOK$,
$CH_3C(O)CH_2CH_2CH_2CH_2CH_2CH_2CH_2CH_2NHC(O)CH_2COOK$,
$CH_3C(O)CH_2CH_2CH_2CH_2CH_2CH_2CH_2CH_2C(O)OCH_2COONa$,
$CH_3C(O)CH_2CH_2CH_2CH_2CH_2CH_2CH_2CH_2OC(O)CH_2COONa$,
$CH_3C(O)CH_2CH_2CH_2CH_2CH_2CH_2CH_2CH_2C(O)COONa$,
$CH_3C(O)CH_2CH_2CH_2CH_2CH_2CH_2CH_2CH_2C(O)COOH$,
$CH_3C(O)CH_2CH_2CH_2CH_2CH_2CH_2CH_2CH_2C(O)COOLi$,
$CH_3C(O)CH_2CH_2CH_2CH_2CH_2CH_2CH_2CH_2C(O)COONH_4$,
$CH_3C(O)CH_2CH_2CH_2CH_2CH_2CH_2CH_2CH_2C(O)COONa$,
$CH_3C(O)CH_2CH_2CH_2CH_2CH_2CH_2CH_2C(CH_3)_2COOK$,
$CH_3C(O)CH_2CH_2CH_2CH_2CH_2CH_2CH_2CH_2CH_2SO_3Na$,
$CH_3C(O)CH_2CH_2CH_2CH_2CH_2CH_2CH_2CH_2SO_3Na$,
$CH_3C(O)CH_2CH_2CH_2CH_2CH_2CH_2CH_2SO_3Na$,
$CH_3C(O)CH_2CH_2CH_2CH_2CH_2CH_2SO_3Na$,
$CH_3C(O)CH_2CH_2CH_2CH_2CH_2SO_3Na$,
$CH_3C(O)CH_2CH_2CH_2CH_2SO_3Na$,
$CH_3C(O)CH_2CH_2CH_2CH_2CH_2CH_2CH_2CH_2CH_2CH_2CH_2CH_2CH_2SO_3Na$,
$CH_3C(O)CH_2CH_2CH_2CH_2CH_2CH_2CH_2CH_2CH_2CH_2CH_2CH_2CH_2CH_2CH_2CH_2CH_2CH_2SO_3Na$,
$CH_3C(O)CH_2CH_2CH_2CH_2CH_2CH_2CH_2CH_2CH_2CH_2SO_3Na$,
$(CH_3)_3CC(O)CH_2CH_2CH_2CH_2CH_2CH_2CH_2CH_2CH_2SO_3Na$,
$(CH_3)_2CHC(O)CH_2CH_2CH_2CH_2CH_2CH_2CH_2CH_2CH_2SO_3Na$,
$(CH_2)_5CHC(O)CH_2CH_2CH_2CH_2CH_2CH_2CH_2CH_2CH_2SO_3Na$,
$CH_3C(O)CH_2CH_2CH_2CH_2CH_2CH_2CH_2CH_2SO_3Na$,
$CH_3C(O)CH_2CH_2CH_2CH_2CH_2CH_2CH_2SO_3Na$,
$CH_3C(O)CH_2CH_2CH_2CH_2CH_2CH_2SO_3Na$,
$CH_3C(O)CH_2CH_2CH_2CH_2CH_2SO_3Na$,
$CH_3C(O)CH_2CH_2CH_2CH_2SO_3Na$,
$CH_3C(O)CH_2CH_2CH_2SO_3Na$,
$CH_3C(O)CH_2CH_2SO_3Na$,
$CH_3C(O)CH_2SO_3Na$,
$CH_3C(O)CH_2CH_2CH_2CH_2CH_2CH_2CH_2CH_2CH_2OCH_2CH_2CH_2SO_3Na$,
$CH_3C(O)CH_2CH_2CH_2CH_2CH_2CH_2CH_2CH_2CH_2C(O)NHCH_2SO_3Na$,
$CH_3C(O)CH_2CH_2CH_2CH_2CH_2CH_2CH_2CH_2CH_2NHC(O)CH_2SO_3Na$,
$CH_3C(O)CH_2CH_2CH_2CH_2CH_2CH_2CH_2CH_2CH_2C(O)SO_3Na$,
$CH_3C(O)CH_2CH_2CH_2CH_2CH_2CH_2CH_2CH_2CH_2C(O)OCH_2SO_3Na$,
$CH_3C(O)CH_2CH_2CH_2CH_2CH_2CH_2CH_2CH_2CH_2OC(O)CH_2SO_3Na$,
$CH_3C(O)CH_2CH_2CH_2CH_2CH_2CH_2CH_2CH_2CH_2SO_3H$,
$CH_3C(O)CH_2CH_2CH_2CH_2CH_2CH_2CH_2CH_2CH_2SO_3K$,
$CH_3C(O)CH_2CH_2CH_2CH_2CH_2CH_2CH_2CH_2CH_2SO_3Li$,
$CH_3C(O)CH_2CH_2CH_2CH_2CH_2CH_2CH_2CH_2CH_2SO_3NH_4$, and
$CH_3C(O)CH_2CH_2CH_2CH_2CH_2CH_2CH_2CH_2C(CH_3)_2SO_3Na$.

In the production method of the present disclosure, two or more of the hydrocarbon surfactants may be used at the same time.

It is also preferable that the hydrocarbon surfactant is a carboxylic acid-type hydrocarbon surfactant. The carboxylic acid-type hydrocarbon surfactant is not limited as long as it has a carboxyl group (—COOH) or a group in which the hydrogen atom of the carboxyl group is substituted with an inorganic cation (for example, metal atoms, ammonium, etc.), and for example, a hydrocarbon surfactant having a group in which the carboxyl group or the hydrogen atom of the carboxyl group is substituted with an inorganic cation can be used from among the hydrocarbon surfactants described above.

The carboxylic acid-type hydrocarbon surfactant is preferably one having a carboxyl group (—COOH) or a group in which the hydrogen atom of the carboxyl group is replaced with an inorganic cation (for example, metal atoms, ammonium, etc.), among at least one selected from the group consisting of the anionic surfactant represented by $R\text{-}L\text{-}M^1$ described above, the surfactant (c) represented by the formula (c) and the surfactant (d) represented by the formula (d).

The hydrocarbon surfactant is preferably at least one selected from the group consisting of:

a polyoxyethylene derivative, an anionic surfactant represented by $R\text{-}L\text{-}M^1$, (wherein R is a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4^-$, $—PO_3^-$ or $—COO^-$, and, $M^1$ is, H, a metal atom, $NR^5_4$, where each $R^5$ may be the same or different and are H or an organic group having 1 to 10 carbon atoms, imidazolium optionally having a substituent, pyridinium optionally having a substituent, or phosphonium optionally having a substituent; and $—ArSO_3^-$ is an aryl sulfonate), a hydrocarbon surfactant having one or more carbonyl groups which are not in a carboxyl group, and a hydrocarbon surfactant obtained by subjecting the hydrocarbon surfactant having one or more carbonyl groups which are not in a carboxyl group to a radical treatment or an oxidation treatment.

In the polymerization step, the tetrafluoroethylene is preferably polymerized substantially in the absence of a fluorine-containing surfactant.

Conventionally, fluorine-containing surfactants have been used for polymerization of polytetrafluoroethylene. However, in the production method of the present disclosure, polytetrafluoroethylene having a low standard specific gravity can be obtained without using a fluorine-containing surfactant by using the hydrocarbon surfactant and adding at least one selected from the group consisting of a radical scavenger and a decomposer of a polymerization initiator.

The expression "substantially in the absence of a fluorine-containing surfactant" as used herein means that the amount of the fluorine-containing surfactant in the aqueous medium is 10 ppm or less, preferably 1 ppm or less, more preferably 100 ppb or less, still more preferably 10 ppb or less, and further preferably 1 ppb or less.

Examples of the fluorine-containing surfactant include anionic fluorine-containing surfactants. The anionic fluorine-containing surfactant may be, for example, a fluorine atom-containing surfactant having 20 or less carbon atoms in total in the portion excluding the anionic group.

The fluorine-containing surfactant may also be a fluorine-containing surfactant having an anionic moiety having a molecular weight of 1,000 or less, more preferably 800 or less, and still more preferably 600 or less.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T (ϕ4.6 mm×250 mm, Tosoh Corp.) as a column and acetonitrile/0.6% by mass $HClO_4$ aqueous solution (=1/1 (vol/vol %)) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}—Rf^{n0}—Y^0 \quad (N^0)$$

wherein $X^{n0}$ is H, Cl, or F; $Rf^{n0}$ is a linear, branched, or cyclic alkylene group having 3 to 20 carbon atoms in which some or all of Hs are replaced by F; the alkylene group optionally containing one or more ether bonds in which some of Hs are replaced by Cl; and $Y^0$ is an anionic group.

The anionic group $Y^0$ may be —COOM, $—SO_2M$, or $—SO_3M$, and may be —COOM or $—SO_3M$.

M is H, a metal atom, $NR^7_4$, imidazolium optionally having a substituent, pyridinium optionally having a substituent, or phosphonium optionally having a substituent, wherein $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

$Rf^{n0}$ may be one in which 50% or more of H has been replaced by fluorine.

Examples of the compound represented by the general formula ($N^0$) include:

a compound represented by the following general formula ($N^1$):

$$X^{n0}—(CF_2)_{m1}—Y^0 \quad (N^1)$$

wherein $X^{n0}$ is H, Cl, and F; m1 is an integer of 3 to 15; and $Y^0$ is as defined above;

a compound represented by the following general formula ($N^2$):

$$Rf^{n1}—O—(CF(CF_3)CF_2O)_{m2}CFX^{n1}—Y^0 \quad (N^2)$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

$$Rf^{n2}(CH_2)_{m3}—(Rf^{n3})_q—Y^0 \quad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

$$Rf^{n4}—O—(CY^{n1}Y^{n2})_pCF_2—Y^0 \quad (N^4)$$

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the following general formula ($N^5$):

($N^5$)

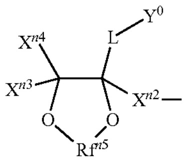

wherein $X^{n2}$, $X^{n3}$, and $X^{n4}$ may be the same or different and are each H, F, or a linear or branched partial or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(CF_2)_{n1}COOM \quad (I)$$

wherein n1 is an integer of 3 to 14; and M is H, a metal atom, $NR^7_4$, imidazolium optionally having a substituent, pyridinium optionally having a substituent, or phosphonium optionally having a substituent, wherein $R^7$ is H or an organic group.

The ω-H perfluorocarboxylic acid (II) is represented by the following general formula (II):

$$H(CF_2)_{n2}COOM \quad (II)$$

wherein n2 is an integer of 4 to 15; and M is as defined above.

The perfluoropolyethercarboxylic acid (III) is represented by the following general formula (III):

$$Rf^1—O—(CF(CF_3)CF_2O)_{n3}CF(CF_3)COOM \quad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4—O—CY^1Y^2CF_2—COOM \quad (V)$$

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \quad (VI)$$

wherein n5 is an integer of 3 to 14; and M is as defined above.

The ω-H perfluorosulfonic acid (VII) is represented by the following general formula (VII):

$$H(CF_2)_{n6}SO_3M \quad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7—O—Rf^8—O—CF_2—COOM \quad (X)$$

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9—O—CY^1Y^2CF_2—SO_3M \quad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

(XII)

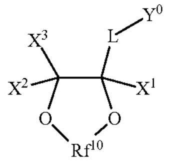

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —$SO_2M$, or —$SO_3M$, and may be —$SO_3M$ or COOM, where M is as defined above.

Examples of L include a single bond, a partially or fully fluorinated alkylene group having 1 to 10 carbon atoms and optionally containing an ether bond.

The compound (XIII) is represented by the following general formula (XIII):

$$Rf^{11}—O—(CF_2CF(CF_3)O)_{n9}(CF_2O)_{n10}CF_2COOM \quad (XIII)$$

wherein $Rf^{11}$ is a fluoroalkyl group having 1 to 5 carbon atoms containing chlorine, n9 is an integer of 0 to 3, n10 is an integer of 0 to 3, and M is the same as defined above. Examples of the compound (XIII) include $CF_2ClO(CF_2CF(CF_3)O)_{n9}(CF_2O)_{n10}CF_2COONH_4$ (mixture having an average molecular weight of 750, in the formula, n9 and n10 are as defined above).

Examples of the anionic fluorine-containing surfactant include a carboxylic acid-based surfactant and a sulfonic acid-based surfactant.

In the polymerization step, TFE may be polymerized under the presence of a polymer containing a polymerization unit based on a monomer (Q) represented by the general formula: $CH_2═CR^{Q1}\text{-}LR^{Q2}$ wherein $R^{Q1}$ represents a hydrogen atom or an alkyl group; L represents a single bond, —CO—O—*, —O—CO—* or —O—; * represents a bonding position with the $R^{Q2}$; and $R^{Q2}$ represents a hydrogen atom, an alkyl group or a nitrile group.

Examples of the monomer (Q) include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, butyl methacrylate, vinyl acetate, and acrylic acid are preferable. Further, one or more kinds of the monomers may be used.

The amount of the polymer containing the polymerization unit based on the monomer (Q) is preferably 10 to 500 mass ppm based on the amount of PTFE finally obtained.

The production method of the present disclosure may include a step of polymerizing the monomer (Q) to obtain a polymer containing a polymerization unit based on the monomer (Q). The polymerization of the monomer (Q) can be performed in an aqueous medium. Examples of the aqueous medium include those described above. In the polymerization of the monomer (Q), a polymerization initiator can be used. As the polymerization initiator used for the polymerization of the monomer (Q), those exemplified as the polymerization initiator used for the polymerization of TFE, for example, a water-soluble radical polymerization initiator, a redox initiator and the like can be used.

By polymerizing the monomer (Q), an aqueous dispersion containing a polymer containing a polymerization unit based on the monomer (Q) is usually obtained. The aqueous dispersion or the aqueous dispersion obtained by diluting the aqueous dispersion with an aqueous medium can be used as the aqueous medium for polymerizing TFE.

The polymerization temperature of the monomer (Q) is preferably 10 to 95° C., more preferably 50 to 90° C. The polymerization time of the monomer (Q) is preferably 5 to 400 minutes, more preferably 5 to 300 minutes. The polymerization pressure of the monomer (Q) is preferably 0.05 to 10 MPaG.

The particle size of the particles of the polymer containing the polymerized unit based on the monomer (Q) is preferably 0.1 to 100 nm, and more preferably 0.1 to 50 nm.

The polymer containing a polymerization unit based on the monomer (Q) may further contain a polymerization unit based on a monomer other than the monomer (Q) (for example, TFE). The content of the polymerization unit based on the monomer (Q) of the polymer is preferably 90% by mass or more, more preferably 95% by mass or more, and 100% by mass based on the total polymerization units of the polymer.

When TFE is polymerized in the presence of the polymer containing a polymerization unit based on the monomer (Q), the resulting PTFE (or PTFE particles) may or may not contain a polymer containing the polymerization unit based on the monomer (Q). Further, as the polymerization unit constituting the obtained PTFE, a polymerization unit based on the monomer (Q) may or may not be contained. The content of the polymerization unit based on the monomer (Q) that can be contained as the polymerization unit constituting PTFE is preferably 10 to 500 mass ppm based on all the polymerization units constituting PTFE.

Polytetrafluoroethylene can be produced by the production method of the present disclosure. The present disclosure also provides PTFE obtained by the production method.

The PTFE is usually stretchable, fibrillatable and non-molten secondary processible. The non-molten secondary processible means a property that the melt flow rate cannot be measured at a temperature higher than the crystal melting point, that is, a property that does not easily flow even in the melting temperature region, in conformity with ASTM D 1238 and D 2116.

The PTFE may be a tetrafluoroethylene (TFE) homopolymer, or may be a modified PTFE obtained by copolymerizing TFE with a modifying monomer. The PTFE is more preferably modified PTFE from the viewpoint of stability and yield of the aqueous dispersion.

The modified PTFE contains 99.0% by mass or more of a polymerization unit based on TFE and 1.0% by mass or less of a polymerization unit based on the modifying monomer.

In the modified PTFE, the content of the polymerization unit based on the modifying monomer (hereinafter, also referred to as "modifying monomer unit") is preferably in the range of 0.00001 to 1.0% by mass based on the total polymerization units. The lower limit of the modifying monomer unit is more preferably 0.0001% by mass, more preferably 0.001% by mass, and still more preferably 0.005% by mass. The upper limit of the content of the modifying monomer unit is 0.90% by mass, 0.50% by mass, 0.40% by mass, 0.30% by mass, 0.20% by mass, 0.15% by mass, 0.10% by mass, and 0.05% by mass in the order of preference.

The term "modifying monomer unit" as used herein means a portion of the molecular structure of the PTFE as a part derived from the modifying monomer, and the term "all the polymerization units" herein means all the portions derived from monomers in the molecular structure of the PTFE.

The contents of the respective monomer units constituting the PTFE can be calculated herein by any appropriate combination of NMR, FT-IR, elemental analysis, X-ray fluorescence analysis, and other known methods in accordance with the types of the monomers.

Further, the content of respective monomer units constituting PTFE can also be obtained by calculation from the amount of the monomer added used for the polymerization.

The modifying monomer is not limited as long as it can be copolymerized with TFE, and examples thereof include fluoromonomers and non-fluoromonomers.

Examples of the non-fluoromonomer include, but are not limited to, a monomer represented by the general formula:

$$CH_2{=}CR^{Q1}\text{-}LR^{Q2}$$

wherein $R^{Q1}$ represents a hydrogen atom or an alkyl group; L represents a single bond, —CO—O—*, —O—CO—* or —O—; * represents a bonding position with the $R^{Q2}$; and $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

Examples of the fluoromonomer include perfluoroolefins such as hexafluoropropylene (HFP); hydrogen-containing fluoroolefins such as trifluoroethylene and vinylidene fluoride (VDF); perhaloolefins such as chlorotrifluoroethylene; fluorovinyl ethers; (perfluoroalkyl)ethylenes; and perfluoroallyl ethers.

Further, one or more of the modifying monomers may be used.

Examples of the fluorovinyl ether include, but are not limited to, a perfluoro unsaturated compound represented by the following general formula (A):

$$CF_2{=}CF{—}ORf \qquad (A)$$

wherein Rf represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the fluorovinyl ether include perfluoro(alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the fluorovinyl ether further include those represented by the general formula (A) in which Rf is a perfluoro (alkoxyalkyl) group having 4 to 9 carbon atoms; those in which Rf is a group represented by the following formula:

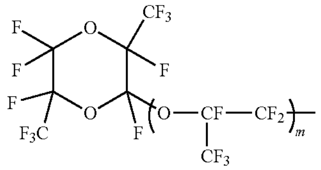

wherein m represents 0 or an integer of 1 to 4; and those in which Rf is a group represented by the following formula:

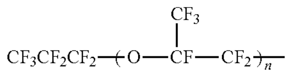

wherein n is an integer of 1 to 4.

Examples of hydrogen-containing fluoroolefins include $CH_2{=}CF_2$, $CFH{=}CH_2$, $CFH{=}CF_2$, $CF_2{=}CFCF_3$, $CH_2{=}CFCF_3$, $CH_2{=}CHCF_3$, $CHF{=}CHCF_3$ (E-form), and $CHF{=}CHCF_3$ (Z-form).

The fluorovinyl ether is preferably at least one selected from the group consisting of perfluoro(methyl vinyl ether) (PMVE), perfluoro(ethyl vinyl ether) (PEVE), and perfluoro (propyl vinyl ether) (PPVE), and more preferably PMVE.

Examples of the (perfluoroalkyl)ethylene (PFAE) include, but are not limited to, (perfluorobutyl) ethylene (PFBE), and (perfluorohexyl) ethylene.

Examples of perfluoroallyl ether include a fluoromonomer represented by the general formula: $CF_2{=}CF{—}CF_2{—}ORf$ wherein Rf represents a perfluoroorganic group.

Rf of the general formula is the same as Rf of the general formula (A). Rf is preferably a perfluoroalkyl group having 1 to 10 carbon atoms or a perfluoroalkoxyalkyl group having 1 to 10 carbon atoms. The perfluoroallyl ether is preferably at least one selected from the group consisting of $CF_2{=}CF{—}CF_2{—}O{—}CF_3$, $CF_2{=}CF{—}CF_2{—}O{—}C_2F_5$, $CF_2{=}CF{—}CF_2{—}O{—}C_3F_7$, and $CF_2{=}CF{—}CF_2{—}O{—}C_4F_9$, more preferably at least one selected from the group consisting of $CF_2{=}CF{—}CF_2{—}O{—}C_2F_5$, $CF_2{=}CF{—}CF_2{—}O{—}C_3F_7$, and $CF_2{=}CF{—}CF_2{—}O{—}C_4F_9$, and still more preferably $CF_2{=}CF{—}CF_2{—}O{—}CF_2CF_2CF_3$.

Preferred examples of the modifying monomer also include a comonomer (3) having a monomer reactivity ratio of 0.1 to 8. The presence of the comonomer (3) makes it possible to obtain modified PTFE particles having a small particle size, and to thereby obtain an aqueous dispersion having high dispersion stability.

Here, the monomer reactivity ratio in copolymerization with TFE is a value obtained by dividing the rate constant in the case that propagating radicals react with TFE by the rate constant in the case that the propagating radicals react with comonomers, in the case that the propagating radicals are terminals of the repeating unit derived from TFE. A smaller monomer reactivity ratio indicates higher reactivity of the comonomers with TFE. The monomer reactivity ratio can be calculated by determining the compositional features of the polymer produced immediately after the initiation of copolymerization of TFE and comonomers and using the Fineman-Ross equation.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPaG, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The composition in the resulting polymer is calculated by appropriate combination of NMR, FT-IR, elemental analysis, and X-ray fluorescence analysis depending on the types of the monomers.

The comonomer (3) having a monomer reactivity ratio of 0.1 to 8 is preferably at least one selected from the group consisting of comonomers represented by the formulas (3a) to (3d):

$$CH_2{=}CH{-}Rf^1 \quad (3a)$$

wherein $Rf^1$ is a perfluoroalkyl group having 1 to 10 carbon atoms;

$$CF_2{=}CF{-}O{-}Rf^2 \quad (3b)$$

wherein $Rf^2$ is a perfluoroalkyl group having 1 to 2 carbon atoms;

$$CF_2{=}CF{-}O{-}(CF_2)_nCF{=}CF_2 \quad (3c)$$

wherein n is 1 or 2; and (3d)

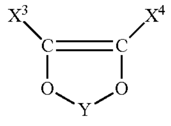

wherein $X^3$ and $X^4$ are each F, Cl, or a methoxy group; and Y is represented by the formula Y1 or Y2;

$$-CF{=}CF- \quad (Y1)$$

(Y2)

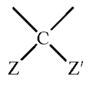

in the formula Y2, Z and Z' are each F or a fluorinated alkyl group having 1 to 3 carbon atoms.

The content of the comonomer (3) unit is preferably in the range of 0.00001 to 1% by mass based on the total polymerization units of modified PTFE. The lower limit thereof is more preferably 0.0001% by mass, still more preferably 0.001% by mass, and further preferably 0.005% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The modifying monomer is preferably at least one selected from the group consisting of hexafluoropropylene, chlorotrifluoroethylene, vinylidene fluoride, fluoro(alkyl vinyl ether), (perfluoroalkyl)ethylene, ethylene, and modifying monomers having a functional group capable of reacting by radical polymerization and a hydrophilic group, in view of obtaining an aqueous dispersion of polytetrafluoroethylene particles having a small average primary particle size, a small aspect ratio, and excellent stability.

From the viewpoint of reactivity with TFE, the modifying monomer preferably contains at least one selected from the group consisting of hexafluoropropylene, perfluoro(alkyl vinyl ether), and (perfluoroalkyl)ethylene.

More preferably, the modifying monomer contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl) ethylene unit is preferably in the range of 0.00001 to 1% by mass based on total polymerization units of modified PTFE. The lower limit of the total amount is 0.0001% by mass, 0.0005% by mass, 0.001% by mass, and 0.005% by mass in the order of preference. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

It is also preferable that the modifying monomer contains a modifying monomer having a functional group capable of reacting by radical polymerization and a hydrophilic group (hereinafter, referred to as "modifying monomer (A)").

The presence of the modifying monomer (A) makes it possible to obtain an aqueous dispersion in which polytetrafluoroethylene particles have a small average primary particle size, a small aspect ratio, and excellent stability.

The amount of the modifying monomer (A) used is preferably an amount exceeding 0.1 ppm of the aqueous medium, more preferably an amount exceeding 0.5 ppm, still more preferably an amount exceeding 1.0 ppm, further preferably 5 ppm or more, and particularly preferably 10 ppm or more. When the amount of the modifying monomer (A) used is too small, the average primary particle size of the obtained modified PTFE may not be reduced.

The amount of the modifying monomer (A) used may be in the above range, but the upper limit may be, for example, 5,000 ppm. Further, in the production method, the modifying monomer (A) may be added to the system during the reaction in order to improve the stability of the aqueous dispersion during or after the reaction.

Since the modifying monomer (A) is highly water-soluble, even if the unreacted modifying monomer (A) remains in the aqueous dispersion, it can be easily removed in the concentration or the coagulation/washing.

The modifying monomer (A) is incorporated into the resulting polymer in the process of polymerization, but the concentration of the modifying monomer (A) in the polymerization system itself is low and the amount incorporated into the polymer is small, so that there is no problem that the heat resistance of modified PTFE is lowered or modified PTFE is colored after sintering.

Examples of the hydrophilic group in the modifying monomer (A) include $—NH_2$, $—PO_3M$, $—P(O)(OM)_2$, $—OPO_3M$, $—OP(O)(OM)_2$, $—SO_3M$, $—OSO_3M$, and —COOM, wherein M represents H, a metal atom, $NR^7_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably $—SO_3M$ or —COOM. The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include a group having an ethylenically unsaturated bond such as a vinyl group and an allyl group. The group having an ethylenically unsaturated bond may be represented by the following formula:

$$CX_1X_3{=}CX_2R—$$

wherein $X_1$, $X_2$ and $X_3$ are each independently F, Cl, H, $CF_3$, $CF_2H$, $CFH_2$ or $CH_3$; and R is a linking group. The linking group R include linking groups as $R^a$ which will be described later. Preferred are groups having an unsaturated bond, such as $—CH{=}CH_2$, $—CF{=}CH_2$, $—CH{=}CF_2$, $—CF{=}CF_2$, $—CH_2—CH{=}CH_2$, $—CF_2—CF{=}CH_2$, $—CF_2—CF{=}CF_2$, $—(C{=}O)—CH{=}CH_2$, $—(C{=}O)—CF{=}CH_2$, $—(C{=}O)—CH{=}CF_2$, $—(C{=}O)—CF{=}CF_2$, $—(C{=}O)—C(CH_3){=}CH_2$, $—(C{=}O)—C(CF_3){=}CH_2$, $—(C{=}O)—C(CH_3){=}CF_2$, $—(C{=}O)—C(CF_3){=}CF_2$, $—O—CH_2—CH{=}CH_2$, $—O—CF_2—CF{=}CH_2$, $—O—CH_2—CH{=}CF_2$, and $—O—CF_2—CF{=}CF_2$.

Since the modifying monomer (A) has a functional group capable of reacting by radical polymerization, it is presumed that when used in the polymerization, it reacts with TFE at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be performed in the presence of one or more of the modifying monomers (A).

In the polymerization, a compound having an unsaturated bond may be used as the modifying monomer (A).

The modifying monomer (A) is preferably a compound represented by the general formula (4):

$$CX^iX^k{=}CX^jR^a—(CZ^1Z^2)_k—Y^3 \quad (4)$$

wherein $X^i$, $X^j$ and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include $—NH_2$, $—PO_3M$, $—P(O)(OM)_2$, $—OPO_3M$, $—OP(O)(OM)_2$, $—SO_3M$, $—OSO_3M$, and —COOM, wherein M represents H, a metal atom, $NR^7_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably $—SO_3M$ or —COOM. The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

The use of the modifying monomer (A) allows for obtaining an aqueous dispersion having a smaller average primary particle size and superior stability. Also, the aspect ratio of the primary particles can be made smaller.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced by a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, $—(C{=}O)—$, $—(C{=}O)—O—$, or a hydrocarbon group containing $—(C{=}O)—$, and these groups optionally contain an oxygen atom, optionally contain a double bond, and optionally contain a functional group.

$R^a$ is preferably $—(C{=}O)—$, $—(C{=}O)—O—$, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced by fluorine.

$R^a$ is preferably at least one selected from $—(CH_2)_a—$, $—(CF_2)_a—$, $—O—(CF_2)_a—$, $—(CF_2)_a—O—(CF_2)_b—$, $—O(CF_2)_a—O—(CF_2)_b—$, $—(CF_2)_a—[O—(CF_2)_b]_c—$, $—O(CF_2)_a—[O—(CF_2)_b]_c—$, $—[(CF_2)_a—O]_b—[(CF_2)_c—O]_d—$, $—O[(CF_2)_a—O]_b—[(CF_2)_c—O]_d—$, $—O—[CF_2CF(CF_3)O]_a—(CF_2)_b—$, $—(C{=}O)—$, $—(C{=}O)—O—$, $—(C{=}O)—(CH_2)_a—$, $—(C{=}O)—(CF_2)_a—$, $—(C{=}O)—O—(CH_2)_a—$, $—(C{=}O)—O—(CF_2)_a—$, $—(C{=}O)—[(CH_2)_a—O]_b—$, $—(C{=}O)—[(CF_2)_a—O]_b—$, $—(C{=}O)—O[(CH_2)_a—O]_b—$, $—(C{=}O)—O[(CF_2)_a—O]_b—$, $—(C{=}O)—O[(CH_2)_a—O]_b—(CH_2)_c—$, $—(C{=}O)—O[(CF_2)_a—O]_b—(CF_2)_c—$, $—(C{=}O)—(CH_2)_a—O—(CH_2)_b—$, $—(C{=}O)—(CF_2)_a—O—(CF_2)_b—$, $—(C{=}O)—O—(CH_2)_a—O—(CH_2)_b—$, $—(C{=}O)—O—(CF_2)_a—O—(CF_2)_b—$, $—(C{=}O)—O—C_6H_4—$, and combinations thereof.

In the formula, a, b, c, and d are independently at least 1 or more, a, b, c and d may independently be 2 or more, 3 or more, 4 or more, 10 or more, or 20 or more. The upper limits of a, b, c, and d are 100, for example.

Specific examples suitable for $R^a$ include $—CF_2—O—$, $—CF_2—O—CF_2—$, $—CF_2—O—CH_2—$, $—CF_2—O—CH_2CF_2—$, $—CF_2—O—CF_2CF_2—$, $—CF_2—O—CF_2CH_2—$, $—CF_2—O—CF_2CF_2CH_2—$, $—CF_2—O—CF(CF_3)—$, $—CF_2—O—CF(CF_3)CF_2—$, $—CF_2—O—CF(CF_3)CF_2—O—$, $—CF_2—O—CF(CF_3)CH_2—$, $—(C{=}O)—$, $—(C{=}O)—O—$, $—(C{=}O)—(CH_2)—$, $—(C{=}O)—(CF_2)—$, $—(C{=}O)—O—(CH_2)—$, $—(C{=}O)—O—(CF_2)—$, $—(C{=}O)—[(CH_2)_2—O]_n—$, $—(C{=}O)—[(CF_2)_2—O]_n—$, $—(C{=}O)—O[(CH_2)_2—O]_n—$, $—(C{=}O)—O[(CF_2)_2—O]_n—$, $—(C{=}O)—O[(CH_2)_2—O]_n—(CH_2)—$, $—(C{=}O)—O[(CF_2)_2—O]_n—(CF_2)—$, $—(C{=}O)—(CH_2)_2—O—(CH_2)—$, $—(C{=}O)—(CF_2)_2—O—(CF_2)—$, $—(C{=}O)—O—(CH_2)_2—O—(CH_2)—$, $—(C{=}O)—O—(CF_2)_2—O—(CF_2)—$, and $—(C{=}O)—O—C_6H_4—$. In particular, preferred for $R^a$ among these is $—CF_2—O—$, $—CF_2—O—CF_2—$, $—CF_2—O—CF_2CF_2—$, $—CF_2—O—CF(CF_3)—$, $—CF_2—O—CF(CF_3)CF_2—$, $—CF_2—O—CF(CF_3)CF_2—O—$, $—(C{=}O)—$, $—(C{=}O)—O—$, $—(C{=}O)—(CH_2)—$, $—(C{=}O)—O—(CH_2)—$, $—(C{=}O)—O[(CH_2)_2—O]_n—$, $—(C{=}O)—O[(CH_2)_2—O]_n—(CH_2)—$, $—(C{=}O)—(CH_2)_2—O—(CH_2)—$, or $—(C{=}O)—O—C_6H_4—$.

In the formula, n is an integer of 1 to 10.

$—R^a—(CZ^1Z^2)_k—$ in the general formula (4) is preferably $—CF_2—O—CF_2—$, $—CF_2—O—CF(CF_3)—$, $—CF_2—O—C(CF_3)_2—$, $—CF_2—O—CF_2—CF_2—$, $—CF_2—O—CF_2—CF(CF_3)—$, $—CF_2—O—CF_2—C(CF_3)_2—$, $—CF_2—O—CF_2CF_2—CF_2—$, $—CF_2—O—CF_2CF_2—CF(CF_3)—$, $—CF_2—O—CF_2CF_2—C(CF_3)_2—$, $—CF_2—O—CF(CF_3)—CF_2—$, $—CF_2—O—CF(CF_3)—CF(CF_3)—$, $—CF_2—O—CF(CF_3)—C(CF_3)_2—$, $—CF_2—O—CF(CF_3)—CF_2—$, $—CF_2—O—CF(CF_3)—CF(CF_3)—$, $—CF_2—O—CF(CF_3)—C(CF_3)_2—$, $—CF_2—O—CF(CF_3)CF_2—CF_2—$, $—CF_2—O—CF(CF_3)CF_2—CF(CF_3)—$, $—CF_2—O—CF(CF_3)CF_2—C(CF_3)_2$~, $—CF_2—O—CF(CF_3)CF_2—O—CF_2—$, $—CF_2—O—CF(CF_3)CF_2—O—CF(CF_3)—CF_2—O—CF(CF_3)CF_2—O—C(CF_3)_2—$, $—(C{=}O)—$, $—(C{=}O)—O—$, $—(C{=}O)—(CH_2)—$, $—(C{=}O)—(CF_2)—(C{=}O)—O—(CH_2)—(C{=}O)—O—(CF_2)—(C{=}O)—[(CH_2)_2—O]_n—(CH_2)—(C{=}O)—[(CF_2)_2—O]_n—(CF_2)—(C{=}O)—[(CH_2)_2—O]_n—(CH_2)—(CH_2)—$, $—(C{=}O)—[(CF_2)_2—O]_n—(CF_2)—(CF_2)—$, $—(C{=}O)—O[(CH_2)_2—O]_n—(CF_2)—$, $—(C{=}O)—O[(CH_2)_2—O]_n—(CH_2)—(CH_2)—$, $—(C{=}O)—O[(CF_2)_2—O]_n—(CF_2)—$, $—(C{=}O)—O[(CF_2)_2—O]_n—(CF_2)—(CF_2)—$, $—(C{=}O)—(CH_2)_2—O—(CH_2)—(CH_2)—$, $—(C{=}O)—(CF_2)_2—O—(CF_2)—(CF_2)—$, $—(C{=}O)—O—(CH_2)_2—O—(CH_2)—(CH_2)—$, $—(C{=}O)—O—(CF_2)_2—O—(CF_2)—(CF_2)—$, $—(C{=}O)—O—(CH_2)—O—(CH_2)—C(CF_3)_2—$, $—(C{=}O)—O—(CF_2)_2—O—(CF_2)—C(CF_3)_2—$, or $—(C{=}O)—O—C_6H_4—C(CF_3)_2—$, and is more preferably $—CF_2—O—CF(CF_3)—$, $—CF_2—O—CF_2—CF(CF_3)—$, $—CF_2—O—CF_2CF_2—CF(CF_3)—$, $—CF_2—O—CF(CF_3)—CF(CF_3)—$, $—CF_2—O—CF(CF_3)CF_2—CF(CF_3)—$, $—CF_2—O—CF(CF_3)CF_2—O—CF(CF_3)—$, $—(C{=}O)—$, $—(C{=}O)—O—(CH_2)—$, $—(C{=}O)—O—(CH_2)—(CH_2)—$, $—(C{=}O)—O[(CH_2)_2—O]_n—(CH_2)—(CH_2)—$, $—(C{=}O)—O—(CH_2)_2—O—(CH_2)—C(CF_3)_2—$, or $—(C{=}O)—O—C_6H_4—C(CF_3)_2—$.

In the formula, n is an integer of 1 to 10.

Specific examples of the compound represented by the general formula (4) include compounds represented by the following formulas:

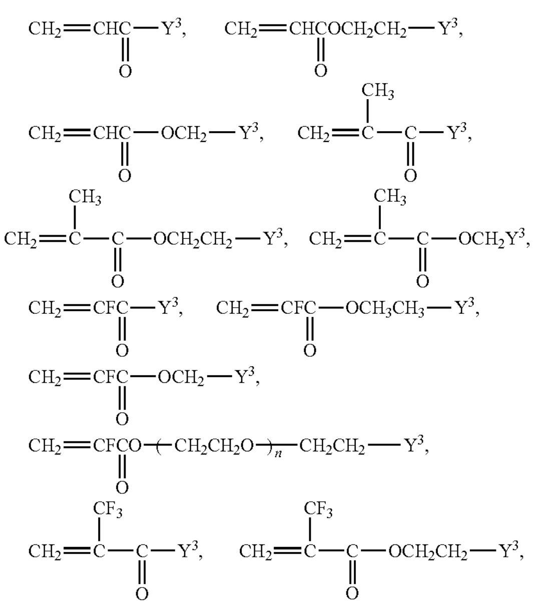

(i)

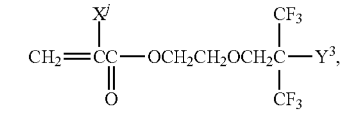

(ii)

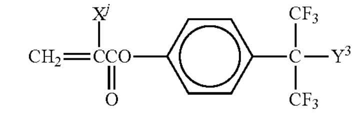

wherein $X_j$ and $Y^3$ are as described above; and n is an integer of 1 to 10.

$R^a$ is preferably a divalent group represented by the following general formula (r1):

$$(C{=}O)_h—(O)_i—CF_2—O—(CX^6{}_2)_e—\{O—CF(CF_3)\}_f—(O)_g— \quad (r1)$$

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the following general formula (r2):

$$(C{=}O)_h—(O)_i—CF_2—O—(CX^7{}_2)_e—(O)_g— \quad (r2)$$

wherein $X^7$ is each independently H, F, or $CF_3$; e is an integer of 0 to 3; g is 0 or 1; h is 0 or 1; and i is 0 or 1.

$—R^a—(CZ^1Z^2)_k—$ in the general formula (4) is also preferably a divalent group represented by the following formula (t1):

$$(C{=}O)_h—(O)_i—CF_2—O—(CX^6_2)_e—\{O—CF(CF_3)\}_f—(O)_g—CZ^1Z^2— \quad (t1)$$

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), $—R^a—(CZ^1Z^2)_k—$ is preferably a divalent group represented by the following formula (t2):

$$(C{=}O)_h—(O)_i—CF_2—O—(CX^7_2)_e—(O)_gCZ^1Z^2— \quad (t2)$$

wherein $X^7$ is each independently H, F, or $CF_3$; e is an integer of 0 to 3; g is 0 or 1; h is 0 or 1; i is 0 or 1; and $Z^1$ and $Z^2$ are each independently F, or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2{=}CF—O—Rf^0—Y^3 \quad (4a)$$

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2{=}CH—O—Rf^0—Y^3 \quad (4b)$$

wherein $Y^3$ is a hydrophilic group; and $Rf^0$ is a perfluorinated divalent linking group as defined in the formula (4a).

In the general formula (4), $Y^3$ is preferably $—OSO_3M$. When $Y^3$ is $—OSO_3M$, examples of the compound represented by the general formula (4) include $CF_2{=}CF(OCF_2CF_2CH_2OSO_3M)$, $CH_2{=}CH((CF_2)_4CH_2OSO_3M)$, $CF_2{=}CF(O(CF_2)_4CH_2OSO_3M)$, $CF_2{=}CF(OCF_2CF(CF_3)CH_2OSO_3M)$, $CF_2{=}CF(OCF_2CF(CF_3)OCF_2CF_2CH_2OSO_3M)$, $CH_2{=}CH((CF_2)_4CH_2OSO_3M)$, $CF_2{=}CF(OCF_2CF_2SO_2N(CH_3)CH_2CH_2OSO_3M)$, $CH_2{=}CH(CF_2CF_2CH_2OSO_3M)$, $CF_2{=}CF(OCF_2CF_2CF_2CF_2SO_2N(CH_3)CH_2CH_2OSO_3M)$, and $CH_2{=}CH(CF_2CF_2CH_2OSO_3M)$. In the formula, M is as described above.

In the general formula (4), $Y^3$ is preferably $—SO_3M$. When $Y^3$ is $—SO_3M$, examples of the compound represented by the general formula (4) include $CF_2{=}CF(OCF_2CF_2SO_3M)$, $CF_2{=}CF(O(CF_2)_4SO_3M)$, $CF_2{=}CF(OCF_2CF(CF_3)SO_3M)$, $CF_2{=}CF(OCF_2CF(CF_3)OCF_2CF_2SO_3M)$, $CH_2{=}CH(CF_2CF_2SO_3M)$, $CF_2{=}CF(OCF_2CF(CF_3)OCF_2CF_2CF_2CF_2SO_3M)$, $CH_2{=}CH((CF_2)_4SO_3M)$, and $CH_2{=}CH(CF_2CF_2SO_3M)$, $CH_2{=}CH((CF_2)_3SO_3M)$. In the formula, M is as described above.

In the general formula (4), $Y^3$ is preferably $—COOM$. When $Y^3$ is $—COOM$, examples of the compound represented by the general formula (4) include $CF_2{=}CF(OCF_2CF_2COOM)$, $CF_2{=}CF(OCF_2CF_2CF_2COOM)$, $CF_2{=}CF(O(CF_2)_5COOM)$, $CF_2{=}CF(OCF_2CF(CF_3)COOM)$, $CF_2{=}CF(OCF_2CF(CF_3)O(CF_2)_nCOOM)$ (wherein n is greater than 1), $CH_2{=}CH(CF_2CF_2COOM)$, $CH_2{=}CH((CF_2)_4COOM)$, $CH_2{=}CH(CF_2CF_2COOM)$, $CH_2{=}CH((CF_2)_3COOM)$, $CF_2{=}CF(OCF_2CF_2SO_2NR'CH_2COOM)$, $CF_2{=}CF(O(CF_2)_4SO_2NR'CH_2COOM)$, $CF_2{=}CF(OCF_2CF(CF_3)SO_2NR'CH_2COOM)$, $CF_2{=}CF(OCF_2CF(CF_3)OCF_2CF_2SO_2NR'CH_2COOM)$, $CH_2{=}CH(CF_2CF_2SO_2NR'CH_2COOM)$, $CF_2{=}CF(OCF_2CF(CF_3)OCF_2CF_2CF_2CF_2SO_2NR'CH_2COOM)$, $CH_2{=}CH((CF_2)_4SO_2NR'CH_2COOM)$, $CH_2{=}CH(CF_2CF_2SO_2NR'CH_2COOM)$, and $CH_2{=}CH((CF_2)_3SO_2NR'CH_2COOM)$. In the formula, R' is H or a $C_{1-4}$ alkyl group, and M is as described above.

In a preferred embodiment, in the general formula (4), $Y^3$ is $—OPO_3M$ or $—OP(O)(OM)_2$. When $Y^3$ is $—OPO_3M$ or $—OP(O)(OM)_2$, examples of the compound represented by the general formula (4) include $CF_2{=}CF(OCF_2CF_2CH_2OP(O)(OM)_2)$, $CF_2{=}CF(O(CF_2)_4CH_2OP(O)(OM)_2)$, $CF_2{=}CF(OCF_2CF(CF_3)CH_2OP(O)(OM)_2)$, $CF_2{=}CF(OCF_2CF(CF_3)OCF_2CF_2CH_2OP(O)(OM)_2)$, $CF_2{=}CF(OCF_2CF_2SO_2N(CH_3)CH_2CH_2OP(O)(OM)_2)$, $CF_2{=}CF(OCF_2CF_2CF_2CF_2SO_2N(CH_3)CH_2CH_2OP(O)(OM)_2)$, $CH_2{=}CH(CF_2CF_2CH_2OP(O)(OM)_2$, $CH_2{=}CH((CF_2)_4CH_2OP(O)(OM)_2)$, $CH_2{=}CH(CF_2CF_2CH_2OP(O)(OM)_2)$, and $CH_2{=}CH((CF_2)_3CH_2OP(O)(OM)_2)$. In the formula, M is as described above.

In a preferred embodiment, in the general formula (4), $Y^3$ is $—PO_3M$ or $—P(O)(OM)_2$. When $Y^3$ is $—PO_3M$ or $—P(O)(OM)_2$, examples of the compound represented by the general formula (4) include $CF_2{=}CF(OCF_2CF_2P(O)(OM)_2)$, $CF_2{=}CF(O(CF_2)_4P(O)(OM)_2)$, $CF_2{=}CF(OCF_2CF(CF_3)P(O)(OM)_2)$, $CF_2{=}CF(OCF_2CF(CF_3)OCF_2CF_2P(O)(OM)$ 2), $CH_2{=}CH(CF_2CF_2P(O)(OM)_2)$, $CH_2{=}CH((CF_2)_4P(O)(OM)_2)$, $CH_2{=}CH(CF_2CF_2P(O)(OM)_2)$, and $CH_2{=}CH((CF_2)_3P(O)(OM)_2)$. In the formula, M is as described above.

The compound represented by the general formula (4) is preferably at least one selected from the group consisting of a monomer represented by the following general formula (5):

$$CX_2{=}CY(—CZ_2—O—Rf—Y^3) \quad (5)$$

wherein X is the same or different, and is —H or —F, Y is —H, —F, an alkyl group or a flourine-containing alkyl group, and Z is the same or different, —H, —F, an alkyl group or a flourine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a monomer represented by the following general formula (6):

$$CX_2{=}CY(\text{—O—}Rf\text{—}Y^3) \quad (6)$$

wherein X is the same or different, and is —H or —F, Y is —H, —F, an alkyl group or a flourine-containing alkyl group, and Rf is a fluorine-containing alkylene group having 1 to 40 carbon atoms or a fluorine-containing alkylene group having 2 to 100 carbon atoms and having an ether bond; and $Y^3$ is as described above; and a monomer represented by the following general formula (7):

$$CX_2{=}CY(\text{—}Rf\text{—}Y^3) \quad (7)$$

wherein X is the same or different, and is —H or —F, Y is —H, —F, an alkyl group or a flourine-containing alkyl group, and Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), each X is —H or —F. X may be both —F, or at least one thereof may be —H. For example, one thereof may be —F and the other may be —H, or both may be —H.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —$CF_3$, and more preferably —F.

In the general formula (5), at least one of X, Y, and Z preferably contains a fluorine atom. For example, X, Y, and Z may be —H, —F, and —F, respectively.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The fluorine-containing alkylene group having an ether bond preferably has 3 or more carbon atoms.

Further, the fluorine-containing alkylene group having an ether bond preferably has 60 or less carbon atoms, more preferably 30 or less carbon atoms, and still more preferably 12 or less carbon atoms.

The fluorine-containing alkylene group having an ether bond is also preferably a divalent group represented by the following formula:

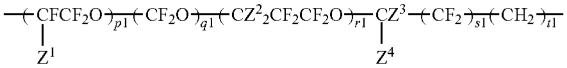

wherein $Z^1$ is F or $CF_3$; $Z^2$ and $Z^3$ are each H or F; $Z^4$ is H, F, or $CF_3$; p1+q1+r1 is an integer of 1 to 10; s1 is 0 or 1; and t1 is an integer of 0 to 5.

Specific examples of the fluorine-containing alkylene group having an ether bond include —$CF(CF_3)CF_2$—O—$CF(CF_3)$—, —$(CF(CF_3)CF_2\text{—}O)_n$—$CF(CF_3)$— (where n is an integer of 1 to 10), —$CF(CF_3)CF_2$—O—$CF(CF_3)CH_2$—, —$(CF(CF_3)CF_2\text{—}O)_n$—$CF(CF_3)CH_2$-(where n is an integer of 1 to 10), —$CH_2CF_2CF_2O$—$CH_2CF_2CH_2$—, —$CF_2CF_2CF_2O$—$CF_2CF_2$—, —$CF_2CF_2CF_2O$—$CF_2CF_2CH_2$—, —$CF_2CF_2O$—$CF_2$—, and —$CF_2CF_2O$—$CF_2CH_2$—.

In the general formula (5), $Y^3$ is preferably —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group and may be the same or different; and any two thereof optionally bind to each other to form a ring.

The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The monomer represented by the general formula (5) is preferably a monomer (5a) represented by the following general formula (5a):

$CH_2{=}CF(—CF_2—O—Rf—Y^3)$ (5a)

wherein Rf and $Y^3$ are as described above.

Specific examples of the monomer represented by the general formula (5a) include a monomer represented by the following formula:

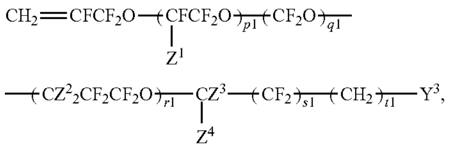

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is as described above, with the proviso that when $Z^3$ and $Z^4$ are both H, p1+q1+r1+s1 is not 0. More specifically, preferred examples thereof include:

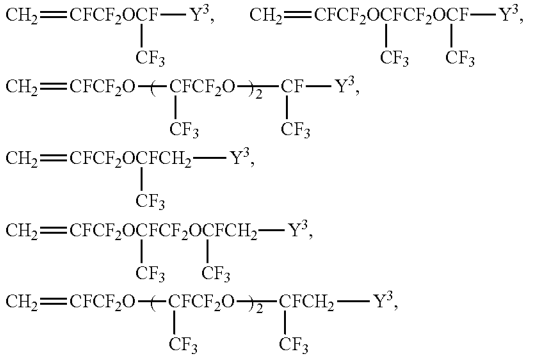

$CH_2{=}CFCF_2OCH_2CF_2—Y^3$, $CH_2{=}CFCF_2O(CH_2CF_2CF_2O)CH_2CF_2—Y^3$, $CH_2{=}CFCF_2OCH_2CF_2CH_2—Y^3$, $CH_2{=}CFCF_2O(CF_2CF_2CF_2O)CH_2CF_2CH_2—Y^3$, $CH_2{=}CFCF_2OCF_2CF_2—Y^3$, $CH_2{=}CFCF_2O(CF_2CF_2CF_2O)CF_2CF_2—Y^3$, $CH_2{=}CFCF_2OCF_2CF_2CH_2—Y^3$, $CH_2{=}CFCF_2O(CF_2CF_2CF_2O)CF_2CF_2CH_2—Y^3$, $CH_2{=}CFCF_2OCF_2—Y^3$, $CH_2{=}CFCF_2O(CF_2CF_2O)CF_2—Y^3$, $CH_2{=}CFCF_2OCF_2CH_2—Y^3$, $CH_2{=}CFCF_2O(CF_2CF_2O)CF_2CH_2—Y^3$,

Of these, preferred are:

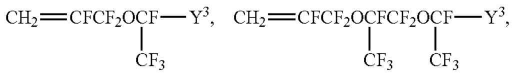

-continued

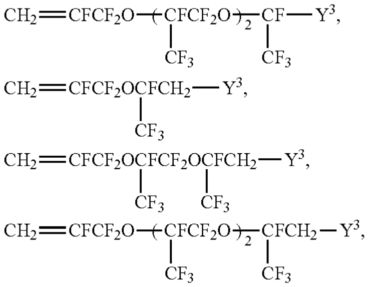

The monomer represented by the general formula (5a) is preferably one in which $Y^3$ in the formula (5a) is —COOM, and in particular, is preferably at least one selected from the group consisting of $CH_2{=}CFCF_2OCF(CF_3)COOM$ and $CH_2{=}CFCF_2OCF(CF_3)CF_2OCF(CF_3)COOM$ (where M is as defined above), and more preferably $CH_2{=}CFCF_2OCF(CF_3)COOM$.

The monomer represented by the general formula (5) is preferably a monomer (5b) represented by the following general formula (5b):

$CX^2_2{=}CFCF_2—O—(CF(CF_3)CF_2O)_{n5}—CF(CF_3)—Y^3$ (5b)

wherein each $X^2$ is the same, and each represent F or H; n5 represents 0 or an integer of 1 to 10; and $Y^3$ is as defined above.

In the formula (5b), n5 is preferably 0 or an integer of 1 to 5, more preferably 0, 1, or 2, and still more preferably 0 or 1 from the viewpoint of stability of the resulting aqueous dispersion. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the monomer represented by the formula (5b) include $CH_2{=}CFCF_2OCF(CF_3)COOM$ and $CH_2{=}CFCF_2OCF(CF_3)CF_2OCF(CF_3)COOM$ (where M is as defined above).

Examples of the monomer represented by the general formula (5) further include a monomer represented by the following general formula (5c):

$CF_2{=}CFCF_2—O—Rf—Y^3$ (5c)

wherein Rf and $Y^3$ are as described above.

More specific examples thereof include:

$CF_2{=}CFCF_2OCF_2CF_2CF_2—Y^3$,

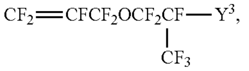

$CF_2{=}CFCF_2OCF_2CF_2CF_2CH_2—Y^3$,

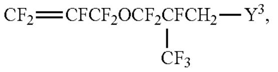

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (6), at least one of X and Y preferably contains a fluorine atom. For example, X, Y, and Z may be —H, —F, and —F, respectively.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less carbon atoms, more preferably 20 or less carbon atoms, and still more preferably 10 or less carbon atoms.

Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

In the general formula (6), $Y^3$ is preferably —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group and may be the same or different; and any two thereof optionally bind to each other to form a ring.

The organic group for $R^7$ is preferably an alkyl group. $R^7$ is preferably H or an organic group having 1 to 10 carbon atoms, more preferably H or an organic group having 1 to 4 carbon atoms, and still more preferably H or an alkyl group having 1 to 4 carbon atoms.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The monomer represented by the general formula (6) is preferably at least one selected from the group consisting of monomers represented by the following general formulas (6a), (6b), (6c), (6d), and (6e):

$$CF_2{=}CF{-}O{-}(CF_2)_{n1}{-}Y^3 \quad (6a)$$

wherein n1 represents an integer of 1 to 10, $Y^3$ is as previously defined.

$$CF_2{=}CF{-}O{-}(CF_2C(CF_3)F)_{n2}{-}Y^3 \quad (6b)$$

wherein n2 represents an integer of 1 to 5, and $Y^3$ is as defined above;

$$CF_2{=}CF{-}O{-}(CFX^1)_{n3}{-}Y^3 \quad (6c)$$

wherein $X^1$ represents F or $CF_3$; n3 represents an integer of 1 to 10; and $Y^3$ is as defined above; and $$CF_2{=}CF{-}O{-}(CF_2CFX^1O)_{n4}{-}(CF_2)_{n6}{-}Y^3 \quad (6d)$$

wherein n4 represents an integer of 1 to 10, n6 represents an integer of 1 to 3, $Y^3$ and $X^1$ are as previously defined.

$$CF_2{=}CF{-}O{-}(CF_2CF_2CFX^1O)_{n5}{-}CF_2CF_2CF_2{-}Y^3 \quad (6e)$$

wherein n5 represents an integer of 0 to 10, $Y^3$ and $X^1$ are as previously defined.

In the formula (6a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the monomer represented by the above formula (6a) include $CF_2{=}CF{-}O{-}CF_2COOM$, $CF_2{=}CF(OCF_2CF_2COOM)$, and $CF_2{=}CF(OCF_2CF_2CF_2COOM)$ (wherein M is the same as defined above).

In the formula (6b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

In the formula (6c), n3 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$ from the viewpoint of improving dispersion stability.

In the formula (6d), $X^1$ is preferably —$CF_3$ from the viewpoint of stability of the aqueous dispersion, n4 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$.

Examples of the monomer represented by the above formula (6d) include $CF_2{=}CFOCF_2CF(CF_3)OCF_2CF_2COOM$, $CF_2{=}CFOCF_2CF(CF_3)OCF_2COOM$, and $CF_2{=}CFOCF_2CF(CF_3)OCF_2CF_2CF_2OOM$ (wherein, M represents H, $NH_4$ or an alkali metal).

In the general formula (6e), n5 is preferably an integer of 5 or less in terms of water solubility, $Y^3$ is preferably —COOM in terms of obtaining moderate water solubility and excellent sedimentation stability of the composition, and M is preferably H or $NH_4$.

Examples of the monomer represented by the general formula (6e) include $CF_2{=}CFOCF_2CF_2CF_2COOM$ (wherein M represents H, $NH_4$, or an alkali metal).

In the general formula (7), Rf is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of:

a monomer represented by the following general formula (7a):

$$CF_2{=}CF{-}(CF_2)_{n1}{-}Y^3 \quad (7a)$$

wherein n1 represents an integer of 1 to 10; and $Y^3$ is as defined above; and a monomer represented by the following general formula (7b):

$$CF_2{=}CF{-}(CF_2C(CF_3)F)_{n2}{-}Y^3 \quad (7b)$$

wherein n2 represents an integer of 1 to 5; and $Y^3$ is as defined above.

$Y^3$ is preferably —$SO_3M$ or —COOM, and M is preferably H, a metal atom, $NR^7_4$, imidazolium optionally having a substituent, pyridinium optionally having a substituent, or phosphonium optionally having a substituent. $R^7$ represents H or an organic group.

In the formula (7a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the perfluorovinylalkyl compound represented by the formula (7a) include $CF_2$═$CFCF_2COOM$, wherein M is as defined above.

In the formula (7b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

The modifying monomer preferably contains a modifying monomer (A), and preferably contains at least one selected from the group consisting of compounds represented by the general formulas (5a), (5c), (6a), (6b), (6c), and (6d), and more preferably contains a compound represented by the general formula (5a) or the general formula (5c).

When the modifying monomer contains the modifying monomer (A), the content of the polymerization unit based on the modifying monomer (A) is preferably in the range of 0.00001 to 1.0% by mass based on the total polymerization unit of modified PTFE. The lower limit thereof is more preferably 0.0001% by mass, still more preferably 0.001% by mass, and particularly preferably 0.005% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The PTFE has preferably a standard specific gravity (SSG) of 2.180 or less, more preferably 2.175 or less, still more preferably 2.170 or less, further preferably 2.165 or less, and still further preferably 2.160 or less. The lower limit value thereof is not limited, but may be, for example, 2.130. The SSG is determined by the water replacement method in conformity with ASTM D-792 using a sample molded in conformity with ASTM D 4895-89.

The average primary particle size of the PTFE is preferably 500 nm or less, more preferably 400 nm or less, and still more preferably 350 nm or less.

The lower limit of the average primary particle size may be, for example, but not limited to, 100 nm. From the viewpoint of molecular weight, it is preferably 150 nm or more, more preferably 200 nm or more, still more preferably 220 nm or more, further preferably 230 nm or more, still further preferably 240 nm or more, and particularly preferably 250 nm or more.

The average primary particle size is determined by diluting an aqueous dispersion of PTFE with water to a solid concentration of 0.15% by mass, measuring the transmittance of projected light at 550 nm to the unit length of the obtained diluted latex, and measuring the number-reference length average primary particle size determined by measuring the directional diameter by transmission electron microscope to prepare a calibration curve, and determining the particle size from the measured transmittance of projected light of 550 nm of each sample using the calibration curve.

The average primary particle size can be determined by dynamic light scattering. The average primary particle size may be determined by preparing an aqueous dispersion with a solid concentration adjusted to 1.0% by mass and using a dynamic light scattering at 25° C. with 70 measurement processes, wherein the solvent (water) has a refractive index of 1.3328 and the solvent has a viscosity of 0.8878 mPa·s. The dynamic light scattering may use, for example, ELSZ-1000S (manufactured by Otsuka Electronics Co., Ltd.).

The PTFE preferably has a peak temperature in the range of 333 to 347° C. More preferably, the peak temperature is 335° C. or higher and 345° C. or lower.

The peak temperature is a temperature corresponding to the maximum value in the heat-of-fusion curve when PTFE, which has no history of heating to a temperature of 300° C. or higher, is heated at a rate of 10° C./min using a differential scanning calorimeter (DSC). The peak temperature can be specified as a temperature corresponding to a maximum value appearing in a differential thermal analysis (DTA) curve obtained by raising the temperature of PTFE, which has no history of heating to a temperature of 300° C. or higher, under a condition of 10° C./min using TG-DTA (thermogravimetric-differential thermal analyzer).

The PTFE preferably has an extrusion pressure of 50 MPa or less, more preferably 40 MPa or less, still more preferably 30.0 MPa or less, and particularly preferably 25.0 MPa or less, and preferably 5.0 MPa or more, and more preferably 10.0 MPa or more. The extrusion pressure is a value determined by the following method according to a method disclosed in Japanese Patent Laid-Open No. 2002-201217.

To 100 g of PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The PTFE is preferably stretchable. The term "stretchable" as used herein is determined based on the following criteria.

To 100 g of PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading. The extrusion speed, i.e. ram speed, is 20 inch/min (51 cm/min). The beading obtained by paste extrusion is heated at 230° C. for 30 minutes to remove the lubricant from the beading. Next, an appropriate length of the beading (extruded body) is cut and clamped at each end leaving a space of 1.5 inch (38 mm) between clamps, and heated to 300° C. in an air circulation furnace. Then, the clamps are moved apart from each other at a desired rate (stretch rate) until the separation distance corresponds to a desired stretch (total stretch) to perform the stretch test. This stretch method essentially follows a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/sec, and the total stretching is 2,400%. This means that a stretched beading having a uniform appearance can be obtained without being cut in this stretching test.

The PTFE preferably has a breaking strength of 8.0 N or more. The breaking strength is more preferably 10.0 N or more, still more preferably 12.0 N or more, more preferably 13.0 N or more, still more preferably 16.0 N or more, and further preferably 19.0 N or more. The higher the breaking strength, the better, but the upper limit of the breaking strength is, for example, 50.0 N. The breaking strength is a value determined by the following method.

First, a stretching test of the extruded beading is performed by the following method to prepare a sample for measuring the breaking strength. The beading obtained by paste extrusion is heated at 230° C. for 30 minutes to remove the lubricant from the beading. Next, an appropriate length of the beading (extruded body) is cut and clamped at each end leaving a space of 1.5 inch (38 mm) between clamps, and heated to 300° C. in an air circulation furnace. Then, the clamps are moved apart from each other at a desired rate (stretch rate) until the separation distance corresponds to a desired stretch (total stretch) to perform the stretch test. This stretch method essentially follows a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/sec, and the total stretching is 2,400%.

The stretched beading obtained in the stretching test (produced by stretching the beading) is clamped by movable jaws having a gauge length of 5.0 cm, and a tensile test is performed at 25° C. at a rate of 300 mm/min, and the strength at the time of breaking is taken as the breaking strength.

The stress relaxation time of the PTFE is preferably 50 seconds or more, more preferably 80 seconds or more, still more preferably 100 seconds or more, and may be 150 seconds or more. The stress relaxation time is a value measured by the following method.

Both ends of the stretched beading obtained in the stretching test are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it is placed in the oven is taken as the stress relaxation time.

The PTFE of the present disclosure may have a thermal instability index (TII) of 20 or more. PTFE having a thermal instability index (TII) of 20 or more can be obtained by using a hydrocarbon surfactant. The TII is preferably 25 or more, more preferably 30 or more, and still more preferably 35 or more. The TII is particularly preferably 40 or more. The TII is measured in conformity with ASTM D 4895-89.

The PTFE may have a 0.1% mass loss temperature of 400° C. or lower. PTFE having a 0.1% mass loss temperature of 400° C. or lower can be obtained by using a hydrocarbon surfactant. The 0.1% mass loss temperature is a value measured by the following method.

Approximately 10 mg of PTFE powder, which has no history of heating to a temperature of 300° C. or higher, is precisely weighed, stored in a dedicated aluminum pan, and measured using TG-DTA (thermogravimetric-differential thermal analyzer). The 0.1% mass loss temperature is the temperature corresponding to the point at which the weight of the aluminum pan is reduced by 0.1% by mass by heating the aluminum pan under the condition of 10° C./min in the temperature range from 25° C. to 600° C. in the air atmosphere.

The PTFE of the present disclosure may have a 1.0% mass loss temperature of 492° C. or lower. PTFE having a 1.0% mass loss temperature of 492° C. or lower can be obtained by using a hydrocarbon surfactant. The 1.0% mass loss temperature is a value measured by the following method.

Approximately 10 mg of PTFE powder, which has no history of heating to a temperature of 300° C. or higher, is precisely weighed, stored in a dedicated aluminum pan, and measured using TG-DTA (thermogravimetric-differential thermal analyzer). The 1.0% mass loss temperature is the temperature corresponding to the point at which the weight of the aluminum pan is reduced by 1.0% by mass by heating the aluminum pan under the condition of 10° C./min in the temperature range from 25° C. to 600° C. in the air atmosphere.

The PTFE is usually stretchable, fibrillatable and non-molten secondary processible.

The non-molten secondary processible means a property that the melt flow rate cannot be measured at a temperature higher than the crystal melting point, that is, a property that does not easily flow even in the melting temperature region, in conformity with ASTM D 1238 and D 2116.

A PTFE aqueous dispersion can be obtained by the method for producing PTFE of the present disclosure. The solid concentration of the PTFE aqueous dispersion is not limited, but may be, for example, 1.0 to 70% by mass. The solid concentration is preferably 8.0% by mass or more, more preferably 10.0% by mass or more, and preferably 60.0% by mass or less, more preferably 50.0% by mass or less.

In the method for producing PTFE of the present disclosure, the adhesion amount to the finally obtained PTFE is preferably 3.0% by mass or less, more preferably 2.0% by mass or less, more preferably 1.0% by mass or less, still more preferably 0.8% by mass or less, further preferably 0.7% by mass or less, and particularly preferably 0.6% by mass or less.

In one embodiment, the PTFE aqueous dispersion contains a fluorine-containing surfactant. By using a fluorine-containing surfactant, it is possible to appropriately adjust the viscosity of the PTFE aqueous dispersion and to improve the miscibility of pigments, fillers, and the like while maintaining excellent dispersion stability of the PTFE aqueous dispersion.

The PTFE aqueous dispersion is preferably substantially free from a fluorine-containing surfactant. The term "substantially free of fluorine-containing surfactant" as used herein means that the fluorine-containing surfactant is 10 ppm or less based on the polytetrafluoroethylene. The content of the fluorine-containing surfactant is preferably 1 ppm or less, more preferably 100 ppb or less, still more preferably 10 ppb or less, further preferably 1 ppb or less, and particularly preferably the fluorine-containing surfactant is below the detection limit as measured by liquid chromatography-mass spectrometry (LC/MS/MS).

The amount of the fluorine-containing surfactant can be determined by a known method. For example, it can be determined by LC/MS/MS analysis. First, the resulting aqueous dispersion is extracted into an organic solvent of methanol, and the extract liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The obtained aqueous dispersion is subjected to Soxhlet extraction with methanol, and the extracted liquid is subjected to LC/MS/MS analysis for quantitative measurement.

That is, the content of the fluorine-containing surfactant can be measured, for example, by adding methanol to the PTFE aqueous dispersion to perform extraction, and subjecting the obtained extracted liquid to LC/MS/MS analysis.

In order to further improve the extraction efficiency, treatment by Soxhlet extraction, ultrasonic treatment or the like may be performed.

The molecular weight information is extracted from the obtained LC/MS/MS spectrum to confirm agreement with the structural formula of the candidate fluorine-containing surfactant.

Thereafter, aqueous solutions having five or more different content levels of the confirmed fluorine-containing surfactant are prepared, LC/MS/MS analysis is performed for each content level, and the relationship between the content and the area for the content is plotted to draw a calibration curve.

Then, using the calibration curve, the area of the LC/MS/MS chromatogram of the fluorine-containing surfactant in the extract can be converted into the content of the fluorine-containing surfactant.

The fluorine-containing surfactant is the same as those exemplified in the production method of the present disclosure. For example, the surfactant may be a fluorine atom-containing surfactant having, in the portion excluding the anionic group, 20 or less carbon atoms in total, may be a fluorine-containing surfactant having an anionic moiety having a molecular weight of 1,000 or less, more preferably 800 or less, and still more preferably 600 or less, and may be a fluorine-containing surfactant having a Log POW of 3.5 or less.

Examples of the fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$). More specific examples thereof include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), and a compound (XII) represented by the general formula (XII), and a compound (XIII) represented by the general formula (XIII).

The PTFE aqueous dispersion may be any of an aqueous dispersion obtained by the polymerization, a dispersion obtained by concentrating this aqueous dispersion or subjecting the aqueous dispersion to dispersion stabilization treatment, and an aqueous dispersion obtained by dispersing powder of the polytetrafluoroethylene into an aqueous medium in the presence of the surfactant.

The PTFE aqueous dispersion may also be produced as a purified aqueous dispersion by a method including a step (I) of bringing the aqueous dispersion obtained by the polymerization into contact with an anion exchange resin or a mixed bed containing an anion exchange resin and a cation exchange resin in the presence of a nonionic surfactant, and/or a step (II) of concentrating the aqueous dispersion obtained by this step such that the solid concentration is 30 to 70% by mass based on 100% by mass of the aqueous dispersion.

The nonionic surfactant may be, but is not limited to, any of those to be described later. The anion exchange resin to be used may be, but is not limited to, a known one. The contact with the anion exchange resin may be performed by a known method.

A method for producing the PTFE aqueous dispersion may include subjecting the aqueous dispersion obtained by the polymerization to the step (I), and subjecting the aqueous dispersion obtained in the step (I) to the step (II) to produce a purified aqueous dispersion. The step (II) may also be carried out without carrying out the step (I) to produce a purified aqueous dispersion. Further, the step (I) and the step (II) may be repeated or combined.

Examples of the anion exchange resin include known ones such as a strongly basic anion exchange resin containing as a functional group a —$N^+X^-$ $(CH_3)_3$ group (wherein X is Cl or OH) or a strongly basic anion exchange resin containing a —$N^+X^-$ $(CH_3)_3(C_2H_4OH)$ group (wherein X is as described above). Specific examples thereof include those described in International Publication No. WO99/62858, International Publication No. WO03/020836, International Publication No. WO2004/078836, International Publication No. WO2013/027850, and International Publication No. WO2014/084399.

Examples of the cation exchange resin include, but are not limited to, known ones such as a strongly acidic cation exchange resin containing as a functional group a —$SO_3^-$ group and a weakly acidic cation exchange resin containing as a functional group a —$COO^-$ group. Of these, from the viewpoint of achieving good removal efficiency, a strongly acidic cation exchange resin is preferred, a $H^+$ form strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in an aqueous dispersion.

The concentration may be carried out by a known method. Specific examples include those described in International Publication No. WO2007/046482 and International Publication No. WO2014/084399.

Examples thereof include phase separation, centrifugal sedimentation, cloud point concentration, electric concentration, electrophoresis, filtration treatment using ultrafiltration, filtration treatment using a reverse osmosis membrane (RO membrane), and nanofiltration treatment. The concentration may concentrate the polytetrafluoroethylene concentration to be 30 to 70% by mass in accordance with the application thereof. The concentration may impair the stability of the dispersion. In such a case, a dispersion stabilizer may be further added.

The dispersion stabilizer added may be the aforementioned nonionic surfactant or various other surfactants.

The nonionic surfactant can be, for example, appropriately selected from compounds described as nucleating agent above.

Also, the cloud point of the nonionic surfactant is a measure of its solubility in water. The surfactant used in the aqueous dispersion of the present disclosure has a cloud point of about 30° C. to about 90° C., preferably about 35° C. to about 85° C.

The total amount of the dispersion stabilizer is 0.5 to 20% by mass in terms of concentration, based on the solid of the dispersion. When the amount of the dispersion stabilizer is less than 0.5% by mass, the dispersion stability may deteriorate, and when the amount thereof is more than 20% by mass, dispersion effects commensurate with the amount thereof may not be obtained, which is impractical. The lower limit of the amount of the dispersion stabilizer is more preferably 2% by mass, while the upper limit thereof is more preferably 12% by mass.

The surfactant may be removed by the concentration operation.

The aqueous dispersion obtained by the polymerization may also be subjected to a dispersion stabilization treatment without concentration depending on the application, to prepare an aqueous dispersion having a long pot life. Examples of the dispersion stabilizer used include the same as those described above.

Examples of the applications of the aqueous dispersion include, but are not limited to, those in which the aqueous dispersion is directly used, such as coating achieved by applying the aqueous dispersion to a base material, drying the dispersion, and optionally sintering the workpiece; impregnation achieved by impregnating a porous support such as nonwoven fabric or a resin molded article into the aqueous dispersion, drying the dispersion, and preferably sintering the workpiece; and casting achieved by applying the aqueous dispersion to a base material such as glass, drying the dispersion, optionally immersing the workpiece into water to remove the base material and to thereby provide a thin film. Examples of such applications include aqueous dispersion-type coating materials, tent membranes, conveyor belts, printed circuit boards (CCL), binders for electrodes, and water repellents for electrodes.

The PTFE aqueous dispersion may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, or for a compound application such as a drip inhibitor.

The PTFE aqueous dispersion is also preferably used as a dust suppression treatment agent. The dust suppression treatment agent can be used in a method for suppressing dust of a dust-generating substance by fibrillating PTFE by mixing the dust suppression treatment agent with the dust-generating substance and applying a compression-shearing action to the mixture at a temperature of 20 to 200° C., for example, methods disclosed in Japanese Patent No. 2827152 and Japanese Patent No. 2538783.

The PTFE aqueous dispersion can be suitably used for, for example, the dust suppression treatment agent composition described in International Publication No. WO2007/004250, and can be suitably used for the dust control treatment method described in International Publication No. WO2007/000812.

The dust suppression treatment agent is suitably used in the fields of building-products, soil stabilizers, solidifying materials, fertilizers, landfill of incineration ash and harmful substance, explosion proof equipment, cosmetics, sands for pet excretion represented by cat sand, and the like.

For the purpose of adjusting the viscosity of the PTFE aqueous dispersion or improving the miscibility with a pigment or filler, the aqueous dispersion may preferably contain an anionic surfactant. The anionic surfactant may be appropriately added to an extent that causes no problems from the economic and environmental viewpoints.

Examples of the anionic surfactant include non-fluorinated anionic surfactants and flourine-containing anionic surfactants. Preferred are fluorine-free, non-fluorinated anionic surfactants, i.e., anionic hydrocarbon surfactants.

For the purpose of adjusting the viscosity, any known anionic surfactants may be used, for example, anionic surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, and salts thereof.

Preferred examples of the alkyl sulfates and salts thereof include ammonium lauryl sulfate and sodium lauryl sulfate.

Preferred examples of the aliphatic carboxylic acids or salts thereof include succinic acid, decanoic acid, undecanoic acid, undecenoic acid, lauric acid, hydrododecanoic acid, or salts thereof.

The amount of the anionic surfactant added depends on the types of the anionic surfactant and other compounding agents, and is preferably 10 to 5,000 ppm based on the mass of the solid of the polytetrafluoroethylene.

The lower limit of the amount of the anionic surfactant added is more preferably 50 ppm or more, still more preferably 100 ppm or more. Too small amount of the anionic surfactant may result in a poor viscosity adjusting effect.

The upper limit of the amount of the anionic surfactant added is more preferably 3,000 ppm or less, still more preferably 2,000 ppm or less. Too large an amount of the anionic surfactant may impair mechanical stability and storage stability of the aqueous dispersion.

For the purpose of adjusting the viscosity of the PTFE aqueous dispersion, components other than the anionic surfactants, such as methyl cellulose, alumina sol, polyvinyl alcohol, and carboxylated vinyl polymers may also be added.

For the purpose of adjusting the pH of the aqueous dispersion, a pH adjuster such as aqueous ammonia may also be added.

The PTFE aqueous dispersion may optionally contain other water soluble polymer compounds to an extent that does not impair the characteristics of the aqueous dispersion.

Examples of the other water soluble polymer compound include, but are not limited to, polyethylene oxide (dispersion stabilizer), polyethylene glycol (dispersion stabilizer), polyvinylpyrrolidone (dispersion stabilizer), phenol resin, urea resin, epoxy resin, melamine resin, polyester resin, polyether resin, silicone acrylic resin, silicone resin, silicone polyester resin, and polyurethane resin.

The aqueous dispersion may further contain a preservative, such as isothiazolone-based, azole-based, pronopol, chlorothalonil, methylsulfonyltetrachloropyridine, carbendazim, fluorfolpet, sodium diacetate, and diiodomethylparatolylsulfone.

The PTFE of the present disclosure may also suitably be obtained by a production method comprising at least one of a step of recovering the PTFE aqueous dispersion obtained by the above method, a step of agglomerating PTFE in a PTFE aqueous dispersion, a step of recovering the agglomerated PTFE, and a step of drying the recovered PTFE at 100 to 300° C. (preferably 100 to 250° C.). By including such a step, PTFE powder can be obtained.

A powder can be produced by agglomerating PTFE contained in the aqueous dispersion. The aqueous dispersion of PTFE can be used for various applications as a powder after being agglomerated, washed, and dried. Agglomeration of the aqueous dispersion of the PTFE is usually performed by diluting the aqueous dispersion obtained by polymerization of polymer latex, for example, with water to a polymer concentration of 10 to 20% by mass, optionally adjusting the pH to a neutral or alkaline, and stirring the polymer more vigorously than during the reaction in a vessel equipped with a stirrer. The agglomeration may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The agglomeration may be continuously performed using a device such as an inline mixer.

The PTFE aqueous dispersion obtained by the production method of the present disclosure has an average primary particle size of 100 to 500 nm, preferably 150 to 450 nm, and more preferably 200 to 400 nm.

When the average primary particle size of the PTFE primary particles is small, the stability of the PTFE aqueous dispersion is improved. However, when the PTFE aqueous dispersion is excessively stabilized, time and labor are required to concentrate the PTFE aqueous dispersion or to agglomerate the PTFE primary particles by applying stirring shearing force to the PTFE aqueous dispersion to obtain the PTFE fine powder, and thus the production efficiency is often impaired. Further, there are many production problems in that when the average primary particle size of the PTFE primary particles is large, the stability of the PTFE aqueous dispersion decreases and the amount of the agglomerate during the polymerization of TFE increases, which is disadvantageous in terms of productivity; when the PTFE aqueous dispersion is concentrated after the polymerization of TFE, a large amount of the agglomerate is generated in the concentration tank; the sedimentation stability of the concentrated liquid is impaired and the storage stability is lowered; when a stirring shearing force is applied to the PTFE aqueous dispersion to agglomerate the PTFE primary particles to obtain the PTFE fine powder, a large amount of the agglomerate is generated before reaching the aggregation tank from the polymerization tank and the piping is clogged; and the yield is greatly reduced. When the average primary particle size of the PTFE primary particles is within the above range, the stability of the PTFE aqueous dispersion is excellent to such an extent that the subsequent processability, moldability and the like are not deteriorated, and molded article excellent in heat resistance and the like are easily obtained.

In the present disclosure, the PTFE aqueous dispersion used for coagulation stirring (hereinafter, also referred to as the PTFE dispersion for coagulation) has a PTFE solid concentration of 10 to 25% by mass. The PTFE solid concentration is preferably 10 to 22% by mass, more preferably 10 to 20% by mass. In order to increase the bulk density of the PTFE fine powder, the PTFE solid concentration in the PTFE aqueous dispersion for coagulation is preferably high. When the PTFE solid concentration in the PTFE aqueous dispersion for coagulation is high, the degree of association of the primary particles of PTFE increases, and the primary particles of PTFE are densely associated and agglomerated to form granules. When the PTFE solid concentration of the PTFE aqueous dispersion for coagulation is less than 10% by mass, the agglomeration density of the primary particles of PTFE tends to become sparse, and it is difficult to obtain the PTFE fine powder having a high bulk density. On the other hand, if the PTFE solid concentration in the PTFE aqueous dispersion for coagulation is too high, the concentration of unagglomerated PTFE increases and the unagglomerated PTFE solid concentration in the coagulated discharge water increases. When the unagglomerated PTFE solid concentration in the coagulated discharge water is high, the piping clogging and discharge water treatment are costly and time-consuming. In addition, the yield of PTFE fine powder decreases. The unagglomerated PTFE solid concentration in the coagulated discharge water is preferably low from the viewpoint of productivity of the PTFE fine powder, more preferably less than 0.4% by mass, still more preferably less than 0.3% by mass, and particularly preferably less than 0.2% by mass. When the PTFE solid concentration of the PTFE aqueous dispersion for coagulation exceeds 25% by mass, it is difficult to reduce the unagglomerated PTFE solid concentration of the coagulated discharge water to less than 0.4% by mass.

Since the PTFE solid concentration in the PTFE aqueous dispersion obtained in the above step is about 10 to 45% by mass when the concentration of the solid PTFE is high, a diluent solvent such as water is added to adjust the concentration to 10 to 25% by mass. Further, when the PTFE solid concentration in the PTFE aqueous dispersion after polymerization is 10 to 25% by mass, the PTFE aqueous dispersion can be used as it is as the PTFE aqueous dispersion for coagulation.

Pigment-containing or filler-containing PTFE powder in which pigments and fillers are uniformly mixed can be obtained by adding pigments for coloring and various fillers for improving mechanical properties before or during the aggregation.

The wet powder obtained by agglomerating the PTFE in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the PTFE in the form of fine powder. This is because the particles made of such PTFE are easily formed into fibrils even with a small shearing force and lose its original, stable particulate structure. The drying is performed at a drying temperature of 10 to 300° C., preferably 100 to 300° C. (more preferably 100 to 250° C.).

The PTFE powder preferably has an average particle size (average secondary particle size) of 100 to 2,000 μm. The lower limit of the average secondary particle size is more preferably 200 μm or more, and still more preferably 300 μm or more. The upper limit of the average secondary particle size is preferably 1,000 μm or less, more preferably 800 μm or less, and particularly preferably 700 μm or less. The average particle size is a value measured in conformity with JIS K 6891.

In one embodiment, the PTFE powder contains a fluorine-containing surfactant. By using a fluorine-containing surfactant, the viscosity of the PTFE aqueous dispersion can be appropriately adjusted and the miscibility of pigments, fillers, and the like can be improved while maintaining the excellent dispersion stability of the PTFE aqueous dispersion, so that a PTFE powder having a desired composition can be easily produced.

The PTFE powder is preferably substantially free from a fluorine-containing surfactant. The term "substantially free from fluorine-containing surfactant" as used herein means that the fluorine-containing surfactant is 10 ppm or less based on the polytetrafluoroethylene. The content of the fluorine-containing surfactant is preferably 1 ppm or less, more preferably 100 ppb or less, still more preferably 10 ppb or less, further preferably 1 ppb or less, and particularly preferably the fluorine-containing surfactant is equal or below the detection limit as measured by liquid chromatography-mass spectrometry (LC/MS/MS).

The amount of the fluorine-containing surfactant can be determined by a known method. For example, it can be determined by LC/MS/MS analysis. First, the resulting powder is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The resulting powder is subjected to Soxhlet extraction with methanol, and the extracted liquid is subjected to LC/MS/MS analysis for quantitative measurement.

That is, the content of the fluorine-containing surfactant can be measured, for example, by adding methanol to the PTFE powder to perform extraction, and subjecting the obtained extracted liquid to LC/MS/MS analysis.

In order to further improve the extraction efficiency, treatment by Soxhlet extraction, ultrasonic treatment or the like may be performed.

The molecular weight information is extracted from the LC/MS/MS spectrum to confirm agreement with the structural formula of the candidate fluorine-containing surfactant.

Thereafter, aqueous solutions having five or more different content levels of the confirmed fluorine-containing surfactant are prepared, LC/MS/MS analysis is performed for each content level, and the relationship between the content and the area for the content is plotted to draw a calibration curve.

Then, using the calibration curve, the area of the obtained LC/MS/MS chromatogram of the fluorine-containing surfactant in the extract can be converted into the content of the fluorine-containing surfactant.

The fluorine-containing surfactant is the same as those exemplified in the production method of the present disclosure. For example, the surfactant may be a fluorine atom-containing surfactant having, in the portion excluding the anionic group, 20 or less carbon atoms in total, may be a fluorine-containing surfactant having an anionic moiety having a molecular weight of 1,000 or less, more preferably 800 or less, and still more preferably 600 or less, and may be a fluorine-containing surfactant having a Log POW of 3.5 or less.

Examples of the fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$). More specific examples thereof include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an co-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), and a compound (XII) represented by the general formula (XII), a compound (XIII) represented by the general formula (XIII).

The PTFE powder is preferable for molding, and suitable applications include hydraulic systems such as aircraft and automobiles, fuel system tubes and the like, flexible hoses such as chemicals and steam, and electric wire coating applications. The PTFE powder can also be used as a binder for batteries and as a dustproof material. It is also possible to produce a stretched body from the PTFE powder.

The present disclosure also provides a stretched body obtained by stretching the PTFE. The PTFE has stretchability and non-melt processability, and is also useful as a raw material for a stretched body (porous body). By stretching the PTFE, a stretched body having excellent breaking strength and stress relaxation time can be obtained. For stretching, conventionally known stretching methods and conditions for PTFE can be adopted, and the stretching is not limited. The stretched body of the present disclosure can be produced by paste-extruding and rolling PTFE, followed by non-sintered or semi-sintered and stretching it in at least one direction (preferably roll-stretched in the rolling direction and then stretched in the transverse direction by a tenter). As the stretching conditions, a speed of 5 to 2,000%/sec and a stretching magnification of 200% or more are preferably employed. Stretching allows easy formation of fibrils of PTFE, resulting in a stretched body including nodes and fibers. The stretched body of the present disclosure may contain only PTFE, or may contain PTFE and the pigments and fillers, and it is preferable that the stretched body contains only PTFE.

The stretched body of the present disclosure preferably has a breaking strength of 8.0 N or more, more preferably 10.0 N or more, still more preferably 12.0 N or more, further preferably 13.0 N or more, still further preferably 16.0 N or more, and particularly preferably 19.0 N or more. The higher the breaking strength, the better, but the upper limit of the breaking strength is, for example, 50.0 N.

The breaking strength of the stretched body is determined by clamping the stretched body by movable jaws having a gauge length of 5.0 cm and performing a tensile test at 25° C. at a rate of 300 mm/min, in which the strength at the time of breaking is taken as the breaking strength.

The stress relaxation time of the stretched body of the present disclosure is preferably 50 seconds or more, more preferably 80 seconds or more, still more preferably 100 seconds or more, and may be 150 seconds or more. The stress relaxation time is a value measured by the following method.

In order to determine the stress relaxation time of the stretched body, both ends of the stretched body are tied to a fixture to form a tightly stretched sample having an overall length of 8 inches (20 cm), and the fixture is then placed in an oven through a (covered) slit on the side of the oven, while keeping the oven at 390° C. The time it takes for the sample to break after it is placed in the oven is taken as the stress relaxation time.

The stretched body of the present disclosure preferably has a peak temperature of 325 to 350° C. Further, the stretched body of the present disclosure preferably has a peak temperature between 325 and 350° C. and between 360 and 390° C. The peak temperature is a temperature corresponding to the maximum value in the heat-of-fusion curve when the stretched body is heated at a rate of 10° C./min using a differential scanning calorimeter (DSC). The peak temperature can be specified as a temperature corresponding to a maximum value appearing in a differential thermal analysis (DTA) curve obtained by raising the temperature of the stretched body under a condition of 10° C./min using TG-DTA (thermogravimetric-differential thermal analyzer).

The stretched body of the present disclosure preferably has a porosity in the range of 30% to 99%. The porosity is more preferably 40% or more, still more preferably 50% or more, further preferably 60% or more, and particularly preferably 70% or more. Too small proportion of PTFE in the stretched body may result in insufficient strength of the stretched body, so the porosity is preferably 95% or less, and more preferably 90% or less. The porosity of the stretched body can be calculated from the following formula using the density ρ of the stretched body.

$$\text{Porosity (\%)} = [(2.2-\rho)/2.2]\times 100$$

In the formula, 2.2 is the true density (g/cm$^3$) of PTFE.

Regarding the density p of the stretched body, when the stretched body is in the form of a film or a sheet, a mass of the sample cut into a specific size is measured by a precision scale, and the density of the sample is calculated from the measured mass and the film thickness of the sample by the following formula.

$$\rho = M/(4.0\times 12.0\times t)$$

ρ=density (film density) (g/cm$_3$)

M=mass (g)

t=film thickness (cm)

The measurement and calculation are performed at three points, and the average value thereof is taken as the film density.

As for the film thickness, five stretched bodies are stacked and the total film thickness is measured using a film thickness meter, and the value obtained by dividing the value by five is taken as the thickness of one film.

Regarding the density p of the stretched body, when the stretched body has a cylindrical shape, a mass of the sample cut into a certain length is measured by a precision scale, and the density of the sample is calculated from the measured mass and the outer diameter of the sample by the following formula.

$$\rho = M/(r\times r\times \pi)\times L$$

ρ=density (g/cm$_3$)

M=mass (g)

r=radius (cm)

L=length (cm)

π=pi

The outer diameter of the stretched body is measured using a laser displacement sensor. The radius is the value obtained by dividing the value by 2.

The above measurement and calculation are performed at three points, and the average value thereof is taken as the density.

In one embodiment, the stretched body contains a fluorine-containing surfactant. By using a fluorine-containing surfactant, the viscosity of the PTFE aqueous dispersion can be appropriately adjusted while maintaining the excellent dispersion stability of the PTFE aqueous dispersion, so that a PTFE powder having a desired stretched body can be easily produced.

The stretched body of the present disclosure is preferably substantially free of a fluorine-containing surfactant. The term "substantially free from fluorine-containing surfactant" as used herein means that the fluorine-containing surfactant is 10 ppm or less based on the polytetrafluoroethylene. The content of the fluorine-containing surfactant is preferably 1 ppm or less, more preferably 100 ppb or less, still more preferably 10 ppb or less, further preferably 1 ppb or less, and particularly preferably the fluorine-containing surfactant is equal or below the detection limit as measured by liquid chromatography-mass spectrometry (LC/MS/MS).

The amount of the fluorine-containing surfactant can be determined by a known method. For example, it can be determined by LC/MS/MS analysis. First, the refined stretched body is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The powder obtained by pulverizing the resulting stretched body is subjected to Soxhlet extraction with methanol, and the extracted liquid is subjected to LC/MS/MS analysis for quantitative measurement.

That is, the content of the fluorine-containing surfactant can be measured, for example, by adding methanol to the refined stretched body to perform extraction, and subjecting the obtained extracted liquid to LC/MS/MS analysis.

In order to further improve the extraction efficiency, treatment by Soxhlet extraction, ultrasonic treatment or the like may be performed.

The molecular weight information is extracted from the obtained LC/MS/MS spectrum to confirm agreement with the structural formula of the candidate fluorine-containing surfactant.

Thereafter, aqueous solutions having five or more different content levels of the confirmed fluorine-containing surfactant are prepared, LC/MS/MS analysis is performed for each content level, and the relationship between the content and the area for the content is plotted to draw a calibration curve.

Then, using the calibration curve, the area of the LC/MS/MS chromatogram of the fluorine-containing surfactant in the extracted liquid can be converted into the content of the fluorine-containing surfactant.

The fluorine-containing surfactant is the same as those exemplified in the production method of the present disclosure. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$). More specific examples thereof include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

The stretched body of the present disclosure is also preferably in the form of a film, a tube, fibers, or rods.

When the stretched body of the present disclosure is in the form of a film (stretched film or porous film), the stretched body can be formed by stretching by a known PTFE stretching method.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Semi-sintering treatment is also preferably performed before stretching.

The stretched body of the present disclosure is a porous body having a high porosity, and can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

—Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

—Sealant Field

Examples of the applications in this field include gaskets, packings, pump diaphragms, pump tubes, and sealants for aircraft.

—Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

—Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

—Liquid Filter Field

Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial discharge water).

—Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

—Textile Field

Examples of the applications in this field include PTFE fibers (fiber materials), machine threads (textiles), weaving yarns (textiles), and ropes.

—Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

Although the embodiments have been described above, it will be understood that various modifications of the embodiments and details are possible without departing from the purpose and scope of the claims.

EXAMPLES

The present disclosure is described with reference to examples, but the present disclosure is not intended to be limited by these examples.

The parameters in the Examples were determined by the following methods.

Standard Specific Gravity (SSG)

Using a sample molded in conformity with ASTM D4895-89, the SSG was determined by the water replacement method in conformity with ASTM D-792.

Solid Concentration

In an air dryer, 1 g of PTFE aqueous dispersion was dried at a condition of 150° C. for 60 minutes, and the ratio of the mass of the non-volatile matter to the mass of the aqueous dispersion (1 g) was expressed by percentage and taken as the solid concentration thereof.

Average Primary Particle Size

The calibration curve is prepared by diluting an aqueous dispersion of PTFE with water to a solid concentration of 0.15% by mass, measuring the transmittance of projected light at 550 nm to the unit length of the obtained diluted latex, and measuring the number-reference length average primary particle size determined by measuring the directional diameter by transmission electron microscope. Using this calibration curve, the average primary particle size is determined from the measured transmittance of the projected light at 550 nm of each sample.

Alternatively, the average primary particle size can be determined by dynamic light scattering. In the dynamic light scattering, measurement was performed by preparing a fluoropolymer aqueous dispersion adjusted to a fluoropolymer solid concentration of about 1.0% by mass using ELSZ-1000S (manufactured by Otsuka Electronics Co., Ltd.) at 25° C. with 70 measurement processes. The refractive index of the solvent (water) is 1.3328, and the viscosity of the solvent (water) is 0.8878 mPa·s.

Measurement of Extrusion Pressure

To 100 g of resulting PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min). The value obtained by measuring the load when the extrusion load became balanced in the paste extrusion and dividing the measured load by the cross-sectional area of the cylinder used in the paste extrusion was taken as the extrusion pressure.

Stretching Test

The beading obtained by paste extrusion is heated at 230° C. for 30 minutes to remove the lubricant from the beading. Next, an appropriate length of the beading (extruded body) is cut and clamped at each end leaving a space of 1.5 inch (38 mm) between clamps, and heated to 300° C. in an air circulation furnace. Then, the clamps are moved apart from each other at a desired rate (stretch rate) until the separation distance corresponds to a desired stretch (total stretch) to perform the stretch test. This stretch method essentially follows a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/sec, and the total stretching is 2,400%.

Breaking Strength

The stretched beading obtained in the stretching test (produced by stretching the beading), a tensile test was performed at 25° C. at a rate of 300 mm/min, and the strength at the time of breaking was determined as the breaking strength.

Stress Relaxation Time

Both ends of the stretched beading obtained in the stretching test are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it was placed in the oven was determined as the stress relaxation time.

Appearance of Stretched Product

The appearance of the stretched beading (those produced by stretching the headings) obtained in the stretching test was visually observed.

Uniform: The appearance of the stretched beading was uniform.

Non-uniform: The appearance of the stretched beading was non-uniform, with cracks, swelling, and coarseness and fineness observed in the stretched beading.

The surfactant A used in Synthesis Example 1, Example 2 and Example 3 below is sodium 10-oxoundecyl sulfate.

Example 1

To a reactor made of SUS with an internal volume of 6 L and equipped with a stirrer, 3,600 g of deionized degassed water, 180 g of paraffin wax, and 0.018 g of Pluronic® 31R1 (manufactured by BASF) were added. The reactor was sealed and the system was purged with nitrogen, so that oxygen was removed. The reactor was heated to 103° C., and after holding for 40 minutes, the reactor was cooled to 85° C. The reactor was purged with TFE three times to bring the reactor pressure to 0.33 MPaG. Then, 0.0178 g of ammonium persulfate (APS) was added thereinto and held for 120 min. TFE was filled into the reactor such that the reactor was adjusted to 2.65 MPaG. Then, 0.5724 g of disuccinic acid peroxide (DSP) serving as a polymerization initiator was charged thereinto. TFE was charged so as to keep the reaction pressure constant at 2.65 MPaG. In 288 g of deionized water, 12.0 g of sodium dodecyl sulfate, 0.05 g of iron (II) sulfate heptahydrate, and 0.02 g of 95% sulfuric acid were dissolved and stirred to obtain a homogeneous aqueous solution C. At the same time as TFE was started to be charged, an aqueous solution C was started to be continuously charged. When 345 g of TFE was charged, an aqueous solution of disuccinic acid peroxide having a concentration of 2.0% by mass was started to be continuously charged into the reactor. When 440 g of TFE was charged, 16.2 g of deionized degassed water in which 0.324 g of hydroquinone was dissolved was added. When 900 g of TFE was charged, the stirring was stopped and the pressure was released until the reactor was adjusted to the atmospheric pressure. By the end of the reaction, 115 g of the aqueous solution C and 22.3 g of the disuccinic acid peroxide aqueous solution having a concentration of 2.0% by mass were charged. The content was collected from the reactor and cooled so that the paraffin wax was separated, whereby a PTFE aqueous dispersion was obtained.

The solid concentration of the resulting PTFE aqueous dispersion was 21.6% by mass, and the average primary particle size was 322 nm.

The resulting aqueous dispersion of PTFE was diluted with deionized water to have a solid concentration of about 10% by mass and coagulated under a high-speed stirring condition. Water was separated and the coagulated wet powder was dried at 210° C. for 18 hours.

Various physical property evaluations of the resulting PTFE powder were measured. The results are shown in Table 1.

Comparative Example 1

Instead of the aqueous solution C, a sodium dodecyl sulfate aqueous solution having a concentration of 4% by mass was continuously charged, and polymerization was carried out in the same manner as in Example 1 except that hydroquinone was not added.

The solid concentration of the resulting PTFE aqueous dispersion was 20.9% by mass, and the average primary particle size was 268 nm.

The resulting aqueous dispersion of PTFE was diluted with deionized water to have a solid concentration of about 10% by mass and coagulated under a high-speed stirring condition. Water was separated and the coagulated wet powder was dried at 210° C. for 18 hours. Various physical properties of the resulting PTFE powder were measured. The results are shown in Table 1. Since the beading broke during the stretching test, a stretched beading could not be obtained and the breaking strength of the stretched beading could not be measured.

Synthesis Example 1

To a glass reactor with an internal volume of 1 L and equipped with a stirrer, 588.6 g of deionized water and 70.0 g of the surfactant A were added. The reactor was sealed, and the system was purged with nitrogen, so that oxygen was removed. The reactor was heated up to 90° C. and pressurized to 0.4 MPaG with nitrogen. Then, 41.4 g of ammonium persulfate (APS) was charged thereinto and stirred for 3 hours. The stirring was stopped, the pressure was released until the reactor was adjusted to the atmospheric pressure, and the reactor was cooled to obtain an aqueous surfactant solution B.

Example 2

To a reactor made of SUS with an internal volume of 6 L and equipped with a stirrer, 3,600 g of deionized degassed water, 180 g of paraffin wax, and 0.540 g of surfactant A were added. The reactor was sealed and the system was purged with nitrogen, so that oxygen was removed. The reactor was heated up to 70° C. and TFE was filled into the reactor such that the reactor was adjusted to 2.70 MPaG. Then, 0.620 g of ammonia persulfate (APS) and 1.488 g of disuccinic acid peroxide (DSP) serving as polymerization initiators were charged thereinto. At the same time as TFE was started to be charged, an aqueous surfactant solution B was continuously started to be charged. When 540 g of TFE was charged, 20 g of deionized degassed water in which 0.76 g of hydroquinone was dissolved was added. When 1,200 g of TFE was charged, the stirring was stopped and the pressure was released until the reactor was adjusted to the atmospheric pressure. By the end of the reaction, 103 g of the aqueous surfactant solution B was charged. The content was collected from the reactor and cooled so that the paraffin wax was separated, whereby a PTFE aqueous dispersion was obtained.

The solid concentration of the resulting PTFE aqueous dispersion was 25.9% by mass, and the average primary particle size was 290 nm.

The resulting aqueous dispersion of PTFE was diluted with deionized water to have a solid concentration of about 10% by mass and coagulated under a high-speed stirring condition. Water was separated and the coagulated wet powder was dried at 210° C. for 18 hours. Various physical properties of the resulting PTFE powder were measured. The results are shown in Table 1.

Example 3

Polymerization was performed in the same manner as in Example 2, except that the polymerization temperature was 90° C., the amount of ammonium persulfate (APS) added was 0.031 g, and ammonium sulfite monohydrate (0.27 g) was added instead of hydroquinone. When 900 g of TFE was charged, the stirring was stopped and the pressure was released until the reactor was adjusted to the atmospheric pressure. By the end of the reaction, 103 g of the aqueous surfactant solution B was charged. The content was collected from the reactor and cooled so that the paraffin wax was separated, whereby a PTFE aqueous dispersion was obtained.

The solid concentration of the resulting PTFE aqueous dispersion was 21.2% by mass, and the average primary particle size was 259 nm.

The resulting aqueous dispersion of PTFE was diluted with deionized water to have a solid concentration of about 10% by mass and coagulated under a high-speed stirring condition. Water was separated and the coagulated wet powder was dried at 210° C. for 18 hours. Various physical properties of the resulting PTFE powder were measured. The results are shown in Table 1.

Example 4

To a reactor made of SUS with an internal volume of 6 L and equipped with a stirrer, 3,600 g of deionized degassed water, and 180 g of paraffin wax were added. The reactor was sealed and the system was purged with nitrogen, so that oxygen was removed. The reactor was depressurized and 0.065 ml of butyl methacrylate was charged. The reactor was heated to 75° C., 0.006 g of ammonia persulfate (APS) was charged and held for 10 minutes to polymerize butyl methacrylate. Then, TFE was filled into the reactor such that the reactor was adjusted to 1.96 MPaG. Then, 0.032 g of ammonia persulfate (APS) and 3.13 g of disuccinic acid peroxide (DSP) serving as polymerization initiators were charged thereinto. At the same time as TFE was started to be charged, the sodium dodecyl sulfate aqueous solution having a concentration of 1.5% by mass was started to be continuously charged. When 708 g of TFE was charged, an aqueous sodium sulfite solution having a concentration of 0.5% by mass was continuously added. When 1,200 g of TFE was charged, the stirring was stopped and the pressure was released until the reactor was adjusted to the atmospheric pressure. By the end of the reaction, 140 g of a sodium dodecyl sulfate aqueous solution having a concentration of 1.5% by mass and 50 g of a sodium sulfite aqueous solution were charged. The content was collected from the reactor and cooled so that the paraffin wax was separated, whereby a PTFE aqueous dispersion was obtained.

The solid concentration of the resulting PTFE aqueous dispersion was 25.1% by mass, and the average primary particle size was 265 nm.

The resulting aqueous dispersion of PTFE was diluted with deionized water to have a solid concentration of about 10% by mass and coagulated under a high-speed stirring condition. Water was separated and the coagulated wet powder was dried at 250° C. for 18 hours. Various physical properties of the resulting PTFE powder were measured. The results are shown in Table 1.

Comparative Example 2

Polymerization was carried out in the same manner as in Example 4 except that an aqueous sodium sulfite solution was not charged.

The solid concentration of the resulting PTFE aqueous dispersion was 25.1% by mass, and the average primary particle size was 263 nm.

The resulting aqueous dispersion of PTFE was diluted with deionized water to have a solid concentration of about 10% by mass and coagulated under a high-speed stirring condition. Water was separated and the coagulated wet powder was dried at 250° C. for 18 hours. Various physical properties of the resulting PTFE powder were measured. The results are shown in Table 1.

TABLE 1

| | SSG — | Extrusion pressure MPa | Breaking strength N | Stress relaxation time sec | Stretched product appearance — |
|---|---|---|---|---|---|
| Example 1 | 2.180 | 14.8 | 8.9 | 58 | Uniform |
| Comparative Example 1 | 2.188 | 18.5 | | | |
| Example 2 | 2.151 | 19.5 | 20.3 | 312 | Uniform |
| Example 3 | 2.175 | 19.0 | 17.2 | 128 | Uniform |
| Example 4 | 2.158 | 26.1 | 21.0 | 186 | Uniform |
| Comparative Example 2 | 2.160 | 23.8 | 18.6 | 104 | Uniform |

The invention claimed is:

1. A method for producing polytetrafluoroethylene comprising:

polymerizing tetrafluoroethylene in an aqueous medium in the presence of a hydrocarbon surfactant and a polymerization initiator to obtain a polytetrafluoroethylene; and adding at least one selected from the group consisting of a radical scavenger and a decomposer of the polymerization initiator after an initiation of polymerization, wherein an amount of the radical scavenger added is an amount corresponding to 5 to 100% (molar basis) of a polymerization initiator concentration, an amount of the decomposer of the polymerization initiator added is an amount corresponding to 5 to 100% (molar basis) of a polymerization initiator concentration, and in the polymerization, tetrafluoroethylene is polymerized substantially in the absence of a fluorine-containing surfactant.

2. The method according to claim 1, wherein the at least one selected from the group consisting of the radical scavenger and the decomposer of the polymerization initiator is added when the concentration of the polytetrafluoroethylene formed in the aqueous medium is 5% by mass or more.

3. The method according to claim 1, wherein the radical scavenger is at least one selected from the group consisting of an aromatic hydroxy compound, an aromatic amine, N,N-diethylhydroxylamine, a quinone compound, a terpene, a thiocyanate, and cupric chloride ($CuCl_2$).

4. The method according to claim 1, wherein the decomposer of the polymerization initiator is at least one selected from the group consisting of a sulfite, a bisulfite, a bromate, diimine, a diimine salt, oxalic acid, an oxalate, a copper salt, and an iron salt.

5. The method according to claim 1, wherein the polymerization initiator is an oil-soluble radical polymerization initiator or a water-soluble radical polymerization initiator.

6. The method according to claim 1, wherein the hydrocarbon surfactant is a carboxylic acid-type hydrocarbon surfactant.

7. The method according to claim 1, wherein the polytetrafluoroethylene is stretchable.

8. The method according to claim 1, wherein the radical scavenger is at least one selected from the group consisting of N,N-diethylhydroxylamine, a quinone compound, a terpene, a thiocyanate, and cupric chloride ($CuCl_2$).

9. The method according to claim 1, wherein a standard specific gravity (SSG) of the polytetrafluoroethylene is 2.180 or less.

* * * * *